(12) United States Patent
Suzuki et al.

(10) Patent No.: US 11,148,460 B2
(45) Date of Patent: Oct. 19, 2021

(54) WRITING INSTRUMENT

(71) Applicant: MITSUBISHI PENCIL COMPANY, LIMITED, Tokyo (JP)

(72) Inventors: Hitoshi Suzuki, Kanagawa (JP); Kouichi Hirano, Gunma (JP); Yukinori Sawa, Gunma (JP); Toshimi Kamitani, Kanagawa (JP)

(73) Assignee: Mitsubishi Pencil Company, Limited, Tokyo (JP)

( * ) Notice: Subject to any disclaimer, the term of this patent is extended or adjusted under 35 U.S.C. 154(b) by 0 days.

(21) Appl. No.: 16/327,176

(22) PCT Filed: Aug. 24, 2017

(86) PCT No.: PCT/JP2017/030271
§ 371 (c)(1),
(2) Date: Feb. 21, 2019

(87) PCT Pub. No.: WO2018/038199
PCT Pub. Date: Mar. 1, 2018

(65) Prior Publication Data
US 2019/0193454 A1    Jun. 27, 2019

(30) Foreign Application Priority Data
Aug. 24, 2016  (JP) .............................. JP2016-163910

(51) Int. Cl.
B43K 8/02        (2006.01)
B43K 1/00        (2006.01)
(Continued)

(52) U.S. Cl.
CPC .................. B43K 1/01 (2013.01); B43K 1/00 (2013.01); B43K 1/006 (2013.01); B43K 1/12 (2013.01); B43K 8/02 (2013.01)

(58) Field of Classification Search
CPC . B43K 1/006; B43K 1/12; B43K 8/02; B43K 8/022; B43K 8/024; B43K 8/026; B43K 8/028
See application file for complete search history.

(56) References Cited

U.S. PATENT DOCUMENTS 3,927,156 A     12/1975  Yoshikawa
D449,071 S  *  10/2001  Kirita ........................... D19/200
(Continued)

FOREIGN PATENT DOCUMENTS

JP          50-97422 A      12/1973
JP          49-32969 B1      9/1974
(Continued)

OTHER PUBLICATIONS

International Preliminary Report on Patentability for corresponding App. No. PCT/JP2017/030271, dated Mar. 7, 2019.
(Continued)

Primary Examiner — David P Angwin
Assistant Examiner — Bradley S Oliver
(74) Attorney, Agent, or Firm — Renner, Otto, Boisselle & Sklar, LLP

(57) ABSTRACT

To provide a writing instrument capable of further improving durability of a writing nib without impairing writing performance even when writing is performed with a heavy writing load. A writing instrument A having a writing part formed of at least a writing nib 30 made of a porous body and a retainer 40 made of a hard material, in which the protrusion amount of the distal end of the writing nib 30 from the retainer 40 is 0.65 mm or more and 1.05 mm or less and/or 40% or more and 65% or less of the thickness of the writing nib 30.

9 Claims, 41 Drawing Sheets

(51) Int. Cl.
 B43K 1/12 (2006.01)
 B43K 1/01 (2006.01)

(56) References Cited

U.S. PATENT DOCUMENTS

| | | | | |
|---|---|---|---|---|
| 6,659,672 | B1 * | 12/2003 | Kirita | B43K 1/00 401/192 |
| 8,141,717 | B2 * | 3/2012 | Wingo | B01D 39/1661 210/500.22 |
| 9,132,692 | B2 * | 9/2015 | Kamitani | B43K 8/003 |
| 2006/0093427 | A1 | 5/2006 | Timm | |

FOREIGN PATENT DOCUMENTS

| | | |
|---|---|---|
| JP | S57-36158 B | 8/1982 |
| JP | S57-41497 B | 9/1982 |
| JP | H11-221188 | 8/1999 |
| JP | 2000-52682 A | 2/2000 |
| JP | 2001-253193 A | 9/2001 |
| JP | 2004-98518 A | 4/2004 |
| JP | 2005-131943 A | 5/2005 |
| JP | 2012-214049 A | 11/2012 |
| JP | 2013-123839 A | 6/2013 |
| JP | 2014-50967 A | 3/2014 |
| JP | 2014-50970 A | 3/2014 |
| JP | 2014-50977 A | 3/2014 |
| JP | 2014-079993 A | 5/2014 |
| JP | 2014-83699 A | 5/2014 |

OTHER PUBLICATIONS

International Search Report for corresponding App. No. PCT/JP2017/030271, dated Nov. 7, 2017.

* cited by examiner (a)

(b)

(c)

(a)

(b)

(a)

(b)

(a)

(b)  (c)  (d)

(e)  (f)  (g)

(h)  (i)  (j)

(a)

(b)

WRITING INSTRUMENT

TECHNICAL FIELD

The present invention relates to writing instruments having a writing nib capable of feeding and retaining ink supplied from a writing instrument barrel, more particularly to marker type writing instruments which are generally called paint markers, oil marking pens, aqueous marking pens, underlining pens and the like.

BACKGROUND ART

Conventionally, writing instruments called paint markers, underline pens and the like have a broad writing nib and thereby enable drawing of wide lines, and are widely used because of excellent visibility of marking and workability.

The writing nibs of writing instruments such as line markers generally employ a bundle of synthetic resin fiber or the like formed in a bar-like shape, or a porous member such as a polymer sintered body, which are made to exert capillary action so as to feed ink supplied from the barrel body, i.e., the main body of writing instrument, to the pen tip and enable writing.

Further, with the spread of writing instruments accommodating fluorescent ink in the barrel body which is the main body of the writing instrument, writing instruments having a variety of structures and shapes enabling the drawing of wide lines have been commercially available, which affords users a wide selection of writing instruments depending on the purpose of use and comfortable workability.

The applicant hereof has disclosed a writing instrument with a writing nib capable of feeding and retaining ink supplied from a barrel body serving as the main body of the writing instrument, in which a see-through section (window) is provided on the pen tip to allow the user to see the direction of writing (see, for example, Patent Document 1).

Since the writing instrument of this type allows the user to see the written letters from the see-through section (window) in the pen tip, the line can be drawn in section where marking is needed. Specifically, as shown in FIG. 19(a), this writing instrument is comprised of an ink absorbent 1a for carrying ink in a barrel body 1 which is the main body of the writing instrument, a pen element 2 made of a fine type writing nib at one end and a pen element 3 made of a bold type writing nib so as to supply ink from the ink absorbent 1a to both the pen elements 2 and 3. Reference numerals 1b and 1c denote caps for protecting the pen elements 2 and 3. The pen element 3 made of a bold type writing nib shown in FIG. 19(b) is attached to a rear barrel 4. As shown in FIG. 19(b), the pen element 3 has a writing nib of a substantially U-shaped porous member formed of ink feeders 3b, 3b and a writing part 3c, attached on the outer periphery of a retainer 3a which is a transparent supporting member.

The applicant hereof has also disclosed a writing instrument in Patent Document 2, which, as shown in FIGS. 20(a) and 20(b), allows ink to be applied from a writing nib 8 by way of a front barrel 6 fixed to the writing tool body 5 storing ink therein and a retainer 7 attached to the front barrel 6.

However, the writing instruments disclosed in Patent Document 1 and Patent Document 2 suffer the problem that if writing is continued with a heavy writing pressure, excessive load is applied continuously on the writing nib, so that the durability of the writing nib and the writing performance are impaired. Therefore, there has been a strong desire for enhancement and improvement in durability of writing nibs without impairing writing performance.

As shown in FIGS. 25(a) to 25(c), in a pen element A1 formed of a bold type writing nib of this writing instrument, a substantially U-shaped writing nib A5 formed of a porous member comprised of ink feeders A3, A3 and an inclined writing part A4 is attached to the outer periphery of a retainer A2. The retainer A2 is formed with fitting grooves on its outer peripheral side, as shown in FIGS. 25(b) and 25(c), into which the writing nib A5 formed of the substantially U-shaped porous member of ink feeders A3, A3 and inclined writing part A4 is fitted. In the pen element A1 of this embodiment, since the retainer A2 is a see-through member made of a transparent resin or the like, the retainer A2 forms a see-through section so that the writing direction can be visually recognized.

In this pen element A1, the attachment of the writing nib A5 formed of the substantially U-shaped porous member of ink feeders A3, A3 and inclined writing part A4 to the retainer A2 is performed by fitting, bonding and/or the like.

However, since the pen element A1 is constructed such that the writing nib A5 having a fixed form in advance to conform to the shape of the retainer A2, that is, the writing nib A5 formed of the substantially U-shaped porous member of ink feeders A3, A3 and inclined writing part A4, is attached to the retainer A2, the writing nib has to be produced to fit to the mounting shape on the retainer. Therefore, every time the mounting shape of the retainer changes, a writing nib has to be produced so as to fit along the shape, which lowers the productivity of the writing nib, raising the cost, further impairing the productivity, and so on of writing instruments having diverse forms of writing nibs.

Conventionally, there are known kinds of writing nibs used for writing tool, including, for example: 1) a fiber core obtained by processing or resin processing a bundle of fibers, and a sintered body of a thermoplastic resin powder (e.g., see Patent Document 2); 2) a writing nib having a laminated structure of two or more layers constructed such that the tip is formed of a sintered body of a thermoplastic resin power while the shaft is formed therein with a lengthwise ink feeder hole (e.g., see Patent Document 3); 3) a pen tip for a writing instrument comprising a fiber bundle obtained by bundling fibers, bonding and curing the fibers with a binder resin, constructed such that at least the surface forming a writing part of the fiber bundle is covered with a sintered material of a thermoplastic resin powder (e.g., see Patent Document 4); and 4) a brush element comprising a main tubular brush body having a tip shape suitable for coating, sintered with a ultrahigh molecular weight polyethylene powder having a porosity of approximately 75 to 85%, preferably set at around 80%, and a sliver contained in the hole of the brush main body (e.g., see Patent Document 5).

However, the sintered bodies made of a thermoplastic resin powder in each pen core or the like in Patent Documents 2 to 5 can be freely designed in shape and have an excellent function, but there is a problem that the physical strength (shear strength, breaking strength) is lowered if the porosity, ink ease of outflow and the like are tried to be improved.

Further, the applicant hereof has disclosed a writing instrument with a writing nib capable of feeding and retaining ink supplied from a barrel body serving as the main body of the writing instrument, in which a see-through section (window) is provided on the pen tip to allow the user to see the direction of writing (see, for example, Patent Document 1).

Since the writing instrument of this type allows the user to see the written letters from the see-through section (window) in the pen tip, the line can be drawn without sticking out just where you want to check. Specifically, as shown in FIG. 40(a), this writing instrument is comprised of an ink absorbent C1a for carrying ink in a barrel body C1 which is the main body of the writing instrument, a pen element C2 made of a fine type writing nib at one end and a pen element C3 made of a bold type writing nib so as to supply ink from the ink absorbent C1a to both the pen elements C2 and C3. Reference numerals C1b and C1c denote caps for protecting the pen elements C2 and C3. The pen element C3 made of a bold type writing nib shown in FIG. 40(b) is attached to a rear barrel C4. As shown in FIG. 40(b), the pen element C3 has a writing nib of a substantially U-shaped porous member formed of ink feeders C3b, C3b and a writing part C3c, attached on the outer periphery of a retainer C3a which is a transparent supporting member.

The applicant hereof has also disclosed a writing instrument in Patent Document 2, which, as shown in FIGS. 41(a) and 41(b), allows ink to be applied from a writing nib C8 by way of a front barrel C6 fixed to the writing tool body C5 storing ink therein and a retainer C7 attached to the front barrel C6.

However, the writing instruments disclosed in Patent Document 1 and Patent Document 2 suffer the problem that if writing is continued with a heavy writing pressure, excessive load is applied continuously on the writing nib, so that the durability of the writing nib and the writing performance are impaired. Therefore, there has been a strong desire for enhancement and improvement in durability of writing nibs without impairing writing performance.

PRIOR ART DOCUMENT

Patent Document

Patent Document 1: Japanese Patent Application Laid-Open No. 2000-52682 (claims, paragraph 0014, FIGS. 7, 24 and 25)
Patent Document 2: Japanese Patent Application Laid-Open No. 2014-50967 (FIG. 1 and others.)
Patent Document 3: Japanese Patent Application Laid-Open No. 2014-50977 (claims, FIG. 1)
Patent Document 4: Japanese Patent Application Laid-Open No. 2004-98518 (claims, FIGS. 1 and 2)
Patent Document 5: Japanese Patent Application Laid-Open No. 2014-83699 (claims, FIGS. 1 to 4 and others)

SUMMARY OF THE INVENTION

Problems to be Solved by the Invention

The present invention has been devised to solve the above-described conventional problems, it is therefore an object of the present invention to provide, (1) a writing instrument which can improve the durability of the writing nib without impairing writing performance even when writing is performed under a heavy writing load, (2) a writing instrument which can securely fix the writing nib on a retainer with a simple structure and manufacturing method thereof, and can be manufactured by stable assembling process at low cost, and (3) a writing instrument having a writing nib which can achieve both the necessary porosity and flowability of application liquid (including ink) and the necessary physical strength (shear strength, breaking strength), in a highly compatible manner.

Means for Solving the Problems

As a result of intensive studies to solve the above-described conventional problems and others, the inventors hereof have found: as a writing instrument for achieving the above object (1), a writing instrument, having a writing part configured of, at least, a writing nib made of a porous body and a retainer made of a hard material, and obtained by limiting the amount of projection of the writing nib on the front side from the retainer within a specific range, and a writing instrument, having a writing part configured of, at least, a writing nib made of a porous body and a retainer made of a hard material, and obtained by specifying the strength of the writing nib on the front side from the retainer to be equal to or greater than a specific value; as a writing instrument for achieving the above object (2), a writing instrument, having a writing part configured of, at least, a writing nib made of a porous body and a retainer for holding the writing nib and obtained by attaching the writing nib before deformation and subjecting the writing nib to a specific process; and as a writing nib for achieving the above object (3), a writing nib formed of a sintered body obtained by sintering a specific thermoplastic resin and a thermoplastic resin having specific physical properties, to complete the present invention.

That is, the writing instruments of the present invention which achieve the objects of the above (1) to (3) reside in the following aspects (1) to (11).

(1) A writing instrument comprising a writing part composed of, at least a writing nib formed of a porous body and a retainer holding the writing nib, wherein the protrusion amount on the distal side of the writing nib from the retainer is 0.65 mm or more, and 1.05 mm or less.

(2) A writing instrument comprising a writing part composed of, at least a writing nib formed of a porous body and a retainer holding the writing nib, wherein the protrusion amount on the distal side of the writing nib from the retainer is 40% or more of the writing nib thickness and 65% or less.

(3) The writing instrument according to the above (1), wherein the writing nib has a porosity of 30 to 70%.

(4) The writing instrument according to the above (1), wherein the fracture position of the writing nib by shearing is located within 0.6 mm or less in length inward from the endface on the distal side of the writing nib.

(5) The writing instrument according to the above (1), wherein the writing nib is formed of a sintered body obtained by sintering at least a granular thermoplastic resin.

(6) The writing instrument according to the above (1), wherein the protrusion amount of the writing nib from the endface of the retainer is different between the left and the right and the retainer's endface on the side opposite to the writing direction is protruded further than the retainer's endface on the side of the writing direction.

(7) The writing instrument according to the above (1), wherein the writing nib is formed by combining materials having different particle size distributions.

(8) The writing instrument according to the above (1), comprising: a writing part composed of, at least a writing nib formed of a porous body and a retainer holding the writing nib, wherein the writing nib before deformation is attached to retainer and then deformed so as to conform to the shape of the retainer and be closely held by the retainer.

(9) The writing instrument according to the above (1), wherein the writing nib includes an ink feeder and a writing part for leading out ink from the ink feeder, and the flat portion of the writing part is formed to be an inclined portion by plastic deformation.

(10) The writing instrument according to the above (1), wherein the writing the nib includes a writing nib formed of a sintered body obtained by sintering a granular thermoplastic resin and a fibrous thermoplastic resin.

(11) The writing instrument according to the above (1), further comprising a writing nib formed of a granular thermoplastic resin (A) and a fibrous thermoplastic resin (B) wherein the content ratio thereof [(A):(B)] is 20 to 80% by mass: 80 to 20% by mass.

Effect of the Invention

According to the present invention which achieves the object (1) above, since the writing nib is pressed by the inner facets of the retainer without impairing writing performance even if writing is performed with a heavy writing load, it is possible to provide a writing instrument that is excellent in durability capable of preventing the writing nib from being broken.

In addition, by varying the amount of protrusion from the retainer on the left and right, it is possible to provide a writing instrument depending on the user.

Further, the retainer is constructed such that the retainer's endface on the side opposite to the writing direction is protruded further than the retainer's endface on the side of the writing direction, whereby it is possible to provide a writing instrument which is particularly effective in writing from left to right by the right hand or writing from right to left by the left hand.

Furthermore, by composing the writing nib with materials having different particle diameter distributions, it is possible to further prevent the nib fracture or the like and further improve durability.

According to the present invention which achieves the object (2) above, it is possible to provide a writing instrument in which the writing nib can be reliably fixed to the retainer with a simple structure by a simple manufacturing means, and to manufacture a writing instrument in a stabilized assembling process at low cost.

According to the present invention which achieves the object (3), it is possible to provide a writing instrument including a writing nib which can achieve both excellent porosity and ease of outflow of the application liquid (including ink) and excellent physical strength (shear strength, breaking strength).

MODES FOR CARRYING OUT THE INVENTION

Next, embodiments of the present invention will be described in detail with reference to the drawings.

FIGS. 1 to 5 show an example of an embodiment of a writing instrument according to the present invention. FIGS. 1(a) to 1(c) are a plan view, a front view and a vertical section of a writing instrument, and FIGS. 2(a) to 2(e) are views showing the writing instrument of FIG. 1 with its cap removed, and FIGS. 3(a) and 3(b) are partially enlarged perspective views of the writing instrument of FIG. 2 as seen from the rear side and the front side.

Figure 1:
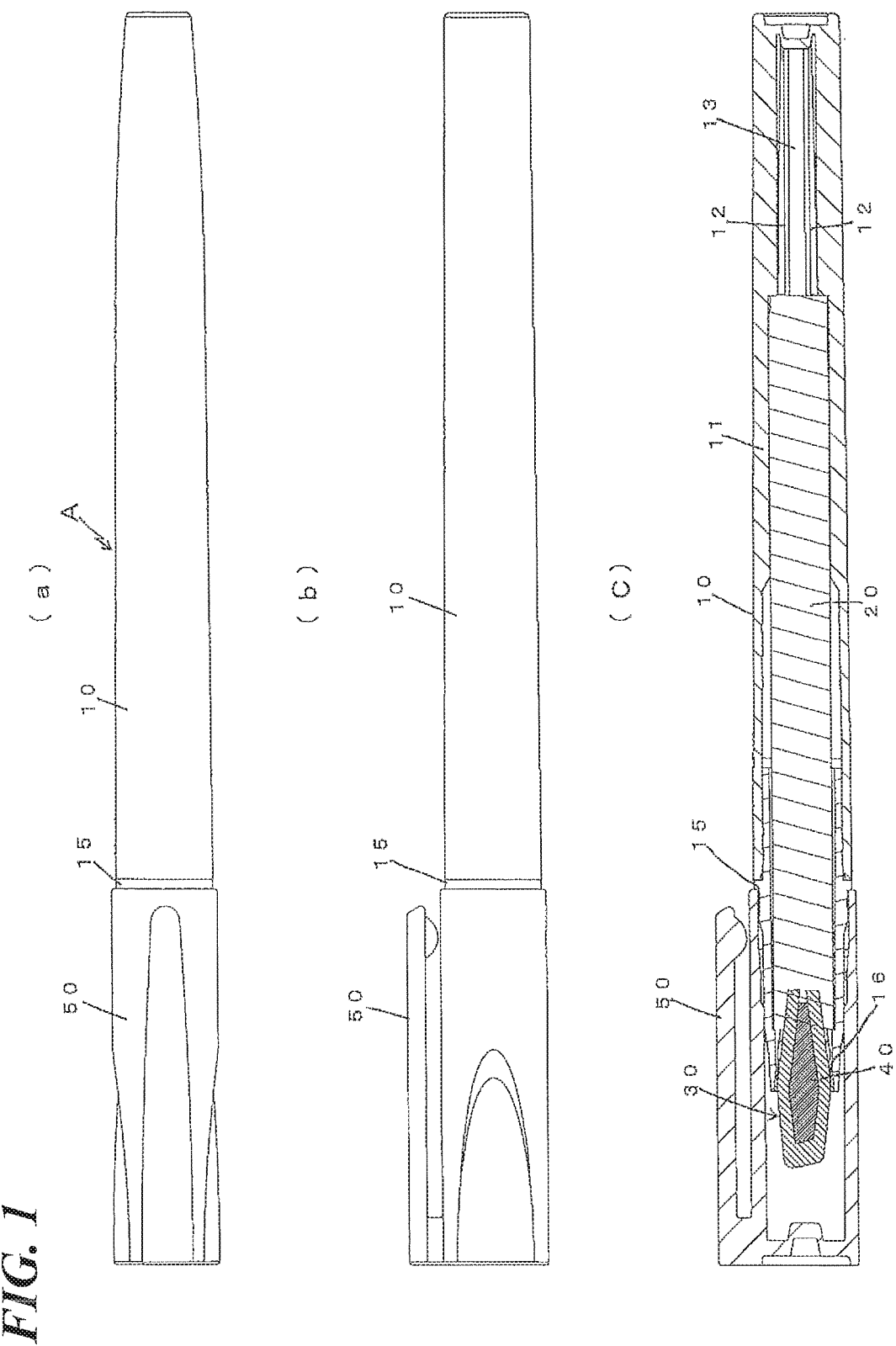
FIG. 1 illustrates an example of an embodiment of a writing instrument according to the present invention, (a) a plan view, (b) a front view, and (c) a central vertical section of (b).
Figure 2:
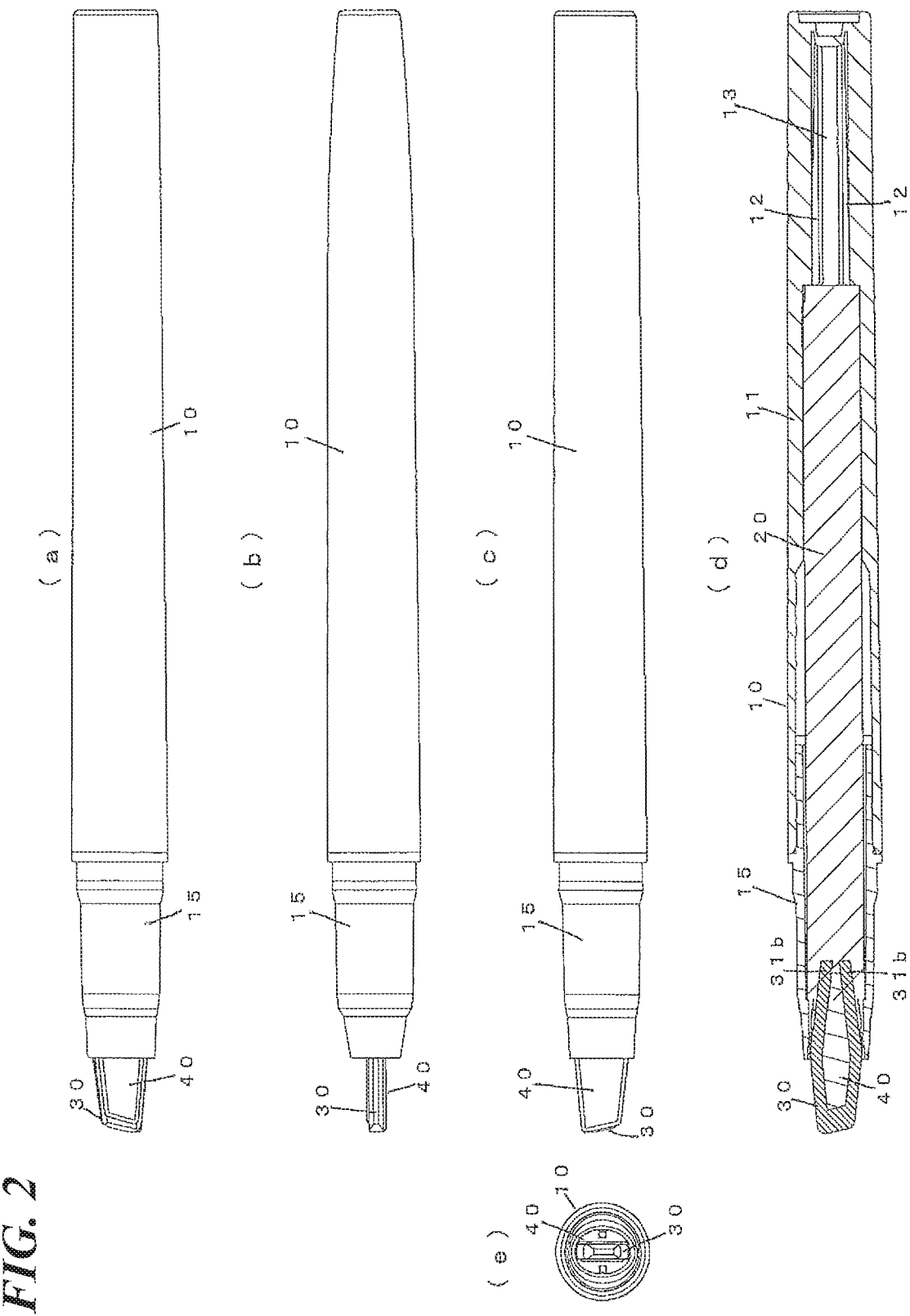
FIG. 2 illustrates a state of the writing instrument of FIG. 1 with its cap removed, (a) a rear view, (b) a plan view, (c) a front view, (d) a central vertical section of (c), and (e) a left side view.
Figure 3:
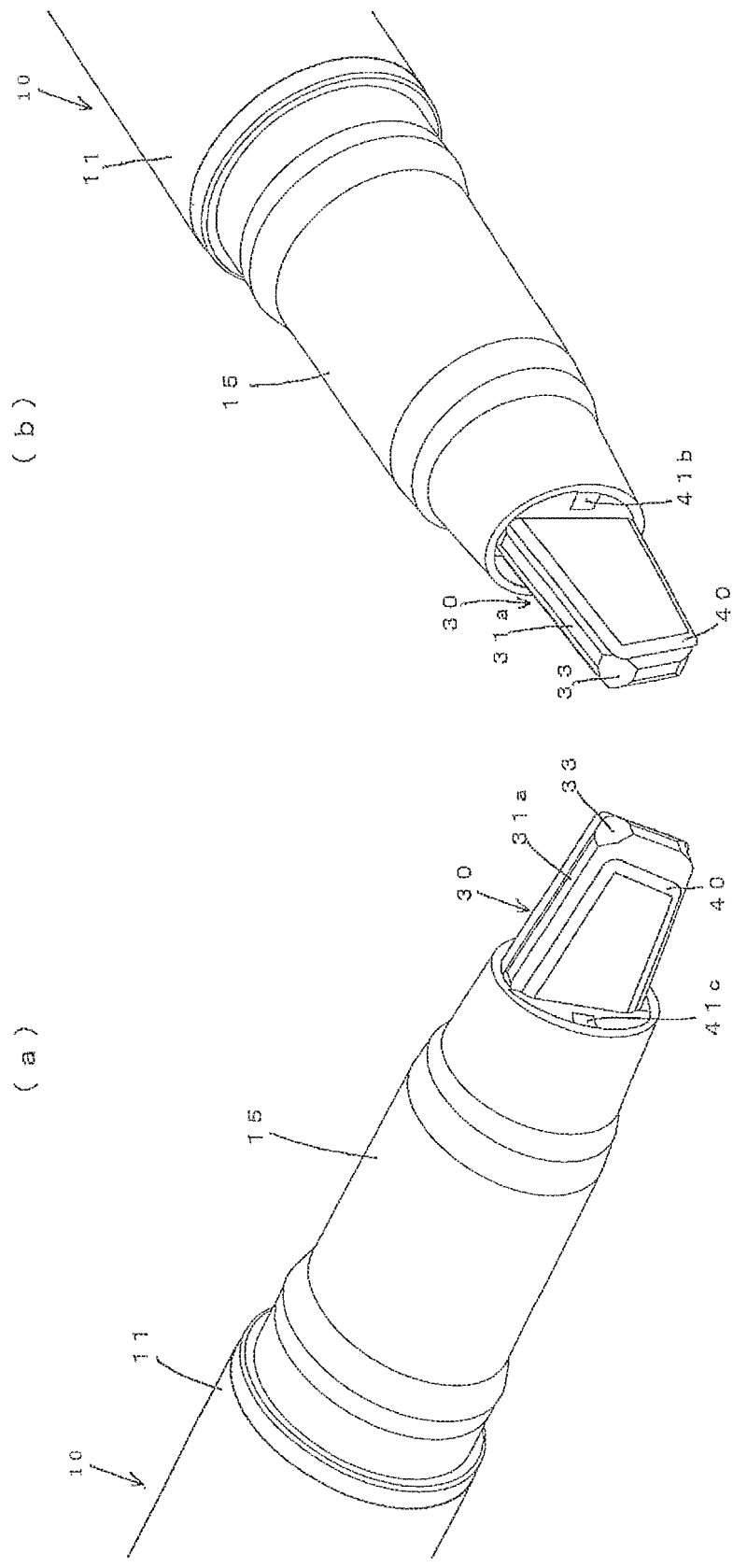
FIGS. 3(a) and 3(b) are partial enlarged perspective views of the writing part side of the writing instrument of FIG. 2 as viewed from the rear side and the front side.

As shown in FIGS. 1 to 3, a writing instrument A of the present embodiment includes a barrel body (barrel cylinder) 10 to be the main part of the writing instrument, an ink absorbent 20, a writing nib 30, a retainer 40 and a cap 50.

As shown in FIG. 1(c), the barrel body 10 is made of, for example, a thermoplastic resin, a thermosetting resin, or the like, and has a bottomed cylindrical rear barrel 11 for housing the ink absorbent 20 impregnated with writing ink and a front barrel 15 for fixing the retainer 40 to which the writing nib 30 serving as a pen tip is attached.

The rear barrel 11 is molded in a bottomed cylindrical shape using a resin such as PP or the like, and functions as the main body (barrel body) of the writing instrument. As shown in FIG. 1(c), the rear barrel 11 has a holding member 13 formed of retaining pieces 12, 12 for retaining the rear end of the ink absorbent 20 inside at the rear end side thereof, and the whole rear barrel and an aftermentioned front barrel are formed with opaque or transparent (or translucent) material. Any of them may be adopted in view of appearance and practical use. Further, the front barrel 15 is fixed to the front side of the rear barrel 11 by fitting or the like.

The front barrel 15 is formed with a fitting projection 16 for fixing the main part of the retainer 40 holding the writing nib 30 described below. The front barrel 15 having this structure is molded of, for example, a resin such as PP.

The ink absorbent 20 is impregnated with an writing ink such as an aqueous ink, an oil-based ink or the like, and examples thereof include fiber bundles made of one or a combination of two or more selected from natural fiber, animal hair fiber, polyacetal resin, acrylic resin, polyester resin, polyamide resin, polyurethane resin, polyolefin resin, polyvinyl resin, polycarbonate resin, polyether resin, polyphenylene resin and the like, and processed fiber bundles such as felt, as well as porous bodies such as sponge, resin particles, sintered bodies and the like. The ink absorbent 20 is accommodated and held in the rear barrel 11 which is the main part of the barrel body 10.

The composition of the writing ink to be used is not particularly limited, and a suitable compounding formulation can be prescribed according to the purpose of use of the writing instrument. It is desirable to use an ink composition for the writing instrument as described later.

FIGS. 4(a) to 4(j) are drawings showing a writing part (a state in which a writing nib is attached to a retainer) in the writing instrument of FIG. 1. FIGS. 5(a) to 5(j) are drawings showing a retainer constituting the writing part of the writing instrument of FIG. 1.

As shown in FIGS. 3(a) and 3(b) and FIGS. 4(a) to 4(j), the writing nib 30 has a circular section and a substantially U-shaped form, as a whole, having ink feeders 31, 31 and a writing part 32 leading ink from the ink feeders 31, 31. The corners at which the ink feeders 31, 31 and the writing part 32 join are beveled to form cut facets 33 and 33. In addition, a smooth cut facet 31a to be a smooth surface is formed on the surfaces of the ink feeders 31, 31.

This writing nib 30 is formed of a porous body. For example, a porous material having pores can be cited. Specific examples include spongy matter, sintered bodies, fiber bundled bodies, foam bodies, sponge, felt, porous bodies, and the like. Examples of materials for forming a porous body include natural fiber, animal hair fiber, polyacetal resin, polyethylene resin, acrylic resin, polyester resin, polyamide resin, polyurethane resin, polyolefin resin, polyvinyl resin, polycarbonate resin, polyether resin, polyphenylene resin, and the like. In the present embodiment, the writing nib is composed of a sintered body obtained by sintering a kind of plastic powder and the like.

The dimension t of the writing nib 30 in the width direction is preferably 0.50 mm or more, particularly and preferably 1.00 to 3.00 mm, from the viewpoint of securing sufficient writing flow rate.

The writing part 32 is in an inclined shape (knife-cut shape) so as to offer an easy-to-write incline, and the inclination and the like are appropriately designed according to writing usability and other factors. In addition, the writing part 32 is preferably one having a thick line width W. The line width W is 1 mm or more, more preferably the line width W is 2 mm or more.

As shown in FIGS. 4(a) to 4(j) and FIGS. 5(a) to 5(j), the retainer 40 fixes the writing nib 30 and is fixed to the tip opening of the front barrel 15 of the barrel body 10. The retainer includes a swelling main part 41, a flange 42 and a see-through section 43 allowing for visual recognition of the writing direction on the front side of the main part 41, and front retaining parts 44a and 44b for holding the distal side (endface) of the writing nib 30 in front of the see-through section 43. In the present embodiment, the front retaining parts 44a and 44b are different in length in the longitudinal direction, that is, the front retaining part 44a is long and the front retaining part 44b is short. The end on the front side of the front retaining part 44a is positioned at the end on the front side of the writing nib 30 while the front retaining part 44b is shorter by an amount of protrusion (the length of protrusion), as will be described below.

The retainer 40 further has a rear retaining part 46 having retaining pieces 45 connected to the main part 41 on the rear side of the main part 41. In the thus configured retainer 40, a holding groove 46 for fitting and holding the U-shaped writing nib 30 is formed on the entire circumferential surface in the longitudinal direction of the retainer 40. Further, a fitting recess 41a is formed on the outer peripheral surface in the width direction of the main part 41. As double-sided air vent grooves on the outer peripheral surface in the longitudinal direction, a straight air vent groove 41b and a curved air vent groove 41c are formed.

The entire retainer 40 thus configured is made of hard material, and is formed of, for example, hard material presenting visibility, of metal, glass, non-elastic resin and the like. Examples of the non-elastic resin that can provide visual recognition include PP, PE, PET, PEN, nylon (including amorphous nylon and the like in addition to typical nylon such as nylon 6 and nylon 12), acryl, poly methyl pentene, polystyrene, ABS and the like. Use of resin that presents a visible light transmittance of 50% or greater to mold the retainer enables effective recognition of characters written in the writing direction through the see-through section 43. It should be noted that only the see-through section 43 may be made of a material offering visibility. The visible light transmittance can be obtained by measuring the reflectance with a multi-light source spectrophotometer [(MSC-5 N) manufactured by Suga Test Instruments Co., Ltd.].

The retainer 40 may be configured by using one kind from the above materials or using two or more kinds of materials from the viewpoint of further improvement of durability, visibility, and so on, and may be formed by various molding methods such as injection molding, blow molding and the like.

Figure 5:
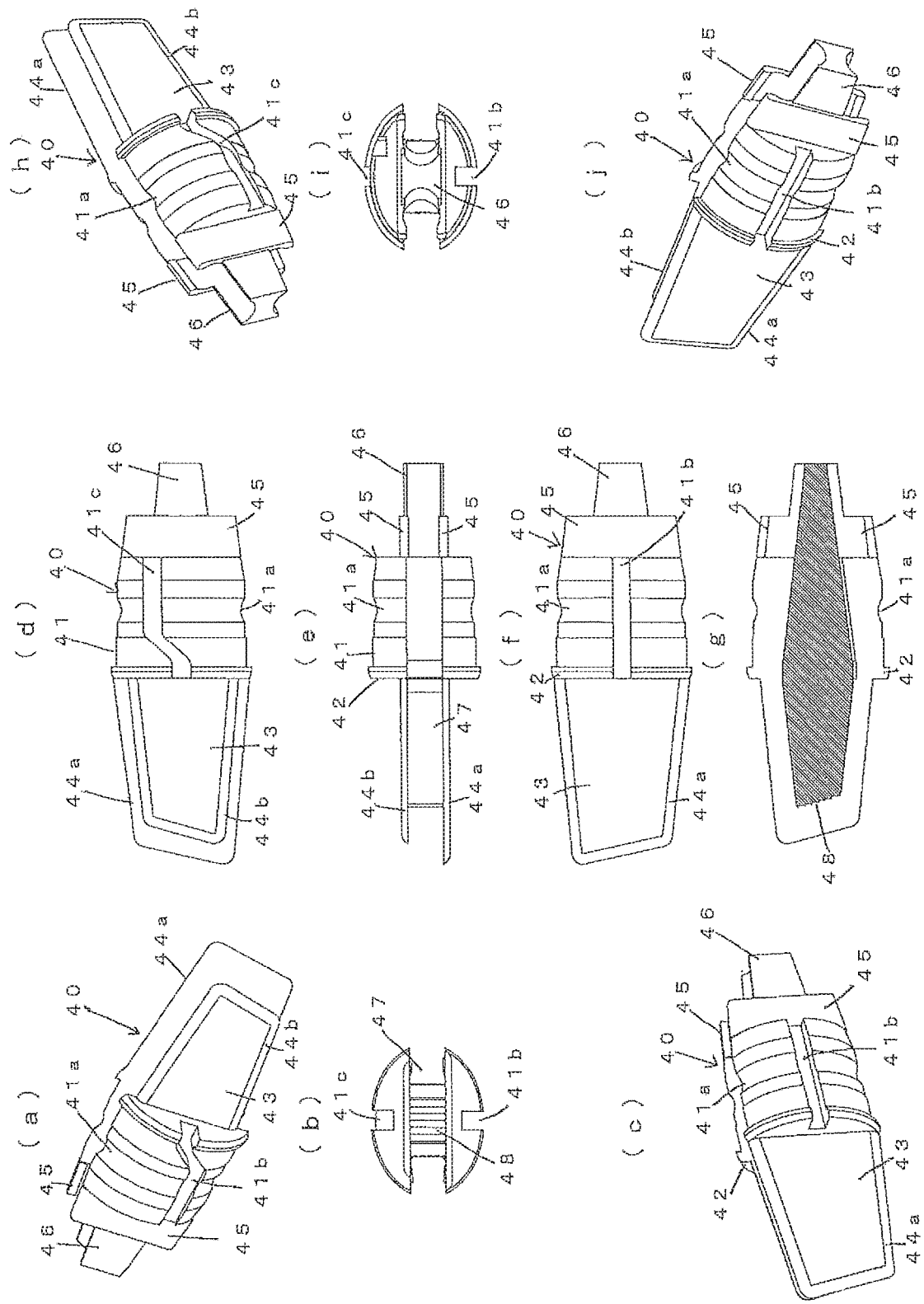
FIGS. 5(a) to 5(j) are drawings showing a retainer forming a writing part in the writing instrument of FIG. 1, (a) a perspective view of the back side as seen from the front side, (b) a right side view of (a), (c) a perspective view of the front side as seen from the front side, (d) a rear view, (e) a plan view, (f) a front view, (g) a central vertical section of (f), (h) a perspective view of the back side as seen from the rear side, (i) a left side view of (h), (j) a perspective view of the front side as seen from the rear side.
Figure 6:
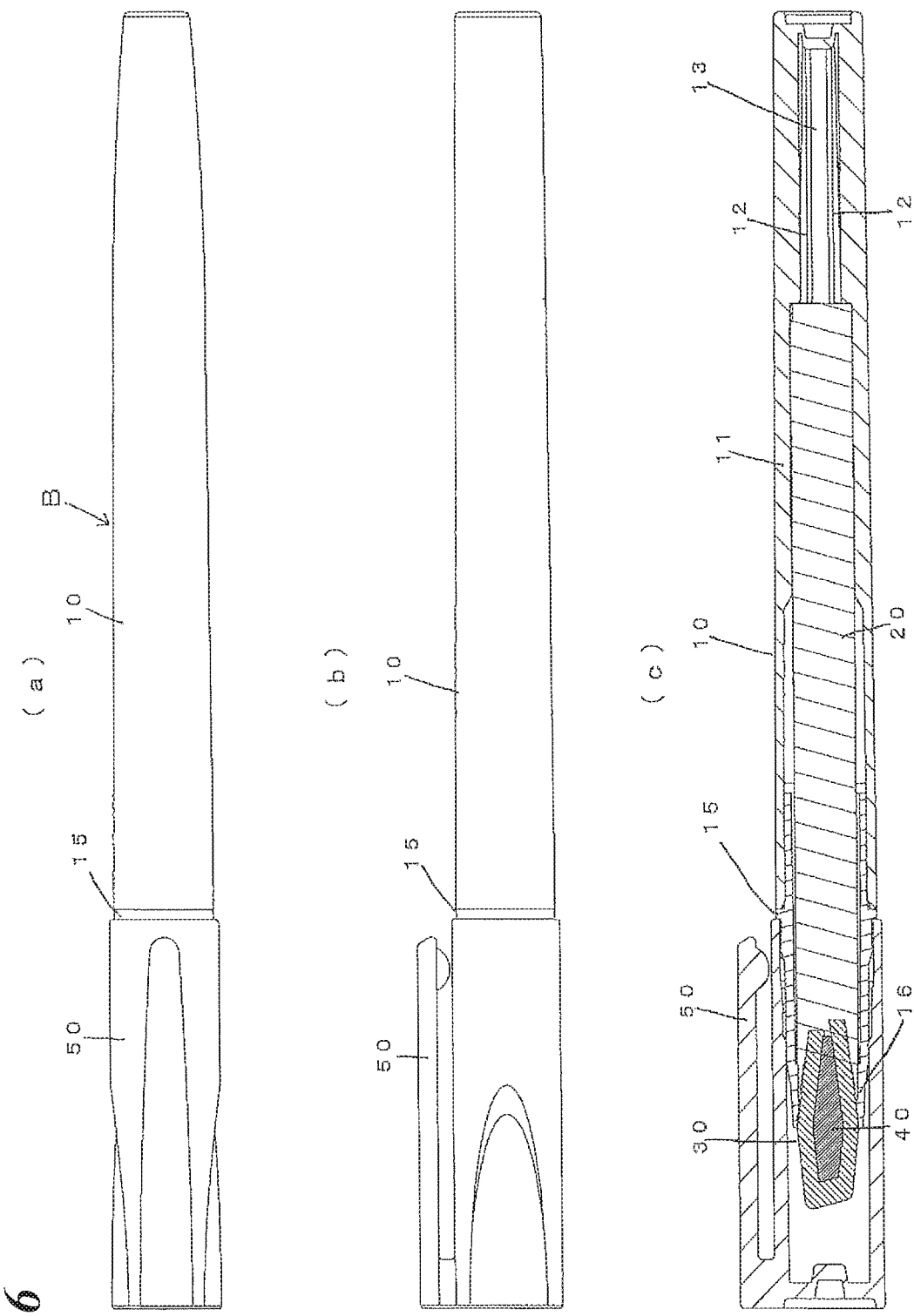
FIG. 6(a) illustrates another example of an embodiment of a writing instrument according to the present invention, (a) a plan view, (b) a front view, and (c) a vertical section.
Figure 7:
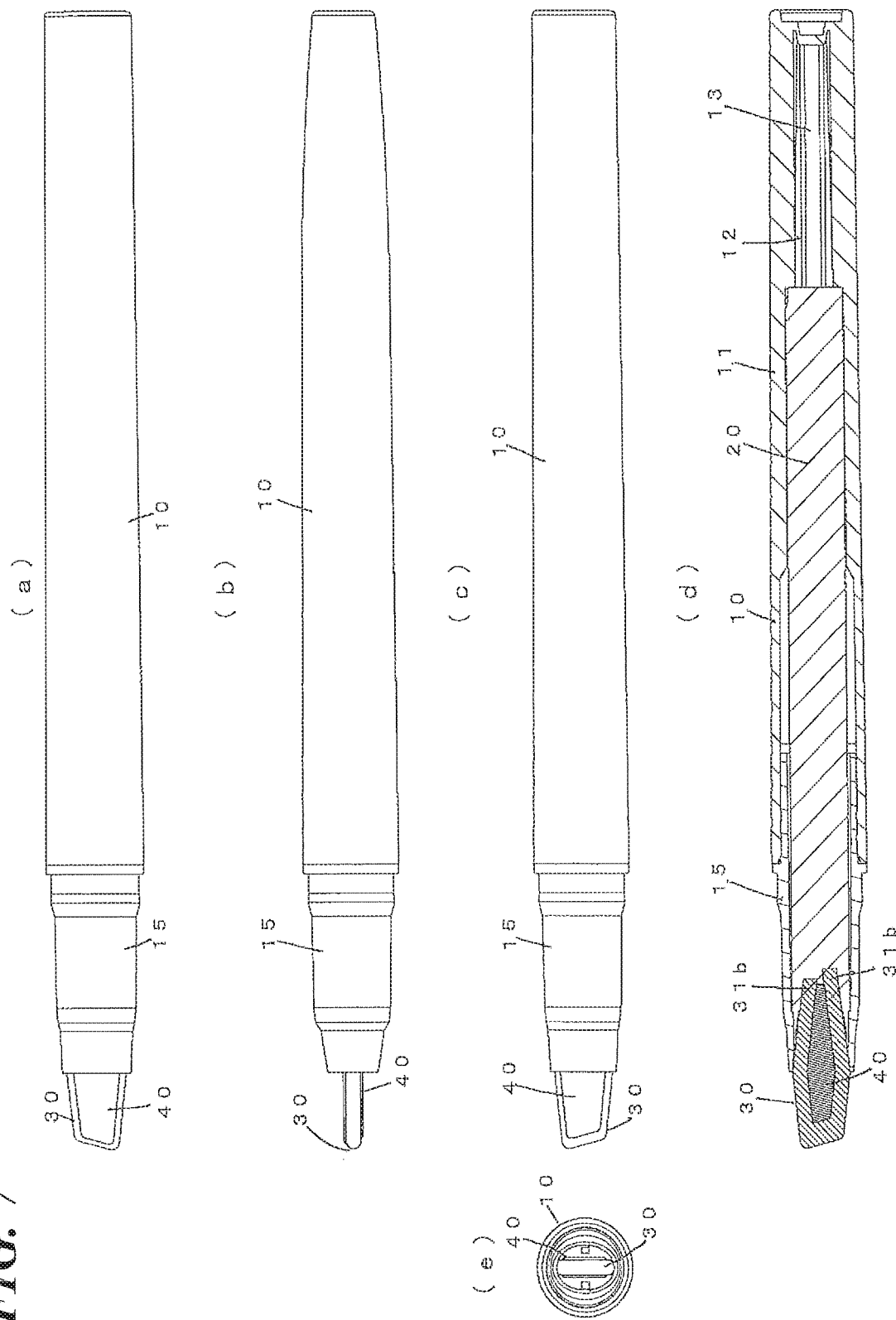
FIG. 7 illustrates a state of the writing instrument of FIG. 6 with its cap removed, (a) a rear view, (b) a plan view, (c) a front view, (d) a central vertical section of (c), and (e) a left side view.
Figure 8:
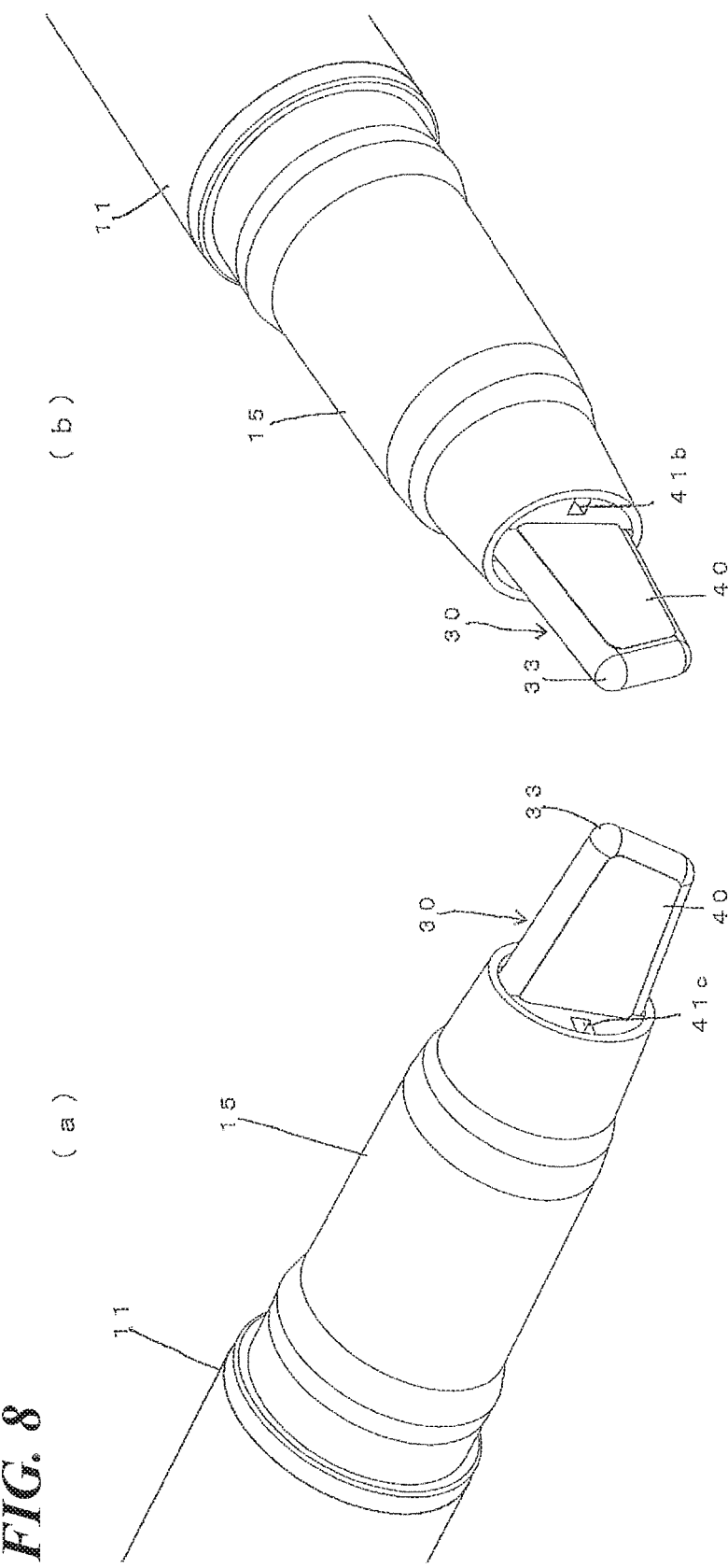
FIGS. 8(a) and 8(b) are partial enlarged perspective views of the writing part side of the writing instrument of FIG. 6 as viewed from the rear side and the front side.

In this writing instrument A, fixation (attachment) of the writing nib 30 to the retainer is performed by fitting the writing nib 30 into the holding groove 47 so as to be held and fixed by the front retaining parts 44a, 44b and the rear retaining part 46 having retaining pieces 45. Further, in order to secure the fixing (anti-falling) of the writing nib 30, bonding with an adhesive, welding or the like may be further used. Moreover, a non-smooth surface portion with wedges is formed on the contact surface portion of the holding groove 46 of the retainer 40 which is in contact with the writing part 32 of the writing nib 30 so as to further secure the fixing of the writing nib 30 to the retainer 40. In the present embodiment, the wedge-formed non-smooth surface portion 48 is given as shown in FIG. 5(*g*).

Figure 4:
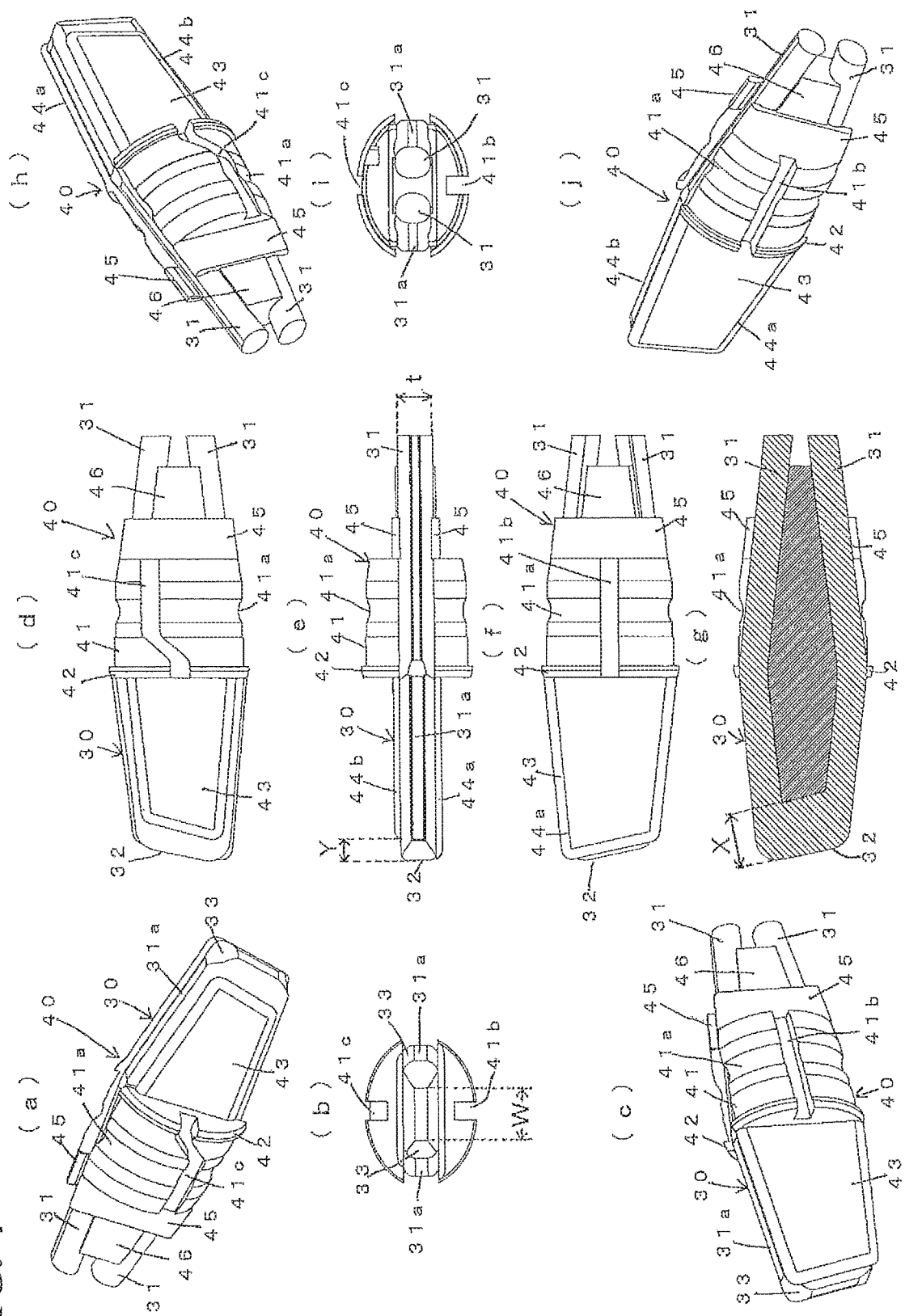
FIGS. 4(a) to 4(j) are drawings showing a writing part (in a state where a writing nib is attached to a retainer) in the writing instrument of FIG. 1, (a) a perspective view of the back side as seen from the front side, (b) a right side view of (a), (c) a perspective view of the front side as seen from the front side, (d) a rear view, (e) a plan view, (f) a front view, (g) a central vertical section of (f), (h) a perspective view of the back side as seen from the rear side, (i) a left side view of (h), (j) a perspective view of the front side as seen from the rear side.

In the present embodiment, as shown in FIGS. 4(*e*) and 4(*g*), the protrusion amount Y on the distal side of the writing nib 30 from the retainer 40 is specified to be 0.65 mm or more and 1.05 mm or less. This specification creates a structure enabling the protrusion amount Y from the writing nib 30 to press against the writing nib within the interior facet of the retainer as much as possible even if writing is performed with a heavy writing load. As a result it is possible to provide excellent durability without impairing writing performance while preventing the writing nib from being damaged. If the protrusion amount Y is smaller than 0.65 mm, there is a risk that writing can not be performed due to interference of the retainer when the pen element used is laid down for writing. In contrast, if the protrusion amount Y is greater than 1.05 mm, there is a risk that the writing performance is impaired by a heavy writing load. It should be noted that X shown in FIG. 4(*g*) is the writing nib width, and it is preferable that the protrusion amount Y is 0.65 mm or more and 1.05 mm or less, and less than 50% of the writing nib width X.

Figure 9:
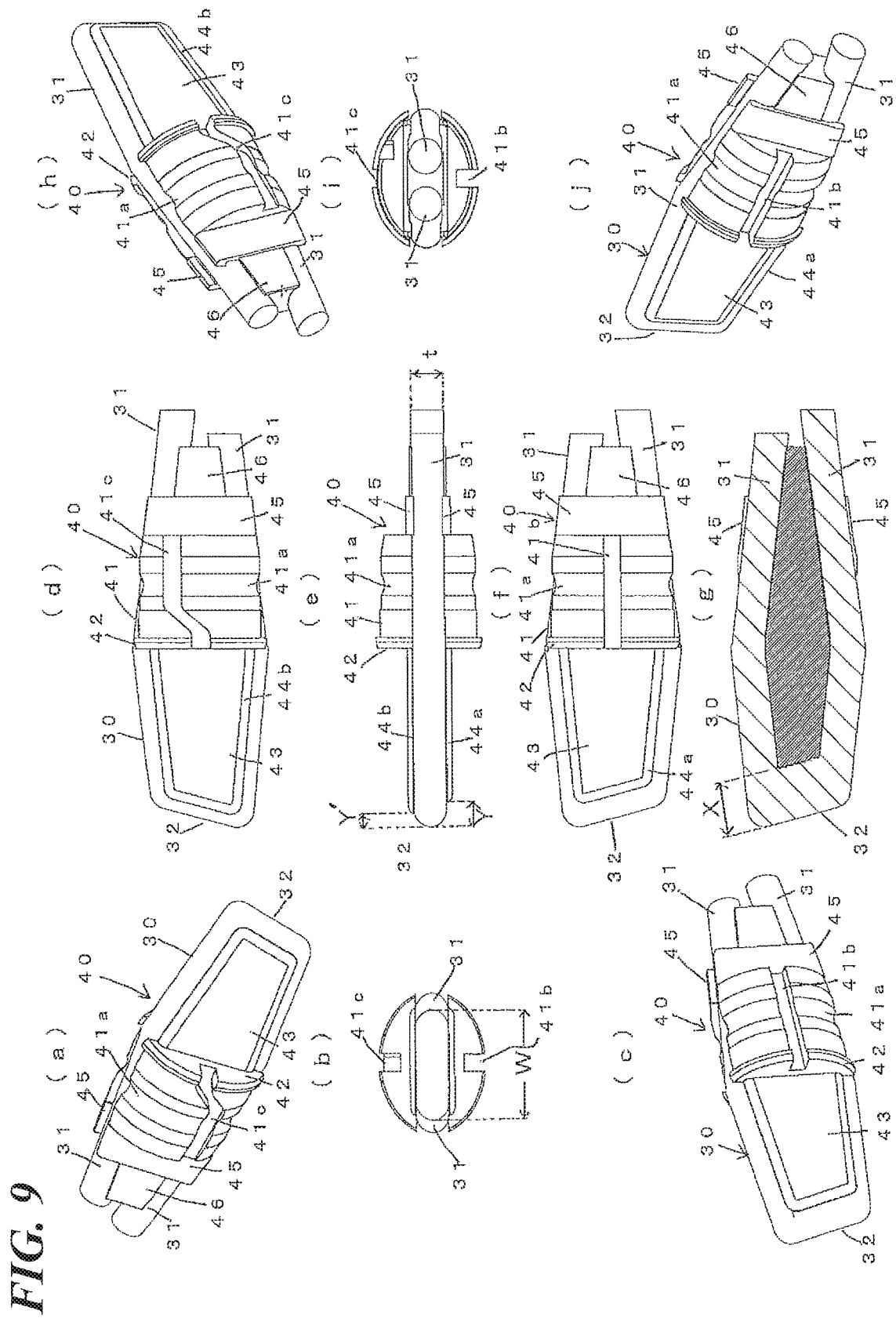
FIGS. 9(a) to 9(j) are drawings showing a writing part (in a state where a writing nib is attached to a retainer) in the writing instrument of FIG. 6, (a) a perspective view of the back side as seen from the front side, (b) a right side view of (a), (c) a perspective view of the front side as seen from the front side, (d) a rear view, (e) a plan view, (f) a front view, (g) a central vertical section of (f), (h) a perspective view of the back side as seen from the rear side, (i) a left side view of (h), (j) a perspective view of the front side as seen from the rear side.
Figure 10:
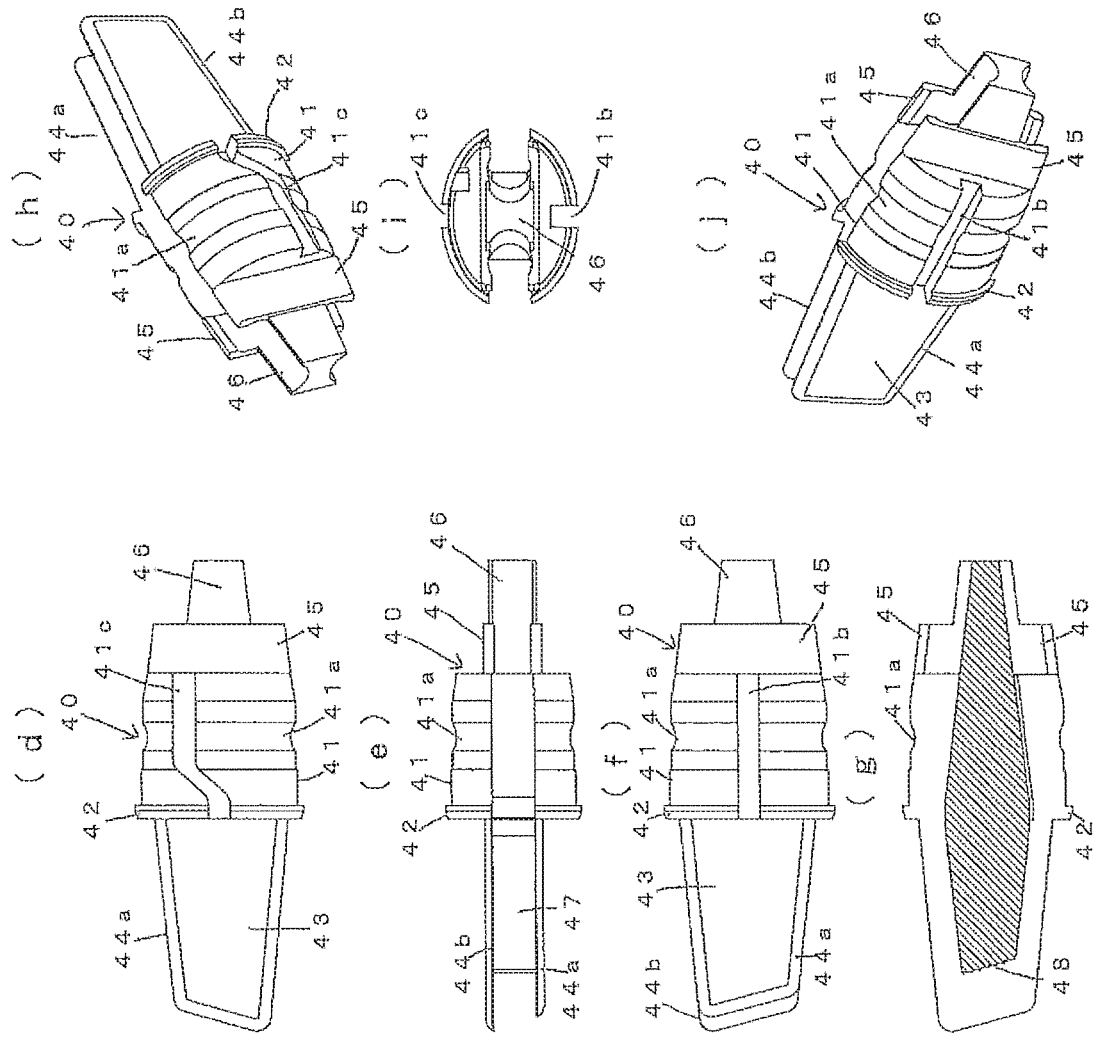
FIGS. 10(a) to 10(j) are drawings showing a retainer forming a writing part in the writing instrument of FIG. 6, (a) a perspective view of the back side as seen from the front side, (b) a right side view of (a), (c) a perspective view of the front side as seen from the front side, (d) a rear view, (e) a plan view, (f) a front view, (g) a central vertical section of (f), (h) a perspective view of the back side as seen from the rear side, (i) a left side view of (h), (j) a perspective view of the front side as seen from the rear side.
Figure 10:
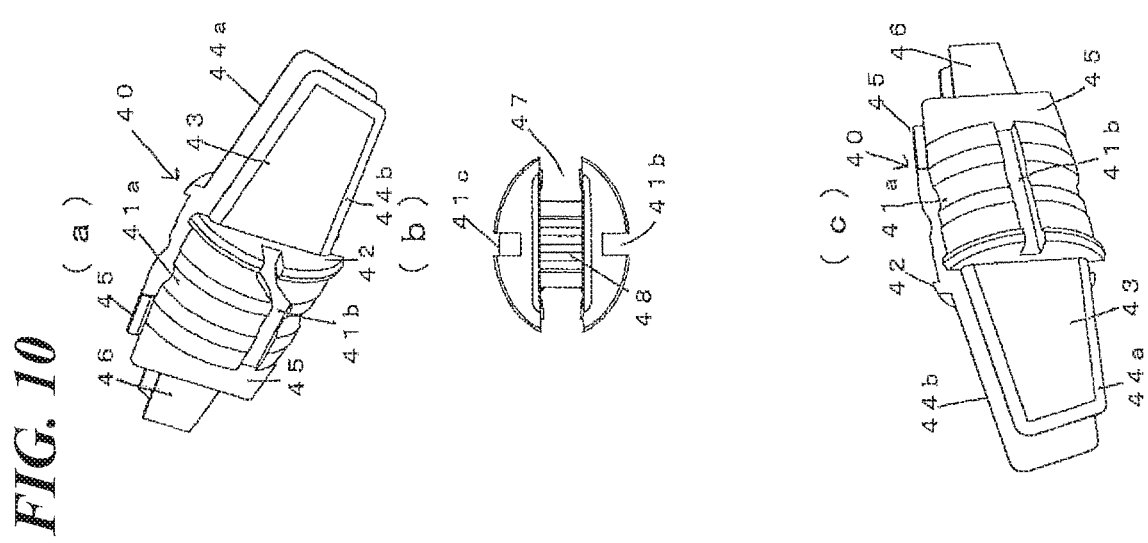

Further, in the present invention, in addition to the above embodiment, it is also possible to achieve the effect of the present invention by specifying the protrusion amount Y on the distal side of the writing nib from the retainer at 40 to 65% of the writing nib's thickness t. Specifying the protrusion amount Y on the distal side of the writing nib at 40 to 65% (Y/t is 40 to 65%) of the writing nib's thickness t provides a structure that enables the protrusion amount Y on the distal side of the writing nib 30 to further retain the strength of the writing nib thanks to its relationship with the writing nib's thickness and to press against the writing nib within the interior facet of the retainer as much as possible even if writing is performed with a heavy writing load. As a result it is possible to achieve excellent durability without impairing writing performance while preventing the writing nib from being damaged. More preferably, the protrusion amount Y on the distal side of the writing nib 30 is preferably 48 to 58% of the writing nib's thickness t. If this protrusion amount Y is less than 40% of the writing nib's thickness t, there occurs a risk that the writing performance is impaired by a heavy writing load, whereas if it exceeds 65%, the retainer becomes thick, which makes it difficult to see the paper surface when writing is performed. Note that X shown in FIG. 9(*g*) is the writing nib width X, and it is preferable that the protrusion amount Y is 40% to 65% of the writing nib's thickness t and is less than 50% of the writing nib width X (Y/X is less than 50%).

As a particularly preferred embodiment, specifying the protrusion amount Y on the distal side of the writing nib from the retainer at 0.65 mm or more and 1.05 mm or less and at 40 to 65% of the writing nib thickness t, can promote the effect of the present invention in a synergistic manner.

As the retainer 40 (FIG. 4) to which the writing nib 30 having the above structure is fixed is inserted into the front barrel 15, the fitting recess 41*a* on the retainer 40 mates with the fitting projection 16 of the front barrel 15 so that the writing nib 30 is attached (fixed) to the barrel body 10 of the writing instrument via the retainer 40 while the rear end portions 31*a*, 31*a* of the ink feeders 31, 31 of the writing nib 30 are inserted into the interior of the front end side of the ink absorbent 20. It is noted that recesses into which the rear end portions 31*a*, 31*a* of the ink feeders 31, 31 are inserted may be formed inside the front end side of the ink absorbent 20. In addition, when the pressure inside the barrel body 10 increases, ink dripping or the like sometimes would occur from the pen tip. In the writing instrument A of the present embodiment, as shown in FIG. 3, the air vent grooves 41*b* and 41*c* adjust the air pressure inside the barrel body 10 relative to the outside air.

The cap 50 is detachably attached by fitting or the like to the outer periphery on the front end side of the front barrel 15.

The writing instrument A according to the present invention can be easily manufactured by inserting the ink absorbent 20 impregnated with an ink for writing instrument into the rear barrel 11 as a part of the barrel body 10 of the writing instrument so as to be held therein and fixing the front barrel 15 and the fixed retainer 40 with the writing nib 30 fitted and held therein in this order by fitting or the like. In the writing instrument A, the ink retained in the ink absorbent 20 can be efficiently fed to the writing part 32 of the writing nib 30 by capillary force and used for writing.

In the thus configured writing instrument A, the protrusion amount Y on the distal side of the writing nib 30 from the retainer 40 is 0.65 mm or more in the longer retaining part and 1.05 mm or less in the shorter retaining part, so that the lengths of the front retaining parts 44*a* and 44*b* for holding the distal side of the writing nib 30 are differentiated. Specifically, the front retaining part 44*a* is formed longer to hold a longer part of the front tip (endface) of the writing nib 30 while the front retaining part 44*b* is formed shorter to hold a shorter part of the tip. Therefore, when a right-handed user draws a line from left to right using the writing instrument, the line can be drawn by the protruded portion (the protrusion amount), and still, the front retaining part 44*a* offering a greater hold can reliably hold (protect) the protruded portion of the writing nib to enhance the strength. As a result, the configuration formed of the long front retaining part 44*a* and the short front retaining part 44*b* on the distal side (endface) of the writing nib 30 for holding the writing part 32 together with the limitation of the above protrusion amount Y creates a structure of pressing the writing nib within the interior facet of the retainer 40 (44*a*) as much as possible without impairing writing performance of the tip of the writing nib 30 even if writing is performed with a heavy writing load, whereby it is possible to provide a writing instrument which is excellent in durability while preventing the writing nib 30 from being damaged. Furthermore, when the retainer 40 is configured such that its endface on the side opposite to the writing direction is protruded further than the retainer's endface on the side of the writing direction, this configuration provides a writing instrument that is particularly effective in drawing from left to right by the right hand. It should be noted that when the endfaces of the retainer 40 are formed in an opposite relationship to the above, it is possible to provide a writing instrument that is a particularly effective in drawing from right to left by the left hand or in drawing from top to bottom by the right hand.

Moreover, in the writing instrument A, when the protrusion amount Y on the distal side of the writing nib 30 from the retainer 40 is not limited to 0.65 mm or more and 1.05 mm or less, but is specified to be 40 to 65% of the writing nib's thickness t, the effect of the present invention can be obtained. That is, also in this embodiment, by setting the protrusion amount Y on the distal side of the writing nib at 40 to 65% of the writing nib's thickness t, it is possible to provide a structure that enables the protrusion amount Y on the distal side of the writing nib 30 to further retain the strength of the writing nib thanks to its relationship with the writing nib's thickness and to press against the writing nib within the interior facet of the retainer as much as possible even if writing is performed with a heavy writing load, hence it is possible to provide a writing instrument that can prevent breakage of the writing nib and is excellent in durability.

Furthermore, in the writing instrument A, the retainer 40 with the writing nib 30 fixed thereto is made of a material offering visibility as described above, so that the see-through section 43 of the retainer 40 allows the user to observe the direction of writing. Thus, it is possible to provide a writing instrument that can provide sufficient visibility to read the characters written in the drawing direction and can be used until the end of a brush-stroke.

FIGS. 6 to 10 show another example of the embodiment of the writing instrument of the present invention, and the drawings in FIGS. 6 to 10 are similar drawings in FIG. 1 to FIG. 5, respectively. The same components of the writing instrument in FIGS. 6 to 10 as those in the writing instrument of the above-described embodiment of FIGS. 1 to 5 are allotted with the same reference numerals, and description on those is omitted.

A writing instrument B of the present embodiment is different from the writing instrument of the embodiment shown in FIGS. 1 to 5, in that the writing nib 30 has no smoothly cut facet 31a, in that the protrusion amount Y of the writing nib 30 from the endface of the retainer 40 is different between the left and the right (the larger protrusion amount is denoted Y and the smaller protrusion amount is denoted Y'), that is, the relation of the lengths of the front retaining parts 44a and 44b for holding the tip (the endface) of the writing nib 30 is inverted, specifically, the front retaining parts 44a is formed shorter and the front end retaining part 44b is formed longer while the ends on the front end side of the front retaining parts 44a and 44b are not aligned with the end on the distal side of the writing nib 30, and in that the rear end portions 31a, 31a of the ink feeders 31, 31 of the writing nib 30 are not equal in length but one is formed longer and the other is shorter.

In the present embodiment, as shown in FIGS. 9(e) and 9(g), the protrusion amount Y on the distal side of the writing nib 30 from the retainer 40 differs in the right and the left (top and bottom in the drawing), but in the present invention, the greater protrusion amount is denoted as Y. Similarly to the above embodiment, the protrusion amount Y is specified to be 0.65 mm or more and 1.05 mm or less and/or 40 to 65% of the writing nib thickness t.

In the present embodiment shown in FIGS. 6 to 10, when handwriting is performed from left to right (in the lateral direction) by the right hand, and also in writing in the vertical direction without changing the orientation of the page to be written on, it is possible to draw lines with the protruding part (with the protrusion amount Y). Further, since the front retaining parts 44a and 44b have different lengths so that the distal side of the writing nib can be reliably held (protected), this configuration provides a structure of pressing against the writing nib 30 on the distal side thereof within the interior facet of the retainer as much as possible without impairing writing performance even if writing is performed with a heavy writing load, whereby it is possible to provide a writing instrument which is excellent in durability while preventing the writing nib from being damaged, as with the writing instrument of the embodiment of FIGS. 1 to 5.

[Explanation of Ink Composition for Writing Instrument]

Next, description will be given on the ink composition for writing instrument used for the first embodiment of FIGS. 1 to 5, the second embodiment of FIGS. 6 to 10, each of writing instruments of FIGS. 11 and 12 described below and a writing instrument of FIGS. 13 to 18.

The ink composition for writing instrument to be usable and carried by the ink absorbent 20 is not particularly limited, but in order to make the ink supply favorable, and in order to secure excellency in drying properties and low temperature stability of the ink and the functionality of preventing bleeding and strike-through of the drawn lines while suppressing the drying of the writing part (pen tip), it is preferable to use an ink composition for writing instrument containing, at least, a colorant trimethylglycine, pentaerythritol, 10% by mass or less of a water-soluble organic solvent and water.

As examples of usable colorant, dyes that are soluble or dispersible in water, known inorganic and organic pigments such as titanium oxide, resin particle pigments containing pigments, pseudo pigments obtained by dyeing a resin emulsion with a dye, fluorescent pigments, white plastic pigments, pigments obtained by applying multilayered coatings of iron oxide, titanium oxide and the like on the surface layer of silica or mica as a base material, can be used as long as the effect of the present invention is not impaired.

Examples of dyes include acid dyes such as Eosin, Phloxine, Water Yellow #6-C, Acid Red, Water Blue #105, Brilliant Blue FCF, Nigrosine NB; direct dyes such as Direct Black 154, Direct Sky Blue 5B, Violet B00B Dyes; basic dyes such as rhodamine and methyl violet, fluorescent dyes, and the like.

Examples of inorganic pigments include azo lakes, insoluble azo pigments, chelate azo pigments, phthalocyanine pigments, perylene and perinone pigments, nitroso pigments and the like. More specifically, carbon black, titanium black, zinc white, red iron oxide, aluminum, chromium oxide, iron black, cobalt blue, iron oxide yellow, viridian, zinc sulfide, lithopone, cadmium yellow, cinnabar, cadmium red, chrome yellow, molybdate orange, zinc chromate, strontium chromate, white carbon, clay, talc, ultramarine blue, precipitated barium sulfate, barite powder, calcium carbonate, white lead, dark blue white, Prussian blue, manganese violet, aluminum powder, brass powder and other inorganic pigments, C.I. Pigment Blue 17, C.I. Pigment Blue 15, C.I. Pigment Blue 17, C.I. Pigment Blue 27, C.I. Pigment Red 5, C.I. Pigment Red 22, C.I. Pigment Red 38, C.I. Pigment Red 48, C.I. Pigment Red 49, C.I. Pigment Red 53, C.I. Pigment Red 57, C.I. Pigment Red 81, C.I. Pigment Red 104, C.I. Pigment Red 146, C.I. Pigment Red 245, C.I. Pigment Yellow 1, C.I. Pigment Yellow 3, C.I. Pigment Yellow 12, C.I. Pigment Yellow 13, C.I. Pigment Yellow 14, C.I. Pigment Yellow 17, C.I. Pigment Yellow 34, C.I. Pigment Yellow 55, C.I. Pigment Yellow 74, C.I. Pigment Yellow 95, C.I. Pigment Yellow 166, C.I. Pigment Yellow 167, C.I. Pigment Orange 5, C.I. Pigment Orange 13, C.I. Pigment Orange 16, C.I. Pigment Violet 1, C.I. Pigment Violet 3, C.I. Pigment Violet 19, C.I. Pigment Violet 23, C.I. Pigment Violet 50, C.I. Pigment Green 7 and the like.

As fluorescent pigments, conventionally known fluorescent pigments can be appropriately used, and examples include inorganic fluorescent pigments such as zinc sulfide, zinc silicate, cadmium sulfide, strontium sulfide and calcium tungstate, and organic fluorescent pigments obtained by dyeing polymer compounds.

Specific examples of the organic fluorescent pigments include NKW series (manufactured by Nippon Keiko Kagaku Co., Ltd.), Sinloihi color base SW series, SF series (manufactured by Shinloihi Co., Ltd.), Victoria series (manufactured by Mikuni-Color Ltd.) such as Victoria Yellow G-20, and the like.

These colorants can be used alone or by mixing two or more kinds.

The content of these colorants can be appropriately adjusted in a range of 0.1 to 60% by mass (hereinafter "% by mass" simply referred to as "%") of the total amount of the ink composition.

Trimethylglycine [Alias: glycine betaine, $(CH_3)_2N^+$ $(CH_3)$ $CH_2COO^-$] is used to function as a moisturizer and the like, in order to enhance the drying resistance of the pen tip, the drying property of the drawn line and the low temperature stability of the ink without causing deterioration of ink performance and so on. even when blended in an aqueous ink composition for writing instrument.

The content of trimethylglycine is desirably 0.5 to 50%, preferably 1 to 15%, more preferably 2 to 10% of the total amount of the ink composition.

When the content is less than 0.5%, the dry-out inhibition effect of the pen tip is not sufficient. On the other hand, if the content exceeds 50%, the writing performance and the storage stability rather less due to increase in viscosity without increasing the dry-out inhibition effect so much.

Pentaerythritol [$C(CH_2OH)_4$] is used to function as a moisturizer or the like. Use of this in combination with the above-mentioned trimethylglycine exerts a synergy effect compared to each individual use and provides outstanding excellence in drying performance of the drawn line and low temperature stability of the ink without causing bleeding and strike-through of drawn lines while inhibiting the drying of the pen tip.

The content of this pentaerythritol is desirably 0.5 to 8%, preferably 2 to 5% of the total amount of the ink composition.

The content of less than 0.5% is not sufficient to provide the necessary dry-out inhibition effect on the pen tip and can not exert a synergy effect with trimethylglycine, whereas the content of higher than 8% causes deposition at low temperatures and degradation of preservation stability without changing the synergy effect with trimethylglycine so much.

Examples of the water-soluble organic solvent to be used include alcohols such as ethanol, isopropyl alcohol, n-butyl alcohol, ethylene glycol and diethylene glycol, amides such as formamide and derivatives thereof, sulfoxides such as dimethylsulfoxide, and ethers such as ethylene glycol monomethyl ether, ethylene glycol monobutyl ether, ethylene glycol dibutyl ether, diethylene glycol monomethyl ether, diethylene glycol monoethyl ether, diethylene glycol monobutyl ether, diethylene glycol diethyl ether, diethylene glycol dibutyl ether, propylene glycol methyl ether, dipropylene glycol methyl ether, tripropylene glycol methyl ether, propylene glycol butyl ether, dipropylene glycol n-butyl ether, tripropylene glycol n-butyl ether, propylene glycol phenyl ether, ethylene glycol monoethyl ether, ethylene glycol monohexyl ether, ethylene glycol monophenyl ether, ethylene glycol mono-2-ethyl butyl ether, propylene glycol ethyl ether, and propylene glycol tert-butyl ether. These can be used alone or by mixing two or more kinds.

The content of these water-soluble organic solvents is preferably 10% or less, preferably 7% or less, and more preferably 5% or less of the total amount of the ink composition.

By setting the content of these water-soluble organic solvents to 10% or less, an excellent function of drying drawn lines can be achieved.

In addition to the above components, the ink composition for writing instrument used in the writing instrument of the present invention can be prepared with water (purified water, distilled water, ion exchanged water, pure water or the like) as the balance (solvent). Other than the above components, for example, optional components such as surfactants, preservatives, antimicrobial agents, pH modifiers, water-soluble resin, and resin emulsion can be contained as appropriate within a range not to impair the effect of the present invention.

Examples of surfactants that can be used include: nonionic surfactants such as sorbitan fatty acid esters, glycerin fatty acid esters, decaglycerin fatty acid esters, polyglycerin fatty acid esters, polyoxyethylene sorbitan fatty acid esters, polyoxyethylene sorbitol fatty acid esters, polyoxyethylene glycerin fatty acid esters, polyethylene glycol fatty acid esters, polyoxyethylene alkyl ethers, polyoxyethylene polyoxypropylene alkyl ethers, polyoxyethylene alkyl phenyl ethers, polyoxyethylene castor oil, polyoxyethylene lanolin-lanolin alcohol-beeswax derivatives, and polyoxyethylene alkyl amine-fatty acid amides; anionic surfactants such as alkyl sulfate salts, polyoxyethylene alkyl ether sulfate salts, N-acyl amino acid salts, N-acyl methyl taurine salts, polyoxyethylene alkyl ether acetate salts, α-olefinsulfonate salts, alkyl phosphate salts, and polyoxyethylene alkyl ether phosphate salts; and fluorosurfactants such as perfluoroalkyl ethylene oxide adducts, perfluoro alkyl trimethylammonium salts, perfluoro alkyl carboxylate salts, fluoroalkyl esters, perfluoro alkyl sulfonate salts, perfluoroalkyl group and hydrophilic group-containing oligomers, perfluoroalkyl group and hydrophilic group-containing urethanes, perfluoroalkyl phosphate esters, perfluoroalkyl betaine, perfluoroalkyl amine oxide, perfluoroalkyl ammonium salts, perfluoroalkyl alkoxylate, and perfluoroalkyl polyoxyethylene ethanol. These surfactants may be used alone or by mixing two or more kinds.

Examples of the preservative or antimicrobial agents include phenol, sodium omadine, sodium benzoate, benzimidazole compounds and the like.

Examples of pH modifiers include hydroxides of alkali metals such as sodium hydroxide, potassium hydroxide and lithium hydroxide, amine compounds such as triethanolamine, diethanolamine, monoethanolamine, dimethylethanolamine, morpholine and triethylamine, ammonia and the like.

Examples of water-soluble resins include polyacrylic acid, water-soluble styrene-acrylic resin, water-soluble styrene/maleic acid resin, water-soluble maleic acid resin, water-soluble styrene resin, poly(vinyl pyrrolidone), poly(vinyl alcohol), water-soluble ester-acrylic resin, ethylene-maleic acid copolymer, poly(ethylene oxide), water-soluble urethane resin and the like.

Examples of resin emulsion include acrylic emulsion, vinyl acetate emulsion, urethane emulsion, styrene-butadiene emulsion, styrene acrylonitrile emulsion and the like.

These water-soluble resins and resin emulsion may be used alone or by mixing two or more kinds.

To produce the ink composition for writing instrument, a conventionally known method can be adopted. For example, at least, a colorant, trimethylglycine, pentaerythritol, a 10% by mass or less of water-soluble organic solvent and water are mixed and stirred with predetermined amounts of components in aqueous solution by a mixer such as a homomixer or a disper mixer. If necessary, coarse particles in the ink composition may be removed by filtration or centrifugal separation, or may be prepared while defoaming, heating and cooling.

The reason why the thus prepared ink composition for the writing instrument used in the writing instrument of the present invention is excellent in drying property of drawn lines and low temperature stability of the ink and brings about the functionality of preventing bleeding and strike-through of drawn lines while inhibiting the drying of the pen tip and can be inferred as follows.

That is, since the ink composition for writing instrument used in the writing instrument of the present invention contains, at least, a colorant, trimethylglycine, pentaerythritol, a 10% by mass or less of water-soluble organic solvent of 10% by mass or less and water, both trimethylglycine and pentaerythritol serve as ingredients for suppressing the drying resistance of the pen tip. Therefore, use of both in the ink composition for writing tool obviously produces a synergy effect greater than the effect of using each individually. The reason is not necessarily clear, but it is inferred that the synergy effect can bring about excellency in drying property of drawn lines and low temperature stability of the ink and the excellent functionality of preventing bleeding and strike-through of drawn lines while inhibiting dry-out of the pen tip.

The ink composition for writing instrument used in the present invention has extremely excellent durability for the above-mentioned functionality, so that the effective period of the functionality lasts long. Further, since trimethylglycine and pentaerythritol are water-soluble, the ink composition also has excellent stability over time.

Therefore, since use of the ink composition for writing instrument having the above components for the writing instrument of the present invention creates a structure of pressing against the writing nib within the interior facet of the retainer as much as possible without impairing writing performance of the tip of the writing nib 30 even if writing is performed with a heavy writing load, it is possible to provide a writing instrument, which can prevent breakage of the writing nib and hence is excellent in durability, allows the user to see the area to be drawn and perform clear writing thanks to the see-through performance of the retainer of the writing instrument when holding and writing with the hand, and can further bring about excellency in drying property of drawn lines and low temperature stability of the ink and the excellent functionality of preventing bleeding and strike-through of drawn lines while inhibiting dry-out of the writing part (pen tip).

Figure 11:
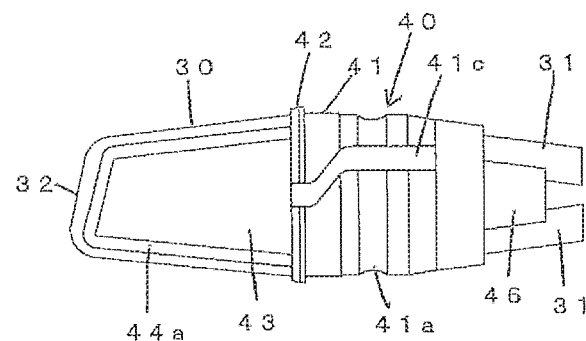
FIGS. 11(a) to 11(c) are drawings showing another example of a writing part (in a state where a writing nib is attached to a retainer) in the writing instrument of FIG. 1, (a) a rear view, (b) a plan view, and (c) a central vertical section of (b).
Figure 11:
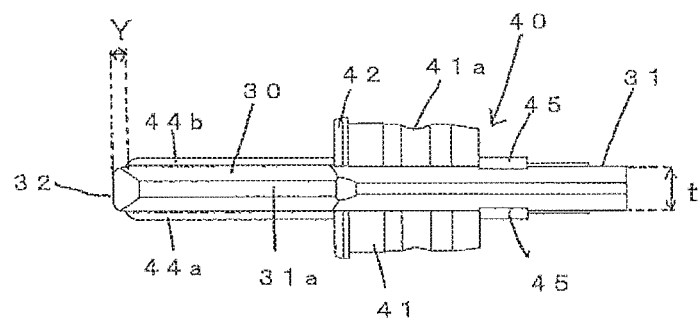
Figure 11:
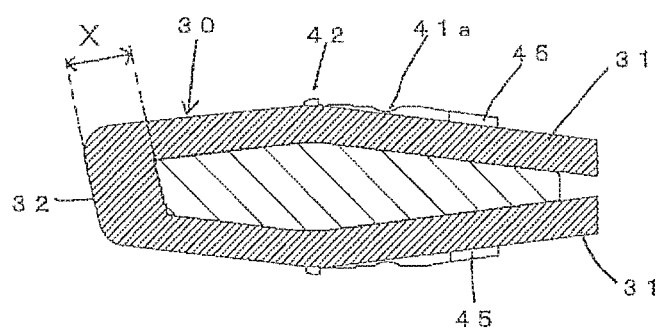
Figure 12:
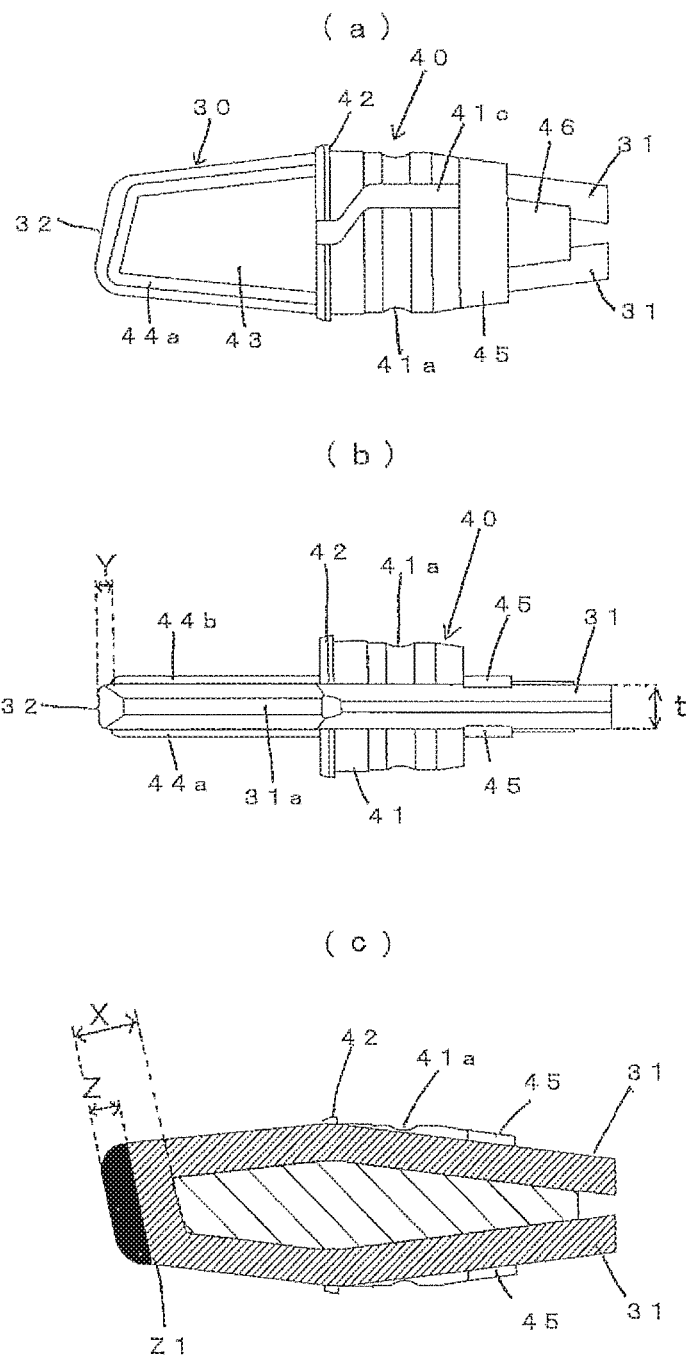
FIGS. 12(a) to 12(c) are drawings showing another example of a writing part (in a state where a writing nib is attached to a retainer) in the writing instrument of FIG. 1, (a) a rear view, (b) a plan view, and (c) a central vertical section of (b).

FIGS. 11 and 12 each show a different example of the embodiment of the writing instrument of the present invention, and only the different parts from those of the writing instrument of FIGS. 1 to 5 are illustrated as parts drawings.

The same components of the writing instrument as those in the writing instrument of the above-described embodiment of FIGS. 1 to 5 are allotted with the same reference numerals, and description on those is omitted.

The writing instrument of FIG. 11 is different from the writing instrument of the embodiment of FIGS. 1 to 5, only in that the lengths of the front retaining parts 44a and 44b that hold the front end side (endface) of the writing nib 30 are the same.

Similarly to the above-described embodiment, in this embodiment, the amount of protrusion Y of the distal side of the writing nib from the retainer is also specified to be 0.65 mm or more and 1.05 mm or less, and/or 40 to 65% or less of the writing nib thickness. As with the writing instruments of FIGS. 1 to 5, this embodiment has a structure of pressing against the writing nib 30 on its distal side within the interior facet of the retainer as much as possible, so that it is possible to provide a writing instrument that can prevent breakage of the writing nib, being excellent in durability without impairing writing performance.

The writing instrument of FIG. 12 is different in that the lengths of the front retaining parts 44a and 44b that hold the distal side (endface) of the writing nib 30 are the same (as in FIG. 11) and that the writing nib 30 is formed by combining materials having different particle size distributions.

As a configuration of the writing nib 30 formed by combining materials having different particle size distributions, when, for example, the writing nib 30 is a sintered core, use of plastic particles (both PE particles) having different particle sizes, specifically, the small-sized particle for the writing part 32 and the large-sized particle for the ink feeders 31, 31, to form the writing nib (sintered core) 30, makes it possible to further enhance the strength of the writing part 32.

In this case, even if the writing nib 30 is changed to the above configuration (formed by combining materials having different particle size distributions), the writing instrument can be configured so that ink can be supplied in an appropriate amount without impairing the ink supply mechanism from the ink absorbent 20 to the writing part 32, and without running out ink.

Similarly to the above-described embodiment, in this embodiment, the amount of protrusion Y is also specified to be 0.65 mm or more and 1.05 mm or less, and/or 40 to 65% or less of the writing nib thickness. Further, when the writing nib 30 is configured with combined materials having different particle size distributions, preferably by enhancing the strength of the writing part 32 greater than that of the ink feeders 31, 31, it is possible to create a stronger structure of structure of the writing nib within the interior facet of the retainer which presses against the retainer as much as possible thus preventing impairing of the writing performance at the tip of the writing nib 30 in a more reliable manner than the above writing instrument of FIG. 11 even if a strong writing load is applied in writing, so that it is possible to provide a writing instrument that can prevent breakage of the writing nib, being excellent in durability.

Further, in the embodiment of FIG. 11, in order to provide a more reliable protection at the boundary (boundary Z1 of strength) between the ink feeders 31, 31 and the writing part 32, the enhanced part thickness Z (maximum Z=X) can be made greater than the protrusion amount Y (Z>Y) with the boundary Z1 supported (protected) between the front retaining parts 44a and 44b so as to further improve the durability of the writing nib 30 including the writing part 32. Preferably, the enhanced part thickness Z (=X) is specified to a range of $(1.0 \times Y \text{ min.}) \leq Z \leq (3.0 \times Y \text{ max.})$, more preferably $(1.0 \times Y \text{ max.}) \leq Z \leq (2.0 \times Y \text{ max.})$. When $Z \leq Y$, the boundary (boundary Z1 of strength) between the ink feeders 31, 31 and the writing part 32 cannot be protected between the front retaining parts 44a and 44b, hence the strength of the boundary depends on the design strength of the writing nib 30 and the like.

FIGS. 13 to 18 are drawings showing another example of an embodiment of a writing instrument of the present invention.

A writing instrument C of the present embodiment is different from the writing instruments A and B of the above-described embodiments in that the barrel sleeve serving as the writing tool body (barrel) is an oval cylinder (elliptical barrel) having a bottom and in that a porous body serving as a writing nib and an ink feed core are integrated.

Figure 13:
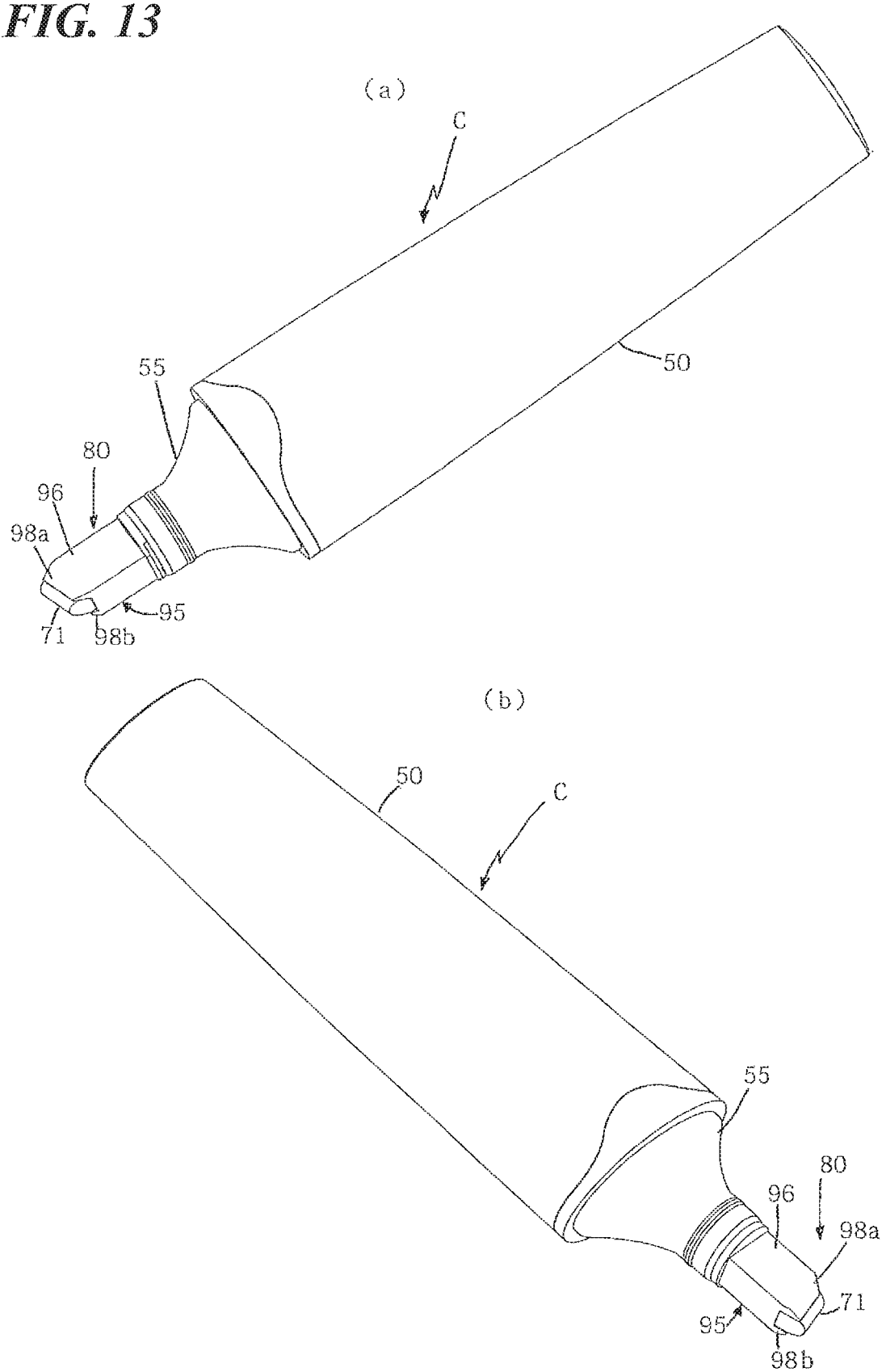
FIGS. 13(a) and 13(b) illustrate another example of an embodiment of a writing instrument of the present invention with its cap removed, (a) a perspective view seen from the front side, and (b) a perspective view of (a) developed 180 degrees.
Figure 14:
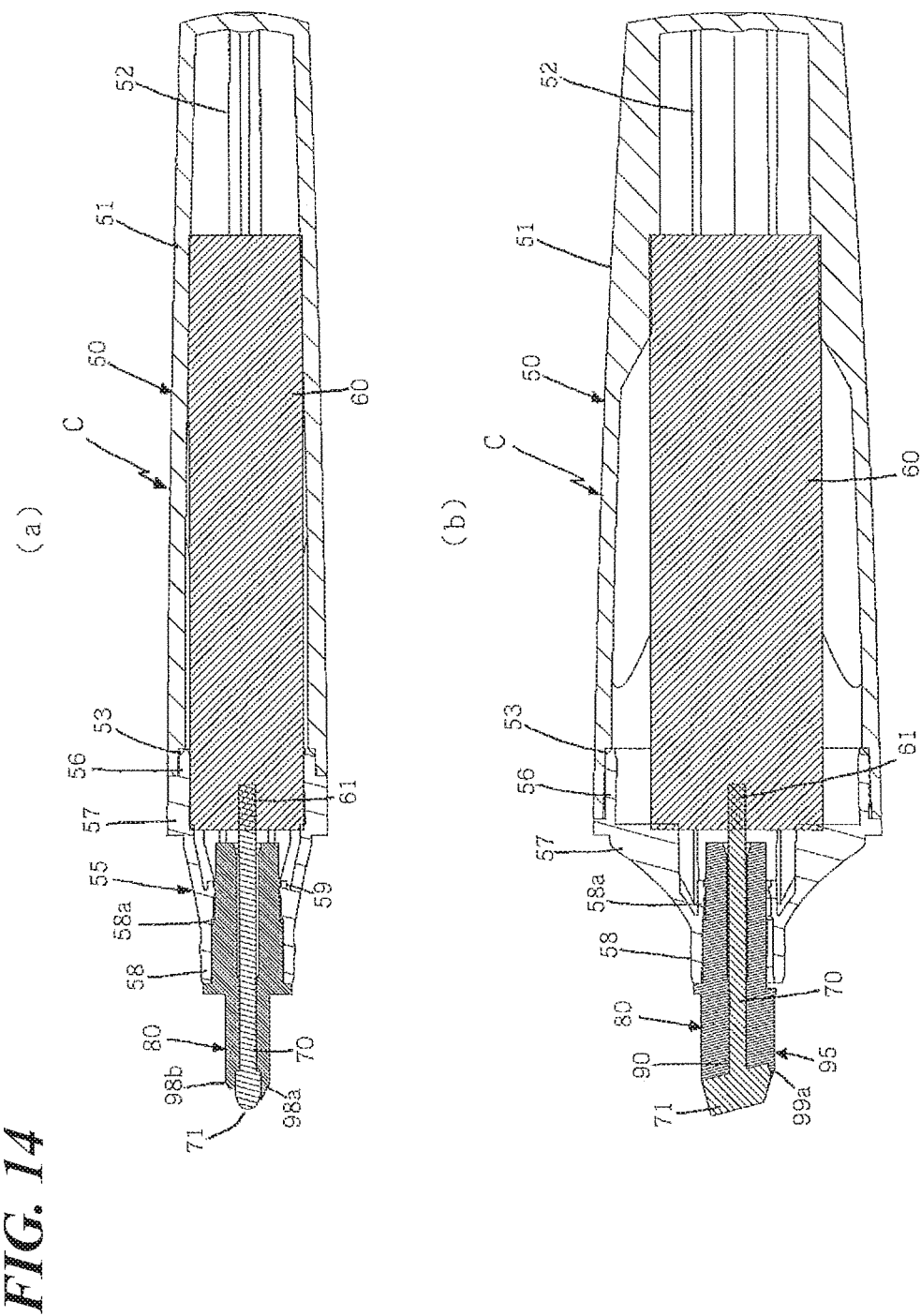
FIG. 14(a) is a central vertical section of the writing instrument in FIG. 13 viewed from top.
FIG. 14(b) is a central vertical section of (a) viewed from the front.
Figure 15:
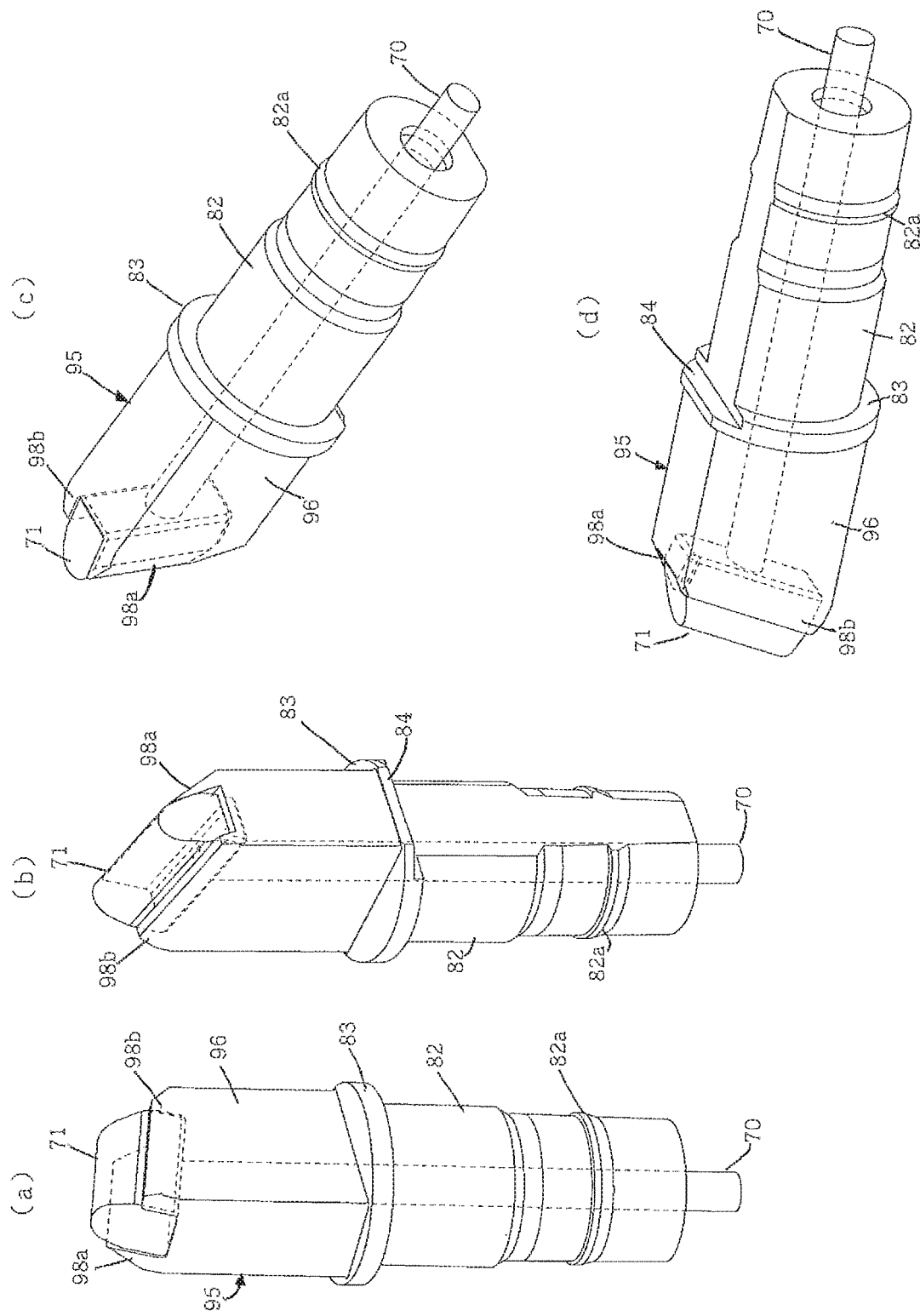
FIGS. 15(a) to 15(d) are drawings showing a writing part (in a state where a writing nib is attached to a retainer) in the writing instrument of FIG. 13, (a) a perspective view as seen from the right side, (b) a perspective view as seen from the left side, (c) a perspective view as seen from the rear side, and (d) a perspective view as seen from the bottom side.
Figure 16:
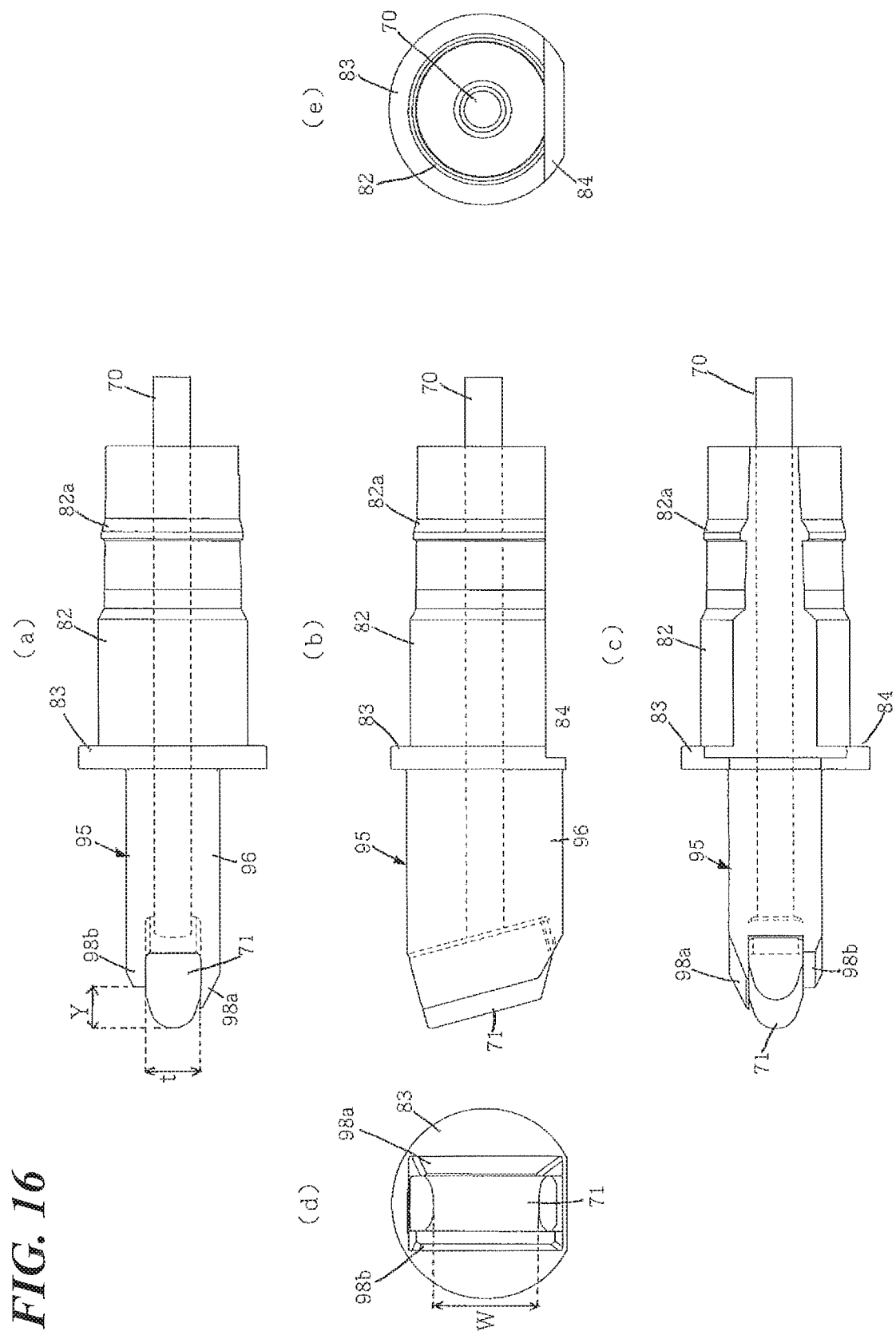
FIGS. 16(a) to 16(e) are drawings showing a writing part (a state where a writing nib is attached to a retainer) in the writing instrument of FIG. 13, (a) a front view, (b) a plan view, (C) a bottom view, (d) a left side view, and (e) a right side view.
Figure 17:
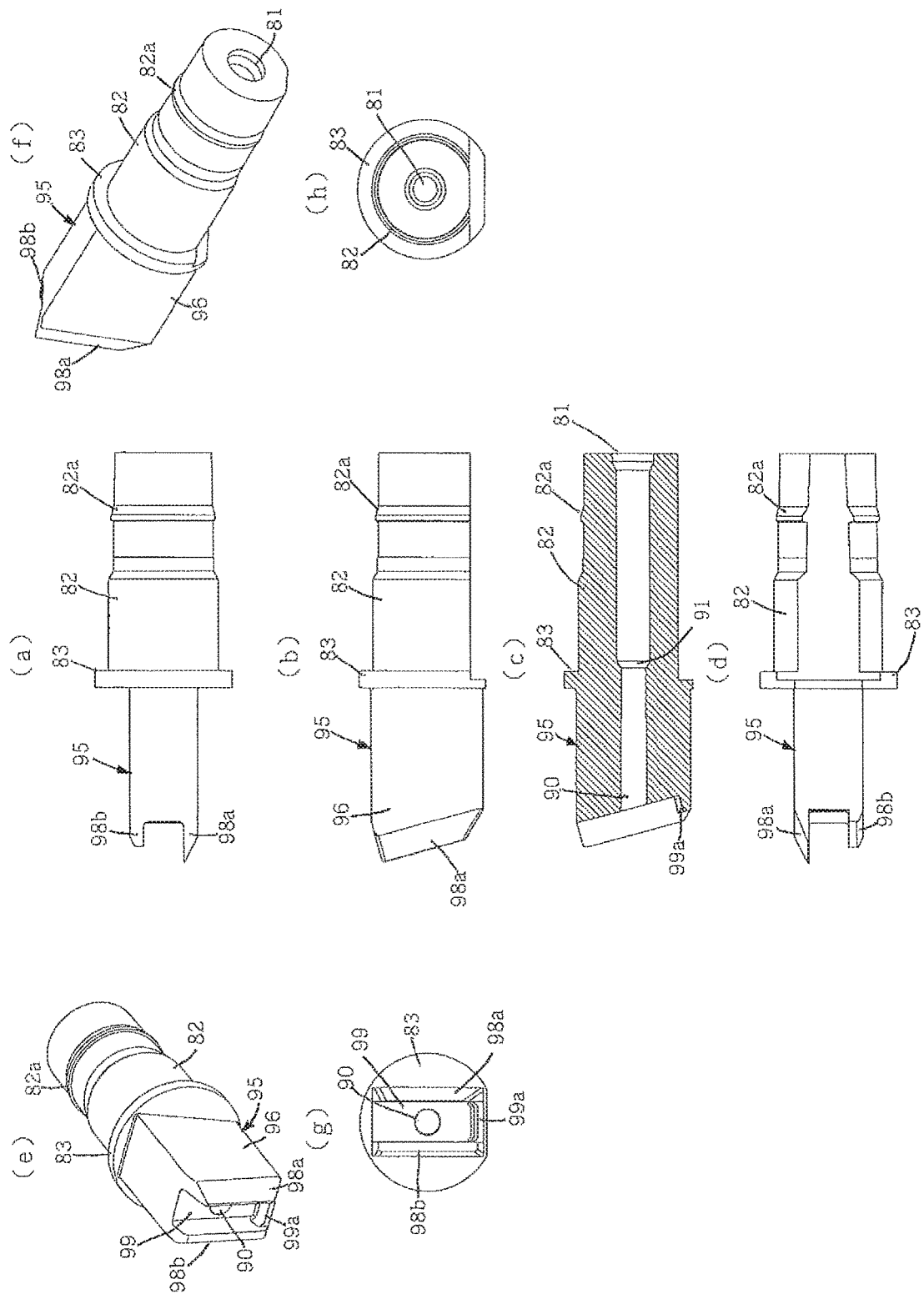
FIGS. 17(a) to 17(h) are drawings showing the retainer before attachment of a writing nib in the writing instrument of FIG. 13, (a) a front view, (b) a plan view, (c) a central vertical section, (d) a bottom view, (e) a perspective view as seen from the front side, (f) a perspective view as seen from the rear side, (g) a left side view, and (h) a right side view.

As shown in FIGS. 13 and 14, the writing instrument C of the present embodiment is a maker pen type writing instrument and includes a barrel cylinder 50 serving as a writing tool body (barrel), an ink absorbent 60, an ink feed core 70 and a pen tip 80.

The barrel cylinder 50 is formed of, for example, thermoplastic resin, thermosetting resin, glass and the like, and includes a tubular rear barrel 51 with a bottom that holds the ink absorbent 60 impregnated with a writing tool ink, and a front barrel 55 for fixing the pen tip 80.

The rear barrel 51 is given as a long oval cylinder (elliptical barrel) with a bottom and made of synthetic resin such as, for example, polypropylene and functions as a writing tool body. The rear barrel 51 has a holding member 52 that is a holding piece for holding the rear end of the ink absorbent 60 and arranged in the interior rear end. The entire rear barrel and the aftermentioned front barrel can be formed to be opaque or transparent (or translucent), and any of them may be adopted from the viewpoint of appearance and practical use. The front barrel 55 is fixed to an opening 53 of the rear barrel 51 by fitting or the like.

The front barrel 55 has, on its rear side, an annular fitting portion 56 to be fitted into the opening 53 of the rear barrel 51, and on its front side, a shoulder portion 57 and a tubular socketing portion 58 for fixing the main part of the pen tip 80. Further, a holding member 59 of a holding piece for holding the front end of the ink absorbent 60 is arranged inside the fitting portion 56. A fitting portion 58a is formed on the rear end side on the inner peripheral surface of the socketing portion 58. The front barrel 55 of this structure is molded of a synthetic resin or the like, composed of such as, for example, polypropylene.

The ink absorbent 60 is impregnated with an ink for a writing instrument such as aqueous ink, oil-based ink, and thermochromic ink. Since the material and the like are the same as those of the ink absorbent 20 described above, the description is omitted. The ink absorbent 60 is accommodated in the rear barrel 51 of the barrel cylinder 50.

The composition of the ink to be impregnated in the ink absorbent 60 is not particularly limited. For an example of an aqueous ink, as a water-based ink composition for a writing instrument that can inhibit drying at the pen tip and is excellent in dryability of drawn lines and low-temperature stability without producing bleeding and strike-through of drawn lines, an ink composition containing, at least, a colorant, 0.5 to 50% by mass of trimethylglycine, 0.5 to 8% by mass of pentaerythritol, and 10% by mass or less of a water-soluble organic solvent and water, and the like can be considered.

Further, for a thermochromic ink composition allowing for decoloration of a drawn line by frictional heat or the like using an eraser, as an ink composition that can surely decolorize with reduced number of times of rubbing hence does not impose excessive burden on the hand, an ink composition can be considered, which contains a thermochromic microcapsule pigment containing at least a leuco dye, a color developer and a discoloration temperature regulator, and at least one kind of particles selected from titanium dioxide, silica particles and silicone resin particles having an average particle size ranging from 50 to 1000 nm. In this ink composition, the thermochromic microcapsule pigment is specified to be 5 to 30% by mass of the total amount of the ink composition, and the mass ratio of the content of the above-mentioned particles to the thermochromic microcapsule pigment is specified to be 1:0.1 to 2, and the total content of the thermochromic microcapsule pigment and the particles is specified to be 60% by mass or less of the total amount of the ink composition. The average particle size can be determined by a particle size analyzer [Microtrac HRA 9320-X100 (manufactured by Nikkiso Co., Ltd.)].

As for the eraser, a material having a hardness of 90 or less by the measurement with the durometer type A defined in the International Rubber Hardness Degree test method (ISO 7267/2) is preferably provided at the end of the barrel or the end of the cap.

The ink feed core 70 integrally has a porous body 71 serving as a writing part at the tip. The porous body 71 serving as the writing part is fixed to the retainer 95 of the pen tip 80. The ink from the ink absorbent 60 is supplied directly to the porous body 71 serving as the writing part. The ink feed core 70 is configured to be fitted into an insert portion 61 on the front side of the ink absorbent 60. In the present embodiment, the ink feed core 70 and the porous body 71 serving as the writing part are not formed as separate members but have an integrated structure.

The integrated structure of this ink feed core 70 and the porous body 71 serving as the writing part may be formed of, similarly to the ink absorbent 60, a fiber bundle, a fiber bundle core formed by bundling felt, a hard sponge, a resin particle porous material such as a resin particle sintered body, a member having continuous pores such as a sliver core. The shape, structure and others of the ink feed core 70 and soon are not particularly limited. For example, the sectional shape of the ink feed core 70 may be circular, oval, square, rectangular, trapezoid, parallelogram, rhombus, a quadrilateral shape other than these, a semi-circular shape, a half moon shape, and the like. The shape of the ink feed core 70 is preferably formed so that the side of the see-through section offering visual recognition of the writing direction is the same as or smaller than the side face, and is more preferably formed in a rectangular shape or an elliptical shape in which a groove is formed on the minor axis side, whereby it is possible to secure the ink outflow without hindering the visibility through the ink feeder 90.

As shown in FIGS. 13 to 16, the pen tip 80 has the porous body 71 to be the writing part (pen nib) integrated with the ink feed core 70, and also has a retainer 95 holding the porous body 71 and formed with a tubular ink feeder 90 in which the ink feed core 70 for supplying ink to the writing part is disposed. Continuously formed on the rear side of the retainer 95 is a main part 82 having a tubular portion to which the ink feed core 70 is inserted. A flange 83 is formed on the outer peripheral side of the main part 82. A cutout step 84 is formed on the bottom side of the flange 83.

Formed on the outer peripheral side of the main part 82 of the pen tip 80 is a fitting projection 82a which is fitted with the fitting portion 58a formed in the socketing portion 58 of the front barrel 55.

The porous body 71 serving as the writing part is fixed to the front end of the retainer 95 and has an integral form with the ink feed core 70, and these are made of, for example, a parallel fiber bundle made of one or a combination of two or more of resins selected from natural fiber, animal hair fiber, polyacetal resin, polyethylene resin, acrylic resin, polyester resin, polyamide resin, polyurethane resin, polyolefin resin, polyvinyl resin, polycarbonate resin, polyether resin, polyphenylene resin and the like, a fiber core obtained by processing a fiber bundle of felt or the like or by resin processing these fiber bundles, a porous body (sintered core) obtained by sintering various plastic powders or the like.

Examples of the external shape of the porous body 71 to be the writing part include a chisel shape, a shell shape, a cylinder, an elliptic cylinder, a cube, a rectangular parallelepiped, and the like. The sectional shape of the porous body may be a trapezoid, a parallelogram, a rhombus, a semicircular shape, a half moon shape and the like. In the present embodiment, the porous body has a chisel shape. The chisel shape is a configuration having its front end formed with a flat inclined facet which is inclined with respect to the center line of the pen barrel.

Further, the porous body 71 to be the writing part is preferably inclined at an angle of 40 to 90° with respect to the longitudinal direction of the main barrel so as to offer an easy-to-write incline. In this embodiment, the inclination is set at 75°.

The shape, inclination and the like of the porous body 71 to be the writing part are appropriately set according to usability for writing and others. Further, the porous body 71 is formed to be the writing part offering a thick line width, preferably a line width of 2 mm or thicker, more preferably a line width of 3 mm or thicker.

Formed inside the retainer 95 is at least one ink feeder 90 for supplying ink to the writing part. In the present embodiment, in view of maximizing the area ratio of the see-through section, in view of efficient supply of ink to the porous body 71 as the writing part, a single ink feeder 90 is arranged so as to penetrate the substantially central portion of the retainer in the longitudinal direction.

The shape, structure, size, number and others of the ink feeder 90 can be appropriately selected as long as the ink impregnated in the ink absorbent 60 of the writing instrument body can be efficiently supplied by capillary action through the ink feed core 70 disposed in the tubular portion and the ink feeder 90 to the porous body 71 to be the writing part integrally provided at the tip of the ink feed core 70.

In particular, from the viewpoint of securing a sufficient amount of outflow for writing to the ink feed core 70 and the visibility through the ink feeder 90, it is desirable that the length of the ink feeder 90 in the axial direction is 3 mm or more. In addition, it is desirable that the total cross-section of the ink feeder 90 in the retainer 95 is 3 mm² or greater.

Though the configuration of the ink feeder 90 is preferably straight toward the writing part side along the axial direction, it may be formed in taper. It is possible to provide two or more ink feeders that are arranged inclined at 0 to 30° with respect to the long axis direction of the main barrel, but provision of only one is preferable.

In the present embodiment, a gap 91 is formed between the ink feed core 70 and the ink feeder 90, and the ink feed core is connected to the porous body 71 to be the writing part with the gap 91 formed. In this way, the gap 91 is filled with ink so that the ink supply through the ink feed core 70 and the ink supply by the capillarity of the gap 91 (free-liquid action), in combination, can make the residual ink quantity visible and make the pen continue drawing for a time after running out of ink. Thereby, this configuration makes it possible to provide a fine external appearance and stabilized quality, and still secure the escape route for air.

It should be noted that the ink feed core 70 may be brought into close (sealing) contact with the ink feeder 90 without forming a gap between the ink feed core 70 and the ink feeder 90. Also in this case, it is possible to provide a fine external appearance and efficiently supply a favorable amount of ink from the ink absorbent 60 to the porous body 71 as the writing part integrally formed with the ink feed core 70 fixed to the retainer 95 in the pen tip.

The retainer 95 has a configuration for forming a see-through section as a whole in other parts than the ink feeder 90 in which the ink feed core 70 is disposed, so that the external four sides (the front, rear and each of side faces) are formed substantially parallel in order to make the writing direction visible.

Further, rib pieces 98a and 98b having different lengths for holding the porous body 71 to be the writing part are provided on both side faces at the top of the retainer 95 while a bottom portion 99 that abuts the bottom face of the porous body 71 is formed between the rib pieces. Formed in the center of the bottom portion is an outlet port of the ink feeder 90. Further, an abutment 99a is arranged on one endface of the aforementioned rib pieces, against which the front endface of the porous body 71 abuts.

The retainer 95 including the main part 82 is formed of a material offering visibility, for example, polypropylene, polyethylene, PET, PEN, nylon (including amorphous nylon and the like in addition to typical nylon such as nylon 6 and nylon 12), acryl, polymethylpentene, polystyrene, ABS and the like, and is preferably composed of a material having a visible light transmittance of 50% or greater.

When a material having a visible light transmittance of less than 50% is used, characters written in the writing direction may not be effectively recognized, which is not preferable. A material that transmits 50% or greater is preferable in order to exhibit a further good visibility, and if the visible light transmittance is 80% or higher, a further favorable visibility can be obtained. The visible light transmittance can be determined by measuring the reflectance using a multi-illuminant colorimeter.

The retainer 95 can be formed by using one kind selected from the above-mentioned materials or using two or more kinds of materials in view of further improvement of durability, visibility, and so on. When the retainer is composed of two or more kinds of materials, it is preferable that at least one of them is a material having a visible light transmittance of 50% or higher, and the retainer can be molded by various molding methods such as injection molding and blow molding.

In this embodiment, similarly to the above-described writing instruments A and B, as shown in FIG. 16(a) the protrusion amount Y from the retainer 95 on the distal side of the porous body 71 to be the writing nib is specified to be 0.65 mm or more and 1.05 mm or less. This specification on the distal side of porous body 71 to be the writing nib creates a structure enabling the protrusion amount Y to press against the writing nib within the interior facet of the retainer as much as possible even if writing is performed with a heavy writing load. As a result it is possible to provide excellent durability without impairing writing performance while preventing the writing nib from being damaged. If the protrusion amount Y is smaller than 0.65 mm, there is a risk that writing can not be performed due to interference of the retainer when the pen element used is laid down for writing. In contrast, if the protrusion amount Y is greater than 1.05 mm, there is a risk that the writing performance is impaired by a heavy writing load. It should be noted that W shown in FIG. 16(d) is the writing nib width, and it is preferable that the protrusion amount Y is 0.65 mm or more and 1.05 mm or less, and less than 50% of the writing nib width X.

In the present embodiment, similar to FIGS. 9(e) and 9(g) above, the protrusion amount Y of the porous body 71 to be the writing part, from the retainer 40 on the distal side differs in the right and the left (top and bottom in the drawing), but in the present invention, the greater protrusion amount is assumed as Y. Similarly to the above embodiment, the protrusion amount Y is specified to be 0.65 mm or more and 1.05 mm or less and/or 40 to 65% of the writing nib thickness t.

In the present embodiment, when handwriting is performed from left to right (in the lateral direction) by the right hand, and also in writing in the vertical direction without changing the orientation of the page to be written, it is possible to draw lines with the protruding part (with the protrusion amount Y). Further, since the rib pieces 98a and 98b having different lengths can reliably hold (protect) the distal side of the writing nib, this configuration provides a structure that presses against the porous body 71 to be the writing part within the interior facet of the retainer as much as possible, without impairing writing performance even if writing is performed with a heavy writing load, whereby it is possible to provide a writing instrument which is excellent in durability while preventing the writing nib from being damaged, as with the writing instrument of the embodiment of FIGS. 1 to 5.

Further, in the present invention, in addition to the above embodiment, it is also possible to achieve the effect of the present invention as with the above-described writing instruments A and B, by specifying the protrusion amount Y on the distal side of the writing nib from the retainer at 40 to 65% of the writing nib's thickness t. Specifying the protrusion amount Y on the distal side of the writing nib at 40 to 65% (Y/t is 40 to 65%) of the writing nib's thickness t provides a structure that enables the protrusion amount Y on the distal side of the porous body 71 to be the writing part, to further retain the strength of the writing nib thanks to its relationship with the writing nib's thickness and to press against the writing nib within the interior facet of the retainer as much as possible even if writing is performed with a heavy writing load. As a result it is possible to achieve excellent durability without impairing writing performance while preventing the writing nib from being damaged. More preferably, the protrusion amount Y on the distal side of the porous body 71 to be the writing part is preferably 48 to 58% of the writing nib's thickness t. If this protrusion amount Y is less than 40% of the writing nib's thickness t, there occurs a risk that the writing performance is impaired by a heavy writing load, whereas if it exceeds 65%, the retainer becomes thick, which makes it difficult to see the paper surface when writing is performed. Note that W shown in FIG. 16(d) is the writing nib width, and it is preferable that the protrusion amount Y is 40% to 65% of the writing nib's thickness t and is less than 50% of the writing nib width W (Y/W is less than 50%).

As a particularly preferred embodiment, specifying the protrusion amount Y on the distal side of the writing nib from the retainer at 0.65 mm or more and 1.05 mm or less and at 40 to 65% of the writing nib thickness t, can promote the effect of the present invention in a synergistic manner, as with the above-described writing instruments A and B.

Moreover, in the writing instrument C, when the protrusion amount Y on the distal side of the porous body 71 to be the writing nib from the retainer 80 is not limited to 0.65 mm or more and 1.05 mm or less, but is specified to be 40 to 65% of the writing nib's thickness t, the effect of the present invention can be obtained. That is, also in this embodiment, by setting the protrusion amount Y on the distal side of the writing nib at 40 to 65% of the writing nib's thickness t, it is possible to provide a structure that enables the protrusion amount Y on the distal side of the writing nib 30 to further retain the strength of the writing nib thanks to its relationship with the writing nib's thickness and to press against the writing nib within the interior facet of the retainer as much as possible even if writing is performed with a heavy writing load, hence it is possible to provide a writing instrument that can prevent breakage of the writing nib and is excellent in durability.

Furthermore, in the writing instrument C, the retainer 80 with the porous body 71 to be the writing nib fixed thereto is made of a material offering visibility as described above, so that the retainer 80 allows the user to observe the direction of writing. Thus, it is possible to provide a writing instrument that can provide sufficient visibility to read the characters written in the drawing direction and can be used until the end of a brush-stroke.

Figure 18:
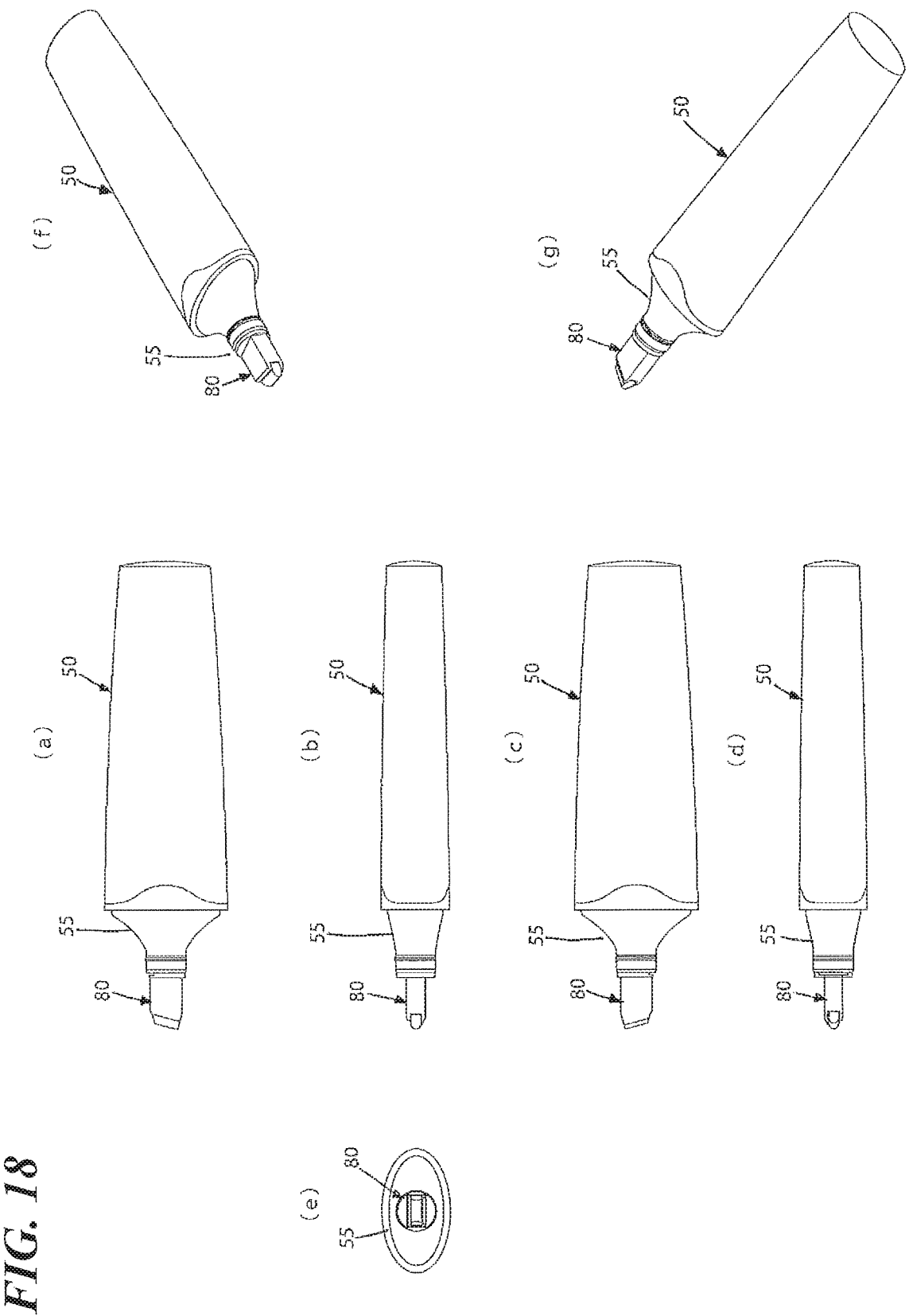
FIG. 18(a) to 18(g) are drawings showing the writing instrument of FIG. 13, (a) a front view, (b) a plan view, (c) a rear view, (d) a bottom view, (e) a left side view, (f) a perspective view as seen from the front side, and (g) a perspective view as seen from the central side.
Figure 19:
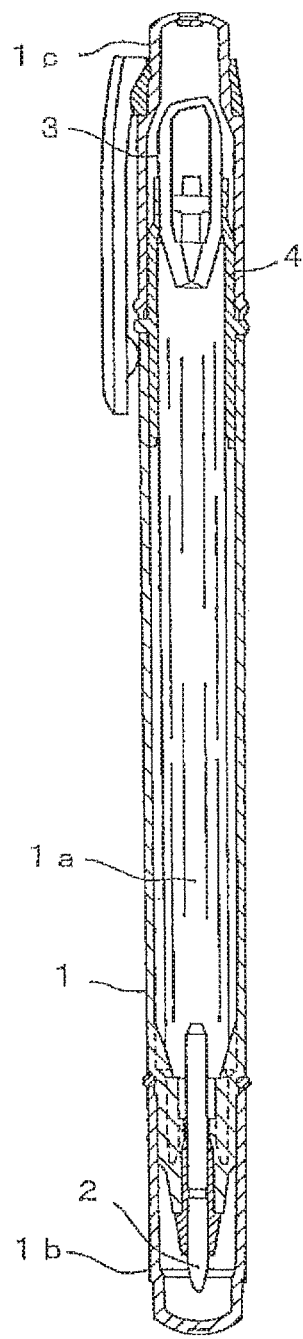
FIG. 19 illustrates an example of a conventional writing instrument, (a) a vertical section, and (b) a partial front view showing a state in which a writing nib is attached to a retainer.
Figure 19:
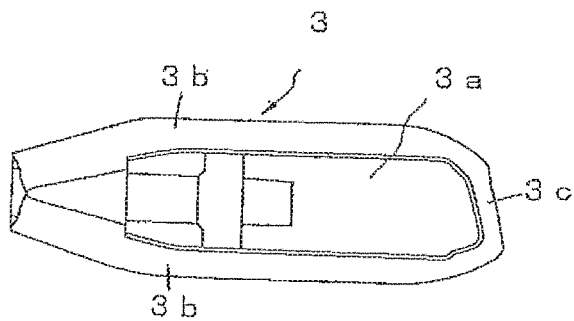
Figure 20:
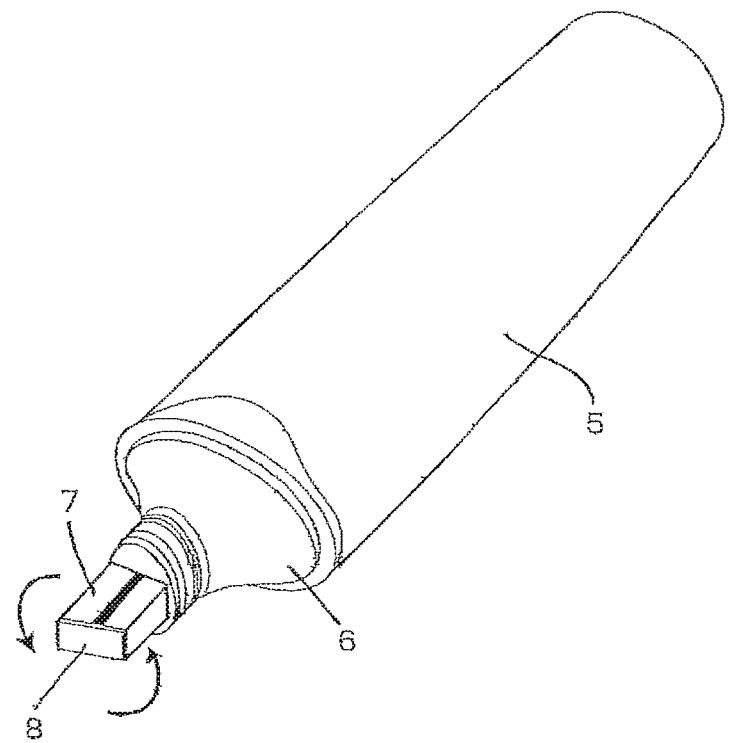
FIG. 20 illustrates another example of a conventional writing instrument, (a) a perspective view as seen from the front side, and (b) a perspective view as seen from the rear side.
Figure 20:
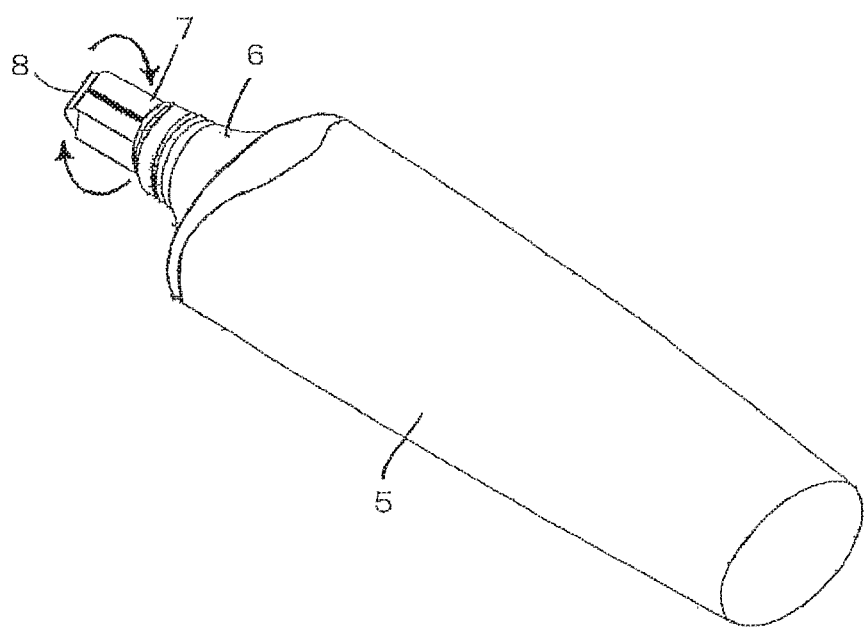

FIG. 18 illustrates an example of a state of a writing instrument (with its cap removed) as a whole according to the present embodiment.

In the writing instrument C of this embodiment, the ink absorbent 60 that carries ink in the rear barrel 51 constituting the barrel cylinder 50 of the writing instrument, the pen tip 80 to which the ink feed core 70 and the porous body 71 serving as the writing part are attached and the front barrel 55 are successively attached by fitting or the like, whereby the writing instrument C can be easily produced.

In the writing instrument C of the present embodiment thus configured, the ink feeder 90 is formed in the substantial center of the retainer 95 while the ink feed core 70 impregnated with ink is arranged inside the ink feeder 90, so that the ink impregnated in the ink absorbent 20 can be efficiently supplied by capillary action to the porous body 71 serving as the writing part integrally formed at the tip of the ink feed core 70. Further, provision of the ink feed core 70 in the ink feeder 90 allows easy assembly and can prevent the ink feed core 70 from being dislodged or dropped as well as preventing ink starvation even if a strong impact such as an impact from falling, or the like acts on the writing instrument.

Particularly, by forming the ink feeder 90 in the substantial center in the longitudinal direction inside the retainer 95, it is possible to efficiently and uniformly supply the ink to the porous body 71 to be the writing part, so that it is possible to provide a writing instrument that can be used until the end of a brush-stroke. In addition, formation of the ink feeder 90 in the substantial central in the longitudinal direction of the retainer 95 can offer a configuration that allows for easy fixing of the writing direction and comfortable writing. Furthermore, provision of the rib pieces 98a and 98b in the upper part of the retainer 95 makes it possible to draw a straight line or the like using a ruler without staining the ruler.

The writing instrument of the present invention is not limited to the above-described embodiments and others, and various modifications can be made within a range not departing from the technical idea of the present invention.

For example, in the writing instruments of FIGS. 5 to 10 and 11, when the writing nib 30 and the retainer 40 in the form of FIG. 12 described above is used, that is, when the writing nib 30 is formed of materials having different particle size distributions, in order to more reliably protect the boundary (strength boundary Z1) between the ink feeders 31, 31 and the writing part 32, the boundary Z1 may be formed, as described above, to be held (protected) inside the front retaining parts 44a and 44b so as to further improve the durability of the writing nib 30 including the writing part 32, also in the writing instruments of FIGS. 5 to 10 and 11.

In addition, in the above embodiment, the writing nib 30 of a sintered core type has been detailed, but the writing nib 30 may be a fiber bundle body, a foam body, a spongy body, a felt body, and so on, instead of a sintered body, as mentioned above. When the writing nib 30 is be made of a fiber bundle, a foam body or the like, a material having a low porosity or a low expansion ratio (having a high density) may be used for the writing part 32 while another material having a high porosity or a high expansion ratio (having a low density) may be used for the ink feeders 31, 31 to provide the writing core (fiber bundle core) 30, whereby it is possible to improve the strength of the writing part 32 of the writing nib 30, similarly to the above-described writing nib formed in combination of materials having different particle size distributions. Here, when the above writing nib 30 is replaced by each of the above forms (strength, porosity, expansion ratio and others of fiber bundle, foam material, spongy material, felt material), a favorable amount of ink with no ink starvation can be supplied without causing any failure in the ink supply mechanism from the ink absorbent 12 to the writing part 32.

Further, though each of the above-described embodiment modes illustrates a writing instrument of a type (sliver type) in which ink stored in the ink absorbent 20 is efficiently supplied to the writing part 32 of the writing nib 30 by capillary force, the invention may also be applied to a writing instrument having a valve mechanism, for example, a writing instrument which includes an ink chamber with free ink stored therein, arranged inside a barrel body forming the writing tool body, and a valve mechanism disposed between the ink chamber and the writing nib, and delivers and supplies ink to the writing nib by releasing the valve while opposing the repulsive force of a spring in the valve mechanism as the valve rod is moved back by pressing motion of the pen tip.

Furthermore, the above embodiments have been described on single-ended writing instruments having the writing nib 30 as a single pen tip, but the above configuration can be applied to a double-ended writing instrument which further has a pen element of a fine type writing nib at the end of the rear barrel and supplies the ink in the ink absorbent 20 to the pen element.

In the writing instrument C of the above embodiment, the barrel sleeve of the main body of the writing instrument is formed as an elliptical barrel, but it may have a triangular shape, an irregular shape such as quadrangular rectangular shapes and others, or a regular circular shape.

In the writing instrument C of the above embodiment, ink is supplied from the ink absorbent 20 to the porous body 71 serving as the writing part by a single part, i.e., ink feed core 70. However, two parts, for example, a relaying porous body arranged from the ink absorbent 70 to a cylindrical portion 81 and an ink feed core similar to the ink feed core, arranged inside the ink feeder 90, may be used to supply ink from the ink absorbent to the porous body to be the writing part.

Furthermore, each of the above-described embodiments has been described when used with ink for writing instruments (water-based ink, oil-based ink, thermochromic ink). However, liquid cosmetic, liquid medicine, application liquid, correction liquid and other fluids may be used in combination with a pen tip prepared of a porous body suitable as the applying part for the associated fluid.

For the above-described writing instruments shown in FIG. 1 to FIG. 20, preferable configurations include writing instruments listed below.

A preferable writing instrument is one which has a writing part formed of, at least, a writing nib of a porous body and a retainer holding the writing nib and is characterized in that the protrusion amount on the distal side of the writing nib from the retainer is equal to 0.65 mm or more and is not greater than 1.05 mm.

A preferable writing instrument is one which has a writing part formed of, at least, a writing nib of a porous body and a retainer holding the writing nib and is characterized in that the protrusion amount on the distal side of the writing nib from the retainer is equal to 40% or greater and is not greater than 65% of the thickness of the writing nib.

A preferable writing instrument is one which has a writing part formed of, at least, a writing nib of a porous body and a retainer holding the writing nib and is characterized in that the protrusion amount on the distal side of the writing nib from the retainer is equal to 0.65 mm or more and is not greater than 1.05 mm and is equal to 40% or greater and is not greater than 65% of the thickness of the writing nib.

It is preferable that the protrusion amount of the writing nib from the endface of the retainer is different between the left and the right.

It is preferable that the retainer is formed such that the endface of the retainer on the opposite side of the writing direction protrudes more than the endface of the retainer on the writing direction side.

It is preferable that the writing nib is formed by combining materials having different particle size distributions.

Next, FIGS. 21 to 24 show another embodied example of a writing instrument of the present invention.

A writing instrument according to this embodiment is one which has a writing part formed of, at least, a writing nib of a porous body and a retainer holding the writing nib and is characterized in that when the writing nib before deformation is attached to the retainer, the writing nib is deformed into a shape that surrounds the form of the retainer and closely retained by the retainer.

It is preferable that the writing nib includes an ink feeder and a writing part for leading ink from the ink feeder, and the writing part is deformed from a flat shape into an inclined shape by plastic working.

Further, a manufacturing method of this embodiment is a writing instrument manufacturing method for manufacturing a writing instrument having a writing part formed of, at least, a writing nib of a porous body and a retainer holding the writing nib, and comprises the steps of attaching the writing nib before deformation to the retainer, and deforming the writing nib into a shape that surrounds the form of the retainer by plastic working to make the retainer closely retain the writing nib.

Hereinafter, the writing instrument of the above embodiment will be described in detail.

Figure 21:
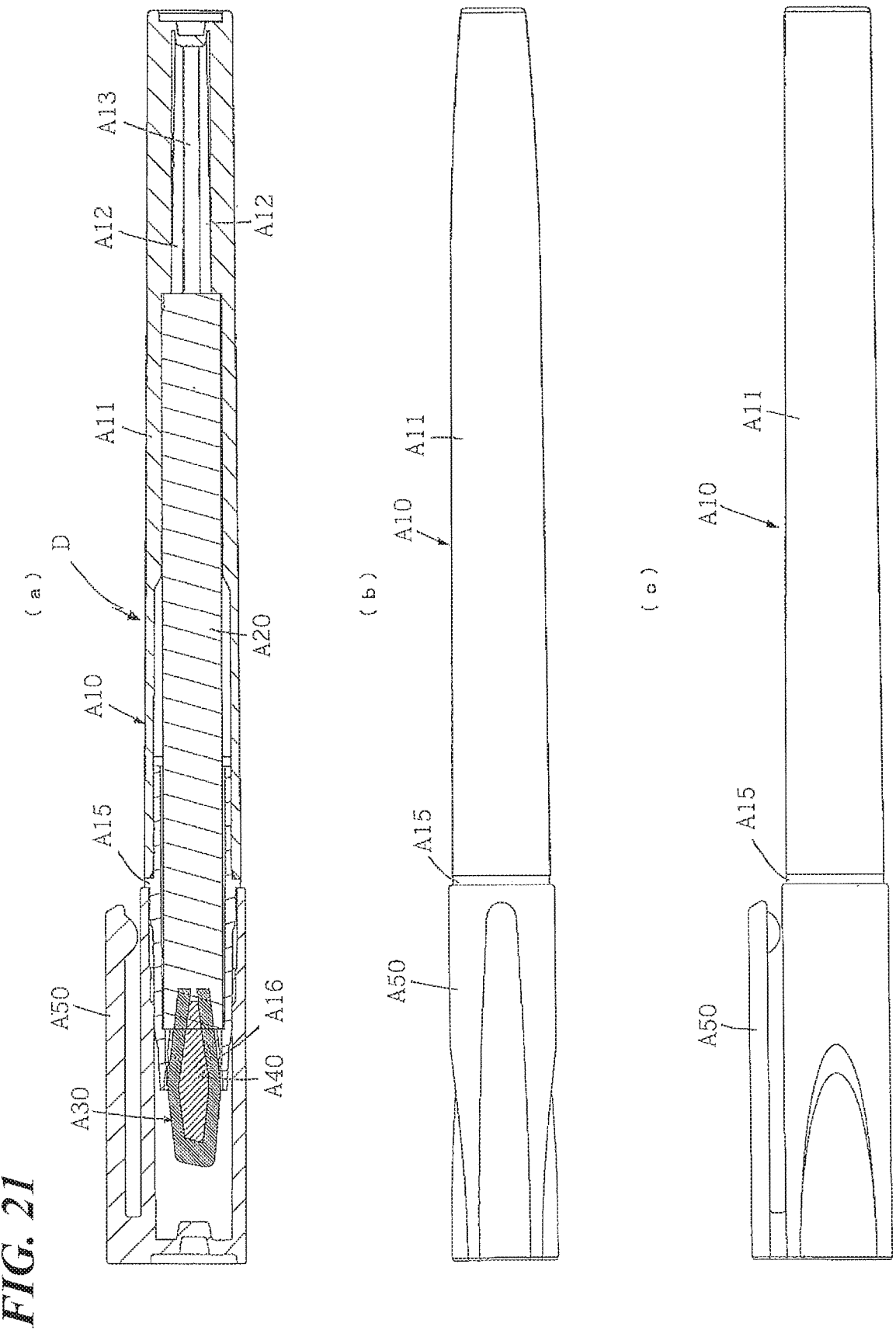
FIG. 21 illustrates another example of an embodiment of a writing instrument of the present invention, (a) a vertical section, (b) a plan view, and (c) a front view.
Figure 22:
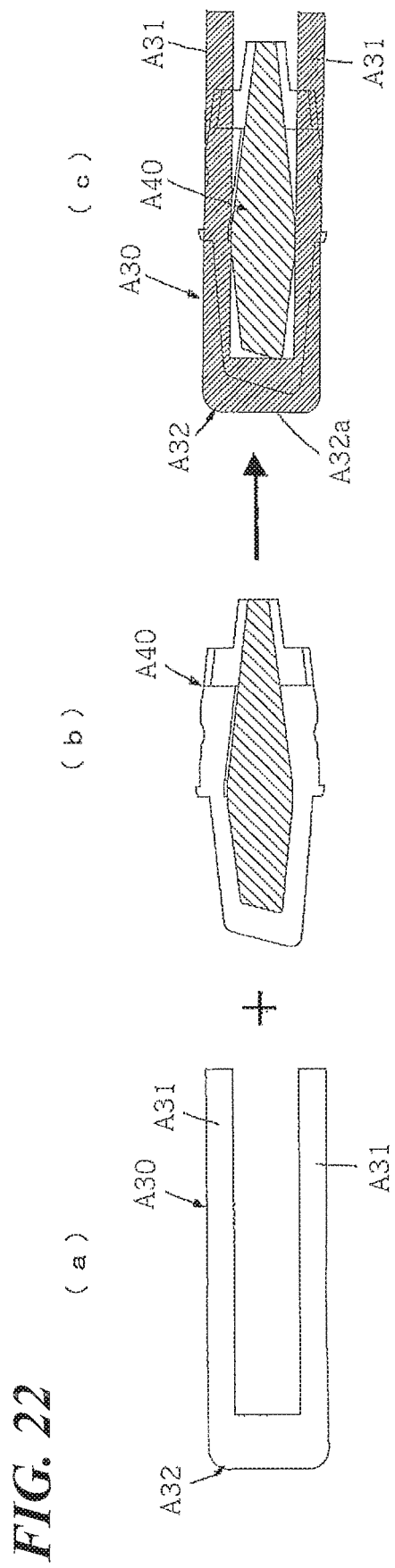
FIG. 22 illustrates a process of attaching a writing nib to a retainer, (a) a front view of the writing nib before deformation, (b) a vertical section of the retainer with the writing nib attached thereto, (c) a vertical section showing a state where the writing nib, before deformation (before plastic working), is attached to the retainer.
Figure 23:
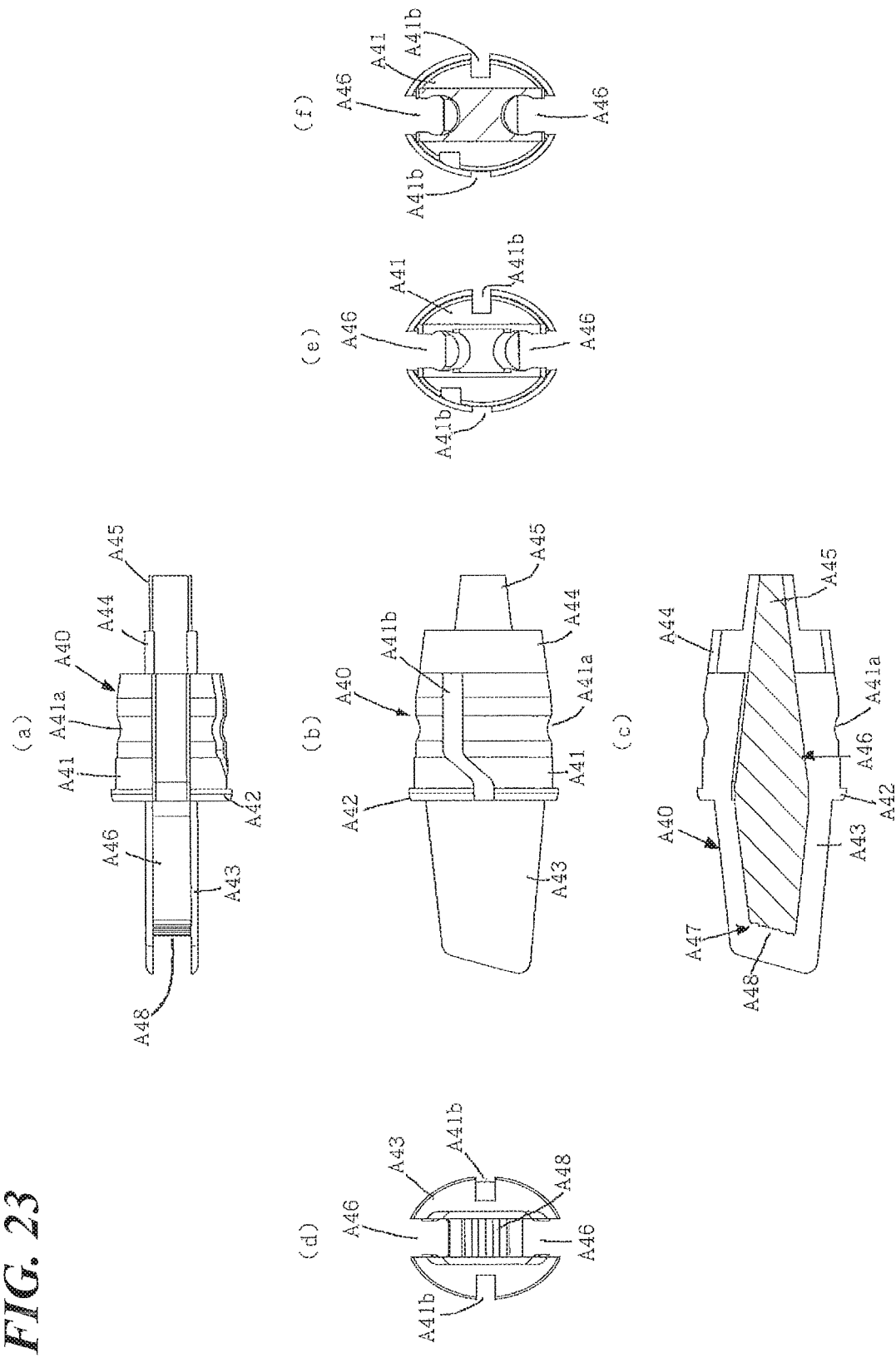
FIGS. 23(a) to 23(f) are diagrams showing an example of a retainer, (a) a plan view, (b) a front view, (c) a vertical section, (d) a left side view, (e) a right side view, and (f) a cross section at the center.
Figure 24:
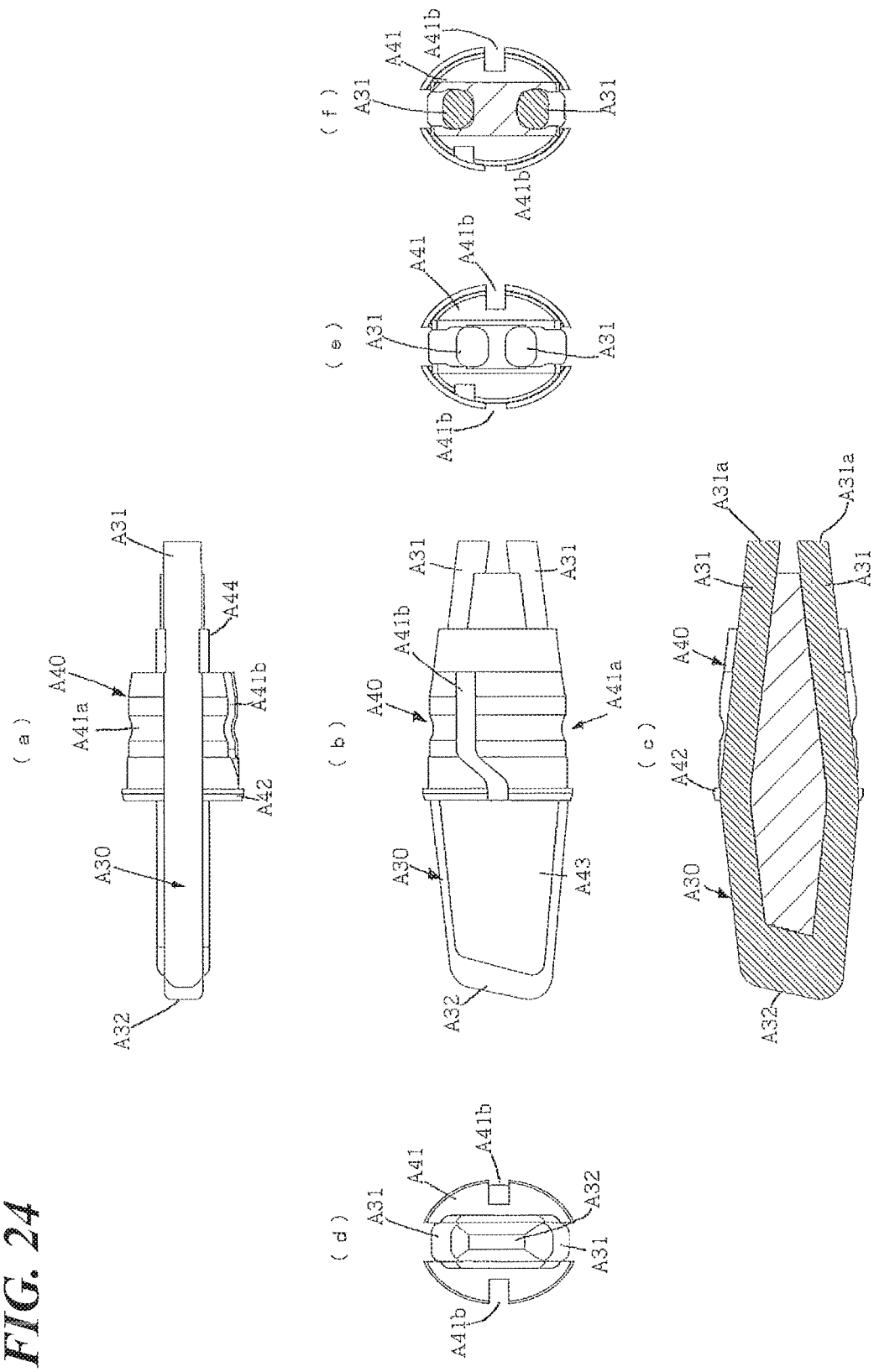
FIGS. 24(a) to 24(f) are drawings showing an example of a state in which a writing nib is attached to a retainer, (a) a plan view, (b) a front view, (c) a vertical section (d) a left side view, (e) a right side view, and (f) a cross section at the center.
Figure 25:
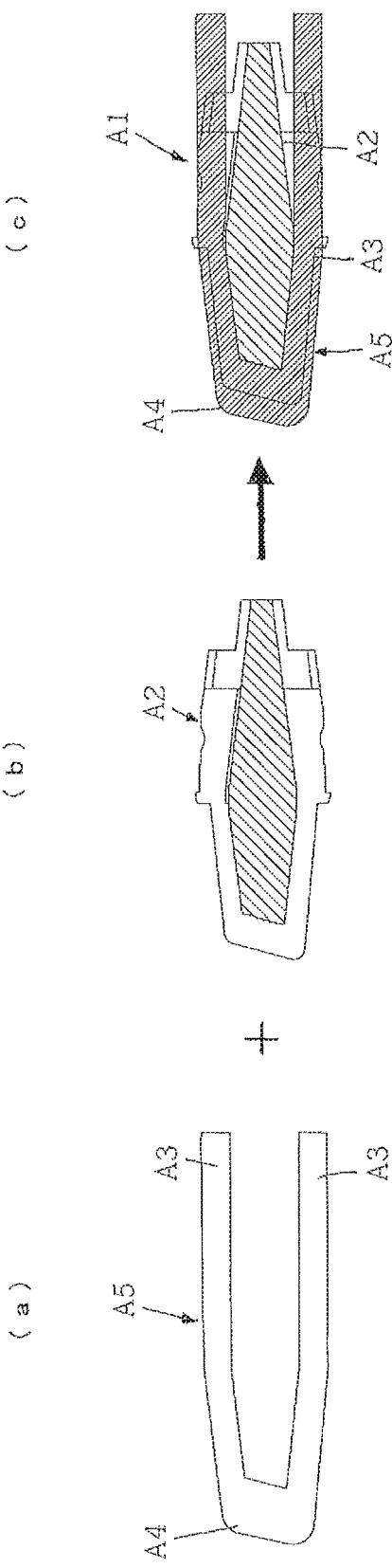
FIG. 25 illustrates a process of attaching a writing nib to a retainer in a conventional writing instrument, (a) a front view of the writing nib formed in a mounting surface shape of the retainer, (b) a vertical section of the retainer for attaching the writing nib, and (c) a vertical section showing a state in which the writing nib of (a) is attached to the retainer.

FIGS. 21(*a*) to 21(*c*) are a vertical section, plan view, and front view of a writing instrument, respectively. FIG. 22 is a view showing a step of attaching a writing nib to a retainer. FIGS. 23(*a*) to 23(*f*) are different views showing one example of a retainer. FIGS. 24(*a*) to 24(*f*) are different views showing one example of a retainer attached to a writing nib.

As shown in FIG. 21, a writing instrument D of the present embodiment includes a barrel body A10 to be the main part of the writing instrument, an ink absorbent A20, a writing nib A30, a retainer A40 and a cap A50.

As shown in FIG. 21(*a*), the barrel body A10 is made of, for example, a thermoplastic resin, a thermosetting resin, or the like, and has a bottomed rear barrel A11 for housing the ink absorbent A20 impregnated with writing ink and a front barrel A15 for fixing the retainer A40 to which the writing nib A30 serving as a pen tip is attached.

The rear barrel A11 is molded in a bottomed cylindrical shape using a resin such as polypropylene and functions as the main body (barrel body) of the writing instrument. As shown in FIG. 21(*c*), the rear barrel A11 has a holding member A13 formed of retaining pieces A12, A12 . . . for retaining the rear end of the ink absorbent A20 inside at the rear end side thereof, and the whole rear barrel and an aftermentioned front barrel are formed with opaque or transparent (or translucent) material. Any of them may be adopted in view of appearance and practical use. Further, the front barrel A15 is fixed to the front side of the rear barrel A11 by fitting or the like. In the case where a thermochromic ink is used for the writing ink, it is preferable to form a thermoplastic elastomer on the outer surface or the rear end of the rear barrel A11 so as to easily generate frictional heat by a rubbing operation.

The front barrel A15 is formed with a fitting projection A16 for fixing the main part A41 of the retainer A40 fixing the writing nib A30 described below. The front barrel A15 having this structure is molded of a resin such as polypropylene (PP).

The ink absorbent A20 is impregnated with an writing ink such as an aqueous ink, an oil-based ink or the like, and examples include fiber bundles made of one or a combination of two or more selected from natural fiber, animal hair fiber, polyacetal resin, acrylic resin, polyester resin, polyamide resin, polyurethane resin, polyolefin resin, polyvinyl resin, polycarbonate resin, polyether resin, polyphenylene resin and the like, processed fiber bundles such as felt, as well as porous bodies such as sponge, resin particles, sintered bodies and the like. The ink absorbent A20 is accommodated and held in the rear barrel A11 which is the main part of the barrel body A10.

The ink composition to be used is not particularly limited, and a suitable blended formulation such as an aqueous ink, an oil-based ink, a thermochromic ink and the like can be selected according to the utility and others of the writing instrument. For example, fluorescent dyes such as basic violet 11, basic yellow 40, thermochromic microcapsule pigment and the like can be contained for underlining pens and so on.

As shown in FIG. 22(*a*), the writing nib A30 before deformation to be attached to the retainer A40 has a generally rectangular U-shaped cross section, and includes ink feeders A31, A31 and a writing part A32 for leading ink from the feeders A31, A31. The ink feeders A31, A31 before deformation are linear, and the bottom face (writing surface) A32*a* of the writing part A32 is a parallel plane.

The writing nib A30 is composed of porous material, and examples include parallel fiber bundles made of one or a combination of two or more selected from natural fiber, animal hair fiber, polyacetal resin, polyethylene resin, acrylic resin, polyester resin, polyamide resin, polyurethane resin, polyolefin resin, polyvinyl resin, polycarbonate resin, polyether resin, polyphenylene resin and the like, a fiber core obtained by processing a fiber bundle of felt or the like or by resin processing these fiber bundles, a porous body (sintered core) obtained by sintering plastic powder such as thermoplastic resin such as polyolefin resin, acrylic resin, polyester resin, polyamide resin and polyurethane resin.

The writing nib A30 is preferably formed of a fiber bundle core, a fiber core, a sintered core, a felt core, a sponge core, an inorganic porous body core, and particularly and preferably, a sintered core is desirable from the viewpoint of deformability and productivity.

In addition, the porosity, size, hardness and the like of the writing nib A30 used should vary depending on the ink type, the type of the writing instrument and others. For example, it is preferable that the porosity is 30 to 60%. In the present embodiment, the writing nib is formed of a sintered core (sintered body) having a porosity of 55% obtained by sintering a polyethylene powder having an average particle size of 200 μm. The average particle size is an average value of the diameters of the measured particles by an electron microscope and the average value of the particle diameters measured for 20 particles in the image projected on the electron microscope. When the particle is not circular, the value obtained by dividing by two the sum of the length of the longest line segment and the length of the shortest line segment of the line segments connecting any two points on the outline forming pores is used as the particle size of the particle.

On the other hand, the porosity is calculated as follows. First, a writing nib having a known mass and apparent volume is immersed in water so that sufficient water is infiltrated. Then the mass is measured after being taken out from water. From the measured mass, the volume of water immersed in the writing nib is derived. The porosity is calculated from the following formula (A) assuming that the volume of water is the same as the volume of pores in the writing nib.

Porosity(unit: %)=(volume of water)/(apparent volume of writing nib)×100 (A)

As shown in FIG. 22(*b*) and FIGS. 23(*a*) to 23(*f*), the retainer A40 includes a substantially elliptical cylinder-like main part A41, a flange A42 and a see-through section A43 allowing for visual recognition of the writing direction on the front side of the main part A41, as well as having a rear retaining part A45 with retaining pieces A44 connected to the main part A41 on the rear side of the main part A41. In the thus configured retainer A40, a holding groove A46 for receiving and holding the U-shaped writing nib A30 before deformation, is formed on the entire circumferential surface in the longitudinal direction of the retainer A40.

In addition, a fitting recess A41*a* is formed on the outer peripheral surface in the width direction of the main part A41, and air vent grooves A41*b*, A41*b* are formed on the outer peripheral surface in the longitudinal direction.

In this configuration, in order to securely hold the writing part A32 and prevent it from slipping off during writing or the like, a non-smooth surface part A48 of minute jagged steps is formed on the front face, designated at the front face A47, of the holding groove A46, which forms the portion in contact with the writing part A32 of the writing nib A30.

The entire retainer A40 thus configured is molded of a material having visibility and flexibility, for example, PP, PE, PET, PEN, nylon (including amorphous nylon and the like in addition to general nylon such as nylon 6 and nylon 12), acryl, polymethylpentene, polystyrene, ABS and the like, so as to allow for effective recognition of characters written in the writing direction through the see-through section A43. It should be noted that only the see-through section A43 may be made of a material having visibility.

In addition, the retainer A40 may be configured by using one kind from the above materials or using two or more kinds of the materials from the viewpoint of further improvement of durability, visibility, and so on, and may be formed by various molding methods such as injection molding, blow molding and the like.

In the present invention, the writing nib A30 before deformation shown in FIG. 22(*a*) is attached to the retainer A40 having the above structure [FIG. 22(*c*)] and is deformed by plastic working to form the writing nib A30 which, as shown in FIG. 24(*c*), conforms to the shape of the retainer A40, whereby the writing nib A30 closely held on the retainer A40 is obtained.

In the present invention, "plastic working (plastic treatment)" means a process (treatment) of permanently setting the writing nib A30 by applying external force and/or heat exceeding the elastic deformation range of the writing nib A30. For example, heat treatment, pressure treatment, pressing treatment, pulling treatment and combination of these.

Preferably, the plastic working is performed by a pressing treatment, more preferably by combination of a pressing treatment and a heat treatment. As an example of plastic working, when the writing nib A30 is formed of, as described above, a fiber bundle made of thermoplastic resin such as polyolefin resin, acrylic resin, polyester resin, polyamide resin and polyurethane resin, a fiber core obtained by processing a fiber bundle of felt or the like or by resin processing these fiber bundles, or a sintered core, it is preferable that heat treatment is performed in a heat treatment temperature range for setting the writing nib A30 conforming to the shape of retainer A40 without impairing the characteristics (porosity and the like) of the writing nib A30, the shape and physical properties of the retainer A40. Specifically, it is preferable that the heat treatment is performed at a temperature equal to or lower than the lower melting temperature (melting point) of the melting temperatures (melting points) of the writing nib A30 and the retainer A40. More preferably, the temperature is set to be 10° C. to 50° C. lower than the lower melting temperature (melting point) of each of the melting temperatures (melting points) of the writing nib A30 and the retainer A40.

The specific heat treatment temperature and others vary depending on the structures and materials of the writing nib A30 and the retainer A40. For example, when the writing nib A30 shown in FIG. 22(a) is a sintered core (sintered body) composed of polyethylene powder while the retainer A40 shown in FIG. 22(b) is formed of an acrylic resin, the writing nib A30 conforming to the shape of the retainer A40 can be formed by heat treatment for plastic working in a temperature range of 110 to 180° C., whereby it is possible to obtain a product with the writing nib A30 closely held by (fixed to) the retainer A40.

As the specific heat treatment method, hot air blowing, passing through a heating furnace, heating by far infrared irradiation and the like can be used.

In the present embodiment, as shown in FIG. 22(c) and FIGS. 24(a) to 24(f), the writing nib A30 before deformation shown in FIG. 22(a) has the writing part 32A formed in an inclined shape (knife-cut shape) while the ink feeders A31, A31 are bent at the center by fitting so that the spacing between the ink feeders A31, A31 is narrowed to hold tightly (fixing) on the rear side. In the present embodiment, the writing nib A30 is configured to be reliably fixed to the holding groove A46 of the retainer A40 by plastic working, the holding groove structure or other methods. In the present embodiment, the writing nib is positively fixed by plastic working and fitting without use of any adhesive or the like while the front face A47 of the holding groove A46 or the portion in contact with the writing part A32 of the writing nib A30 is formed with the non-smooth surface part A48 with minute jagged steps in order to securely hold the writing part A32 and prevent it from slipping off during writing or the like, so that the writing nib A30 after deformation can be securely fixed to the holding groove A46 of the retainer A40.

The width of the writing nib A30 after being attached by plastic working is preferably 0.50 mm or more, particularly and preferably 1.00 to 3.00 mm, from the viewpoint of securing a sufficient writing flow rate.

In the present embodiment, the writing part A32 after being attached by plastic working is in an inclined shape (knife-cut shape). This inclination and the like are appropriately designed according to writing usability and other factors. In this case, the inclination can be adjusted by appropriately changing the shape of the retainer A40. In addition, the writing part A32 has a writing part having a thick line width, preferably having a line width of 1 mm or more, more preferably having a line width of 2 mm or more.

When the retainer A40 [FIG. 22(c), FIGS. 24(a) to 24(f)] fixed with the writing nib A30 is inserted into the front barrel A15, the fitting recess A41a on the retainer A40 mates with the fitting projection A16 of the front barrel A15 so that the writing nib A30 is attached (fixed) to the barrel body A10 of the writing instrument via the retainer A40 while the rear end portions A31a, A31a of the ink feeders A31, A31 of the writing nib A30 are inserted into the interior of the front end side of the ink absorbent A20 [FIG. 21(a)]. It is noted that recesses into which the rear end portions A31a, A31a of the ink feeders A31, A31 are inserted may be formed inside the front end side of the ink absorbent A20. In addition, when the pressure inside the barrel body A10 increases, ink dripping or the like sometimes would occur from the pen tip. In the writing instrument D of the present embodiment, the air grooves A41b, A41b adjust the air pressure inside the barrel body A10 relative to the outside air.

The cap A50 is detachably attached by fitting or the like to the outer periphery on the front end side of the front barrel A15. When a thermochromic ink is used for the writing ink, it is preferable to form a thermoplastic elastomer on the outer surface of the cap A50 or the top of the cap A50 so as to easily generate frictional heat by a rubbing operation.

The writing instrument D according to the present invention can easily manufactured by inserting the ink absorbent A20 impregnated with an ink for the writing instrument into the rear barrel A11 as a part of the barrel body A10 of the writing instrument so as to be held therein, and fixing the front barrel A15 and the retainer A40 with the writing nib A30 tightly fixed by attaching the writing nib A30 before deformation to the retainer A40 and then deforming the writing nib A30 by plastic working (plastic process) so as to conform to the shape of the retainer A40, successively by fitting or the like. Thus, the ink carried in the ink absorbent A20 can be efficiently supplied to the writing part A32 of the writing nib A30 by capillary force and used for writing.

In the writing instrument D thus configured, the writing nib A30 is plastically worked into a shape that conforms to the outline of the retainer A40, and the retainer A40 with the writing nib A30 tightly held thereon is fixed to the barrel body A10 of the writing instrument to which the absorbent A20 and the front barrel A15 have been attached, thus making it is possible to easily complete the writing instrument. Since the part of the writing nib does not need to have a definite shape and can be attached and fixed to the retainer A40 in a snugly fitted form by plastic working, a common part can be used to produce writing nibs A30 even for the retainers having different mounting shapes. As a result, it is possible to increase productivity of writing nibs 30 and efficiently manufacture writing instruments with diverse types of writing nibs at low cost. Thus, the writing instrument of the present invention enables the writing nib to be reliably fixed to the retainer in a simple structure by a simple manufacturing method and can be manufactured in a stabilized assembling process at low cost.

Further, by forming at least part of the front face A47 of the retainer A40 contacting the writing nib A30 with the non-smooth surface part A48, it is possible to reliably fix the writing nib A30 to the retainer A40 and stabilize the assembly process.

Further, in the writing instrument D of the present invention, the retainer 40 with the writing nib A30 fixed thereto by plastic working is made of a material offering visibility as described above, so that the see-through section A43 of the retainer A40 allows the user to visually recognize the direction of writing. Thus, it is possible to provide a writing instrument that can provide sufficient visibility to definitely read characters written in the drawing direction and can be used until the end of a brush-stroke.

The writing instrument of the present invention is not limited to the above-described embodiments and others, and various modifications can be made within a range not departing from the technical idea of the present invention.

According to the technical idea of the present invention, the writing instrument has a writing part formed of, at least, a writing nib of a porous body and a retainer holding the writing nib and is characterized in that the writing nib before deformation is attached to the retainer and then deformed by plastic working so as to be closely held by the retainer conforming to the shape thereof. Accordingly, the writing nib before deformation is not limited to the one shown in FIG. 22(a) which includes the ink feeders A31, A31 and the writing part A32 for leading out ink through the ink feeders A31, A31, but can take any configuration and size as long as the wring nib after deformation can be plastically worked into a shape that conforms to the outline of the retainer.

Further, in the above embodiment, as the plastic working, heat exceeding the range of elastic deformation to the writing nib A30 is applied by heat treatment so as to fix the writing nib A30 to the retainer A40, conforming to the shape thereof by close fitting without impairing the characteristics of the writing nib A30 and the retainer A40. However, at least one of other plastic working methods (plastic treatments) such as, for example, pressure treatment, pressing treatment and pulling treatment may be used alone or may be used appropriately in combination with the above-described heat treatment, so as to exceed the limit of the elastic deformation range of the writing nib A30, and thereby fix the writing nib A30 to the retainer A40, conforming to the shape thereof by close fitting without impairing the characteristics of the writing nib A30 and the retainer A40.

Moreover, in the above embodiment, the non-smooth surface portion A48 with jaggedness is formed on at least part of the front surface portion A47 of the retainer A40 that is in contact with the writing nib A30, but the bottom surface of the holding groove A46 may be formed in part or totally with the non-smooth surface (including embossed texture).

Further, the configurations other than the writing nib A30 and the retainer A40, which are the gist of the present invention, are not particularly limited, and various modifications can be made within a range not changing the technical idea of the present invention.

For example, though the above-described embodiment illustrates a writing instrument of a type (sliver type) in which ink stored in the ink absorbent A20 is efficiently supplied to the writing part A32 of the writing nib A30 by capillary force, the invention may also be applied to a direct-ink type writing instrument holding free ink inside the ink tank or a writing instrument having a valve mechanism, for example, a writing instrument which includes an ink chamber with free ink stored therein, arranged inside a barrel body forming the writing tool body, and a valve mechanism disposed between the ink chamber and the writing nib, and delivers and supplies ink to the writing nib by releasing the valve while opposing the repulsive force of a spring in the valve mechanism as the valve rod is moved back by pressing motion of the pen tip.

Furthermore, the above embodiments have been described on single-ended writing instruments having the writing nib A30 as a single pen tip, but the above configuration can be applied to a double-ended writing instrument which further has a pen element of a fine type writing nib at the end of the rear barrel and supplies the ink in the ink absorbent A20 to the pen element.

Moreover, the above-described embodiment has been described when used with ink for writing instruments. However, liquid cosmetic, liquid medicine, application liquid, correction liquid and other fluids may be used by preparing an applying member, for example, having a configuration similar to the writing nib A30 in conformity with the associated fluid.

Next, an embodiment of a writing nib of the present invention will be described below.

The writing nib of the present embodiment comprises a sintered body obtained by sintering a granular thermoplastic resin and a fibrous thermoplastic resin.

The content ratio [(A):(B)] of the granular thermoplastic resin (A) and the fibrous thermoplastic resin (B) is preferably 20 to 90% by mass: 80 to 10% by mass, more preferably 20 to 80% by mass: 80 to 20% by mass.

Further, the porosity of the sintered body is desirably 30 to 70%.

Figure 26:
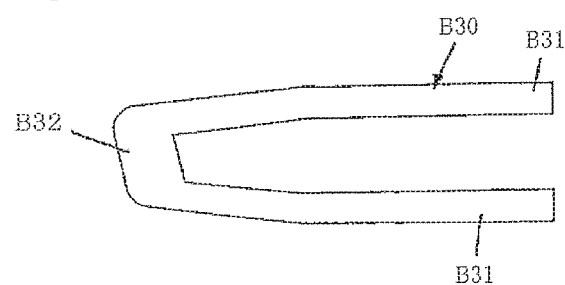
FIG. 26 is a front view showing an example of an embodiment of a writing nib of the present invention.

FIG. 26 is a front view showing an embodiment of the writing nib of the present invention.

The writing nib of the present invention is composed of a sintered body obtained by sintering a granular thermoplastic resin and a fibrous thermoplastic resin.

The granular thermoplastic resin used in the present invention has an average particle size of 5 to 500 μm and includes at least one selected from polyethylene, poly(methyl methacrylate), polypropylene, ethylene-vinyl acetate copolymer (EVA), polystyrene (PS), styrene-acrylonitrile copolymer (AS), acrylonitrile-butadiene-styrene copolymer (ABS), polyamide, polycarbonate, polytetrafluoroethylene and polyvinylidenefluoride.

Particularly and preferably, use of a thermoplastic resin having an average particle size of 10 μm or greater can increase ink ease of outflow when it is formed into a sintered body. Use of a thermoplastic resin having an average particle size of 300 μm or less can improve writing sensation when the pen tip is put into contact with the writing surface. In the present invention, the "average particle size" is an average value of the diameters of the measured particles by an electron microscope and the average value of the particle diameters measured for 20 particles in the image projected on the electron microscope. When the particle is not circular, the value obtained by dividing by two the sum of the length of the longest line segment and the length of the shortest line segment of the line segments connecting any two points on the outline forming pores is used as the particle size of the particle.

The fibrous thermoplastic resin used in the present invention is fiberized resin including at least one selected from polyethylene, poly(methyl methacrylate), polypropylene, ethylene-vinyl acetate copolymer (EVA), polystyrene (PS), styrene-acrylonitrile copolymer (AS), acrylonitrile-butadiene-styrene (ABS) copolymer, polyamide, polycarbonate, polytetrafluoroethylene, polyvinylidenefluoride. The fiber preferably has a fineness of 1 to 100 dtex, more preferably a fineness of 3 to 30 dtex with a preferable average fiber length of 0.1 to 2 mm or a more preferable average fiber length of 0.2 to 1 mm.

Use of a fibrous thermoplastic resin having a fineness range (1 to 100 dtex) and an average fiber length (0.1 to 2 mm) makes it possible to further improve both the strength and the ease of outflow.

The writing nib of the present invention is obtained by sintering the granular thermoplastic resin and the fibrous thermoplastic resin. Specifically, an appropriate method can be employed such as a method in which a mixture of the granular thermoplastic resin and the fibrous thermoplastic resin kneaded with optional additives such as a surfactant, is compression molded in a mold conforming to a shape of the writing nib, then dried and baked, or a method in which a mixture of the granular thermoplastic resin and the fibrous thermoplastic resin kneaded with optional additives such as a surfactant, is poured into a mold conforming to a shape of the writing nib and solidified, then dried and baked.

The baking temperature and the baking time vary depending on the shape, size, utility, thermoplastic resin type, and so on of the writing nib, but it is preferable to perform baking at a temperature ranging from 110 to 180° C. for 10 minutes to 10 hours.

In the present invention, the physical properties (average particle size, average fiber length, fineness) of the granular thermoplastic resin (A) and the fibrous thermoplastic resin (B) used, the content ratio and combination of the granular thermoplastic resin (A) and the fibrous plastic resin (B), and the sintering temperature, time and other factors, are appropriately selected, whereby it is possible to produce a writing nib that satisfies the necessary porosity, outflow property of application liquid (including ink) and physical strength (shear strength, breaking strength).

The content ratio [(A):(B)] of the granular thermoplastic resin (A) and the fibrous thermoplastic resin (B) to be used is more preferably 30 to 90% by mass: 70 to 10% by mass, more preferably 60 to 90% by mass: 40 to 10% by mass.

Setting the content ratio of (A) and (B) to 20 to 90% by mass: 80 to 10% by mass enables a writing nib to further exert the effect of the present invention.

It is particularly preferable to use the same thermoplastic resin for both the granular thermoplastic resin (A) and the fibrous thermoplastic resin (B) from the viewpoint of sinterability, and for example, if the granular thermoplastic resin (A) is made of polyethylene, the fibrous thermoplastic resin (B) of polyethylene may be used.

The writing nib of the present invention is obtained as a sintered body by sintering the above-described granular thermoplastic resin and the fibrous thermoplastic resin. The porosity of the sintered body varies depends on the utility of the writing instrument (underlining marker, felt-tip pen, pen for writing board, and so on). Preferably the porosity is 30 to 70%, particularly and preferably 45 to 65%. In the present invention, the "porosity" refers to the ratio of the volume of voids to the apparent volume of the porous body, and is calculated as follows. First, a writing nib having a known mass and apparent volume is immersed in water so that sufficient water is infiltrated. Then the mass is measured after being taken out from water. From the measured mass, the volume of water immersed in the writing nib is derived. The porosity is calculated from the following formula (A) assuming that the volume of water is the same as the volume of pores in the writing nib.

Porosity(unit: %)=(volume of water)/(apparent volume of writing nib)×100  (A)

The shape and internal structure and so on of the writing nib of the present invention are not particularly limited, and in the case of various writing instruments, that is, as long as it is a writing instrument, a writing nib of a configuration suitable for an underlining marker, a felt tip pen, a pen for writing board and the like can be used.

Referring net to the drawings, each of the writing instruments using these writing nibs of the present invention, having different shapes and so on, will be described in detail.

As the writing nib of the present invention, for example, a writing nib having the shape shown in FIG. 26 can be considered.

As shown in FIG. 26, this writing nib B30 has a substantially U-shaped form, as a whole, having ink feeders B31, B31 and an inclined writing part B12 leading ink out of the ink feeders B31, B31.

The writing nib B30 is produced as a sintered body obtained by sintering the granular thermoplastic resin and the fibrous thermoplastic resin by the above sintering method.

The writing nib B30 is obtained by sintering a granular thermoplastic resin and a fibrous thermoplastic resin, to form a sintered body having a kneaded structure of the granular thermoplastic resin and the fibrous thermoplastic resin. Thereby, all the porosity and the ease of outflow of the application liquid and the physical strength (shear strength, breaking strength) can be highly achieved (this point will be further described in detail in the examples and others).

Figure 27:
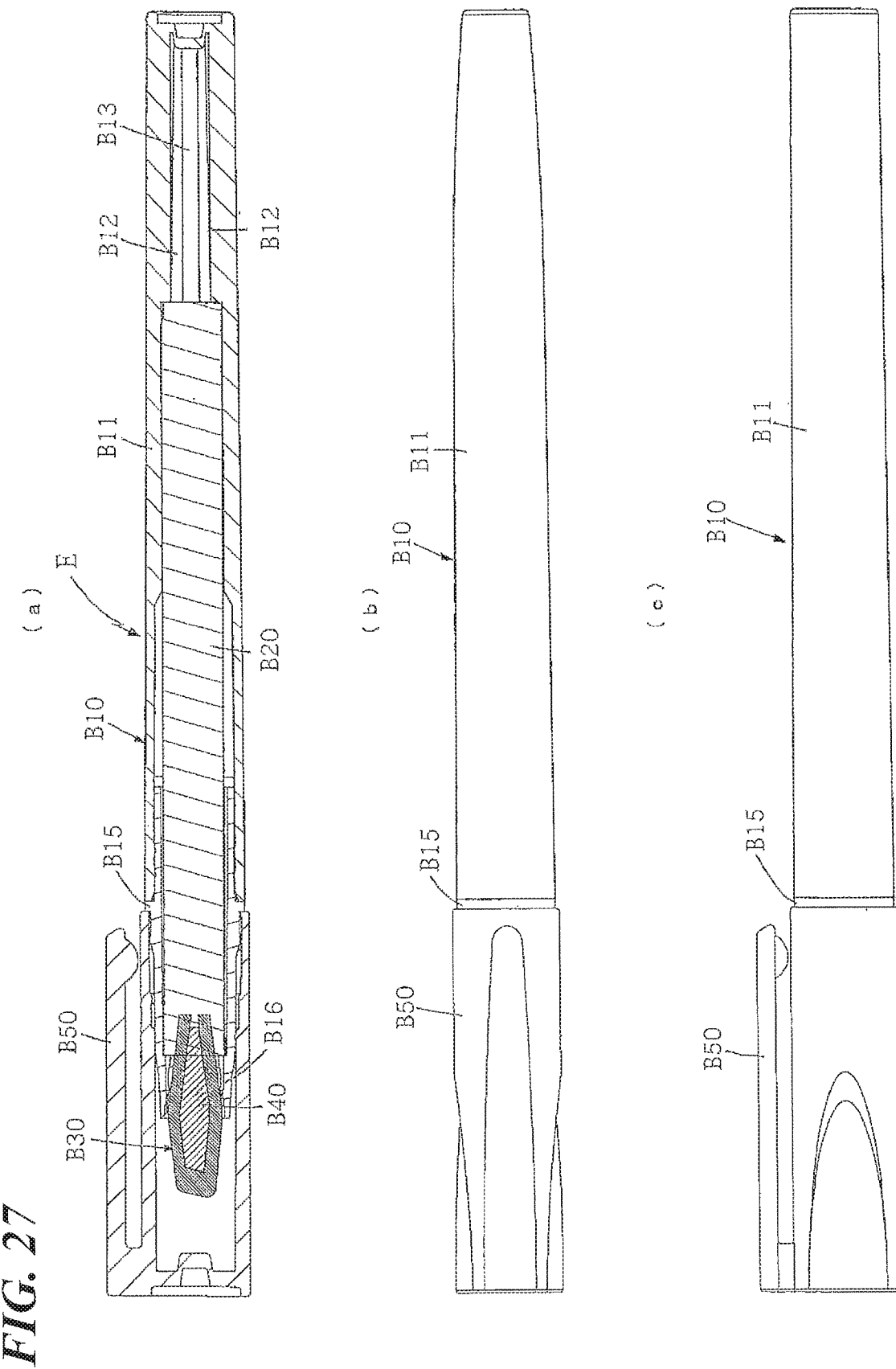
FIG. 27 illustrates an example of a writing instrument using a writing nib of the present invention, (a) a vertical section, (b) a plan view, and (c) a front view.
Figure 28:
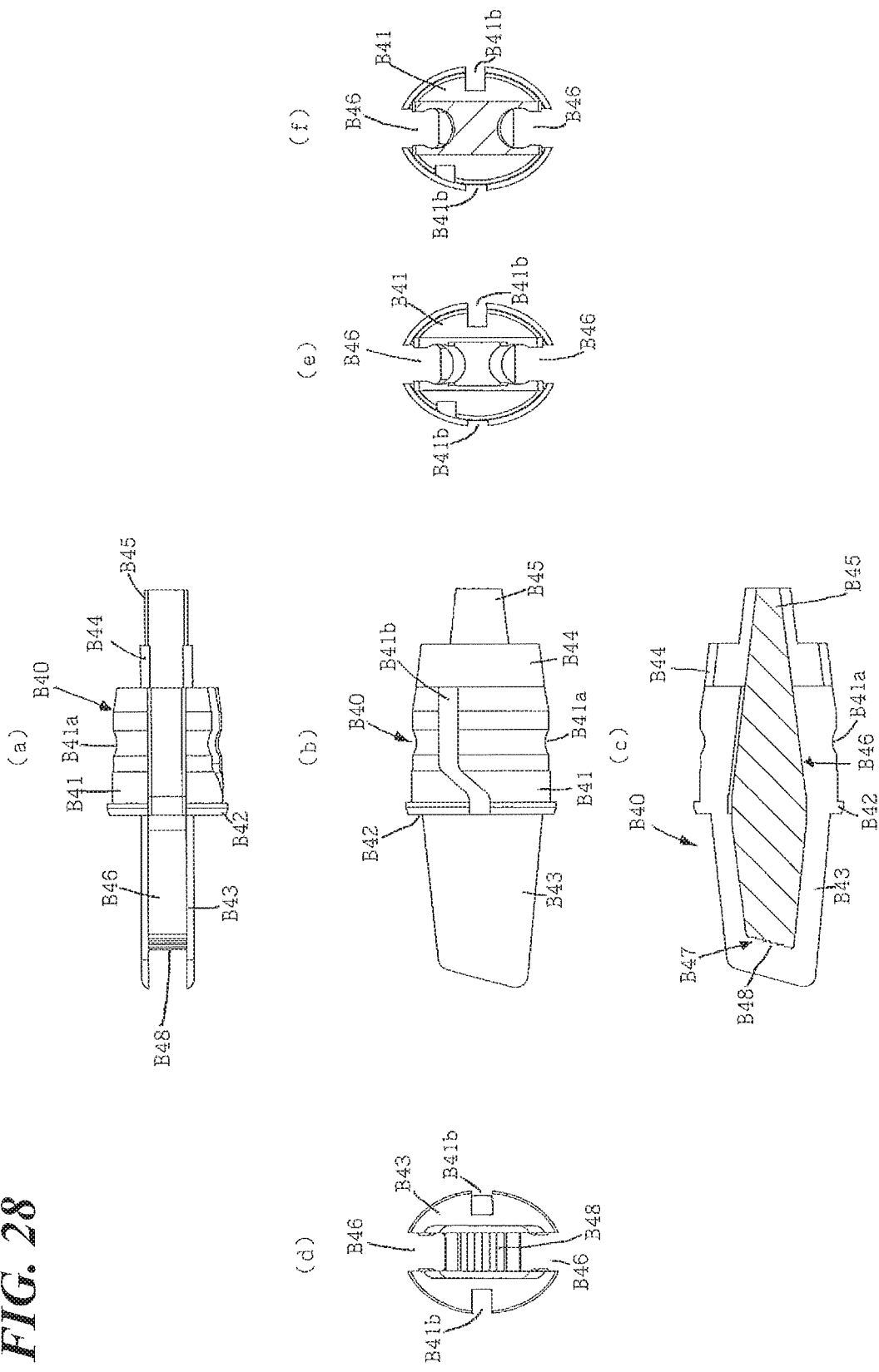
FIGS. 28(a) to 28(f) are drawings showing an example of a retainer for holding a writing nib in the writing instrument of FIG. 27, (a) a plan view, (b) a front view, (c) a vertical section, (d) a left side view, (e) a right side view, and (f) a cross section at the center.
Figure 29:
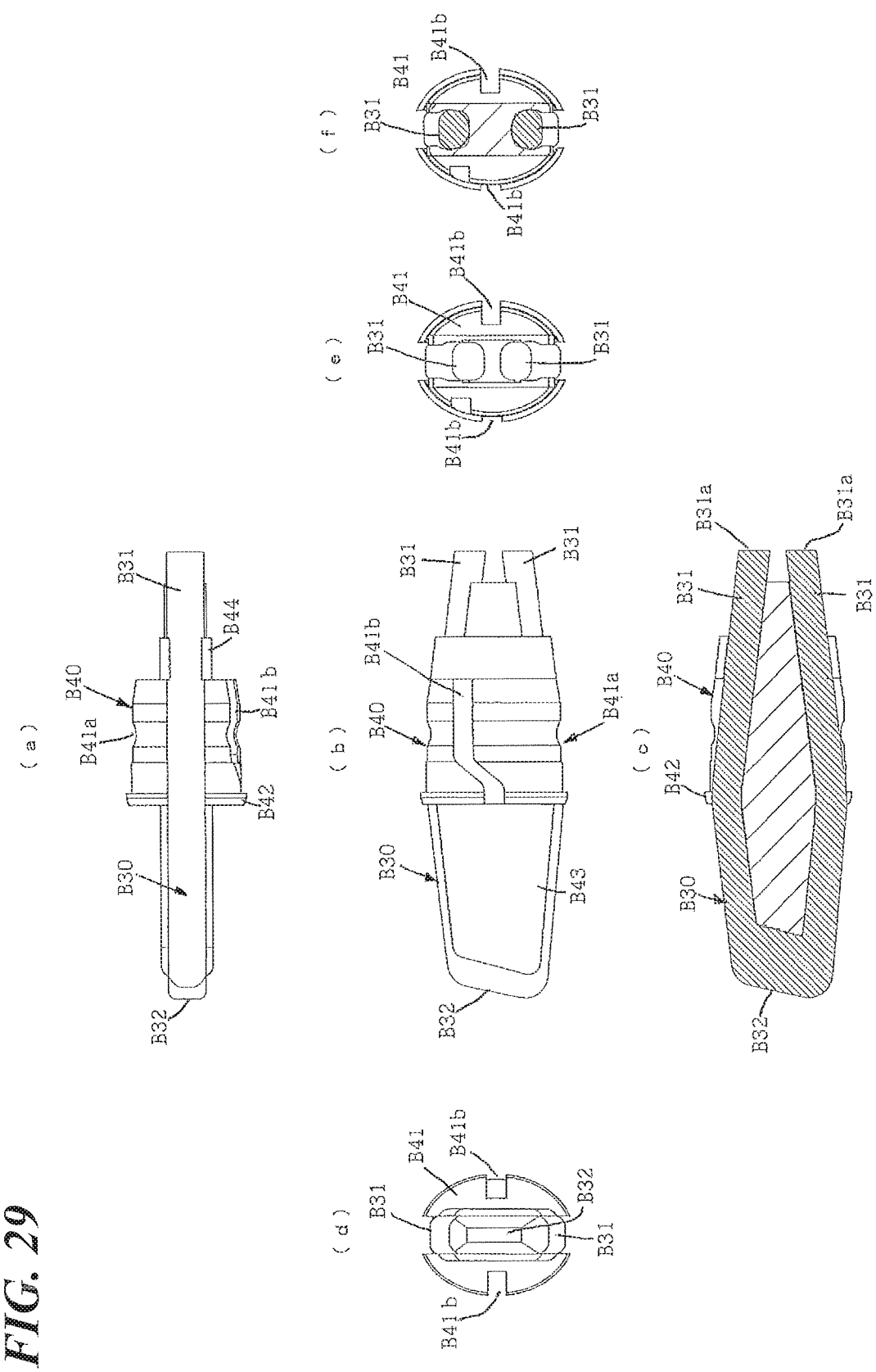
FIGS. 29(a) to 29(f) are drawings showing an example of a state in which a writing nib is attached to the retainer of FIG. 28, (a) a plan view, (b) a front view, (c) a vertical section, (d) a left side view, (e) a right side view, and (f) a cross section at the center.

FIG. 27(a) is a vertical section showing an example of a writing instrument using the writing nib B30 of FIG. 26, (b) a plan view, (c) a front view. FIGS. 28(a) to 28(f) are drawings showing an example of a retainer for holding a writing nib in the writing instrument of FIG. 27. FIGS. 29(a) to 29(f) are drawings showing an example of a state in which a writing nib is attached to the retainer of FIG. 28.

As shown in FIG. 27, a writing instrument E using the writing nib B30 includes a barrel body B10 to be the main body of the writing instrument, an application liquid absorbent B20, a retainer B40 and a cap B50.

As shown in FIG. 27(a), the barrel body B10 is made of, for example, a thermoplastic resin, a thermosetting resin, or the like, and has a bottomed rear barrel B11 for housing the application liquid absorbent B20 impregnated with an ink for the writing instrument or an application liquid, and a front barrel B15 for fixing the retainer B40 with the writing nib B30 attached thereto.

The rear barrel B11 is molded in a bottomed cylindrical shape using a resin such as polypropylene (PP) and functions as the main body (barrel body) of the writing instrument. As shown in FIG. 27(a), the rear barrel B11 has a holding member B13 formed of retaining pieces B12, B12 for retaining the rear end of the application liquid absorbent B20 inside at the rear end side thereof, and the whole rear barrel and an aftermentioned front barrel are formed with opaque or transparent (or translucent) material. Any of them may be adopted in view of appearance and practical use. Further, the front barrel A15 is fixed to the front side of the rear barrel B11 by fitting or the like. In the case where a thermochromic ink is used for the writing ink, it is preferable to form a thermoplastic elastomer on the outer surface or the rear end of the rear barrel B11 so as to easily generate frictional heat by a rubbing operation.

The front barrel B15 is formed with a fitting projection B16 for fixing the main part of the retainer B40 fixing the writing nib B30. The front barrel B15 having this structure is molded of, for example, a resin such as polypropylene (PP).

The application liquid absorbent B20 is impregnated with an ink for the writing instrument such as an aqueous ink, an oil-based ink and a thermochromic ink, liquid cosmetic, correction liquid, liquid medicine or other fluid, and examples include fiber bundles made of one or a combination of two or more selected from natural fiber, animal hair fiber, polyacetal resin, acrylic resin, polyester resin, polyamide resin, polyurethane resin, polyolefin resin, polyvinyl resin, polycarbonate resin, polyether resin, polyphenylene resin and the like, processed fiber bundles such as felt, as well as porous bodies such as sponge, resin particles, sintered bodies and the like. The application liquid absorbent B20 is accommodated and held in the rear barrel B11 which is the main part of the barrel body B10. The ink composition to be used is not particularly limited, and a suitable blended formulation such as an aqueous ink, an oil-based ink, a thermochromic ink and the like can be selected according to the utility and others of the writing instrument. For example, fluorescent dyes such as basic violet 11, basic yellow 40, thermochromic microcapsule pigment and the like can be contained for underlining pens and so on.

As shown in FIG. 27(a) and FIGS. 28(a) to 28(f), the retainer B40 includes a swollen main part B41, a flange B42 and a see-through section B43 allowing for visual recognition of the writing direction on the front side of the main part B41, as well as having a rear retaining part B45 with retaining pieces B44 connected to the main part B41 on the rear side of the main part B41. In the thus configured retainer B40, a holding groove B46 for receiving and holding the U-shaped writing nib B30 before deformation is formed on the entire circumferential surface in the longitudinal direction of the retainer B40.

In addition, a fitting recess B41a is formed on the outer peripheral surface in the width direction of the main part B41, and air vent grooves B41b, B41b are formed on the outer peripheral surface in the longitudinal direction.

In this configuration, in order to securely hold the writing part B32 and prevent it from slipping off during writing or the like, a non-smooth surface part B48 of minute jagged steps is formed on the front face, designated at B47, of the holding groove B46, which forms the portion in contact with the writing part B32 of the writing nib B30.

The entire retainer B40 thus configured is molded of a material having visibility and flexibility, for example, PP, PE, PET, PEN, nylon (including amorphous nylon and the like in addition to typical nylon such as nylon 6 and nylon 12), acryl, polymethylpentene, polystyrene, ABS and the like, so as to allow for effective recognition of characters written in the writing direction through the see-through section B43. It should be noted that only the see-through section B43 may be made of a material having visibility.

In addition, the retainer B40 may be configured by using one kind from the above materials or using two or more kinds of the materials from the viewpoint of further improvement of durability, visibility, and so on, and may be formed by various molding methods such as injection molding, blow molding and the like.

In the writing instrument E of this configuration, the writing nib B30 has the writing part B32 formed in an inclined shape (knife-cut shape) while the writing nib B30 is securely fixed by being fitted into the holding groove B46 of the retainer B40. Incidentally, when the pressure inside the barrel body B10 increases, ink dripping or the like sometimes would occur from the pen tip. However, this embodiment has the air vent grooves B41b, B41b which adjust the air pressure inside the writing nib B30 relative to the outside air. The cap B50 is detachably attached by fitting or the like to the outer periphery on the front end side of the front barrel B15. When a thermochromic ink is used for the writing ink, it is preferable to form a thermoplastic elastomer on the outer surface of the cap B50 or the top of the cap B50 so as to easily generate frictional heat by a rubbing operation.

The writing instrument E according to the present invention can easily manufactured by inserting the ink absorbent B20 impregnated with a writing ink or the like into the rear barrel B11 as a part of the barrel body B10 of the writing instrument so as to be held therein, and fixing the front barrel B15 and the writing nib B30 formed of the above-described sintered body to the retainer B40 having the aforementioned structure, whereby the ink carried in the ink absorbent B20 can be efficiently supplied to the writing part B32 of the writing nib B30 by capillary force and used for writing.

In the thus constructed writing instrument E, since the writing nib B30 is formed of a sintered body obtained by sintering a granular thermoplastic resin and a fibrous thermoplastic resin, it is possible to achieve the necessary porosity and ease of outflow of the application liquid (including ink) and the necessary physical strength (shear strength, breaking strength) altogether, hence provide a writing instrument excellent in durability, usability and the like.

In addition, as described above, since in the writing instrument E the retainer B40 holding the writing nib B30 is made of a material having visibility, the see-through section B43 of the retainer B40 makes the direction to be applied or the writing direction visible, so that it is possible to provide a writing instrument that can provide sufficient visibility for the user to surely recognize characters written in that direction or the part to be applied and can be used until the end of application.

Figure 30:
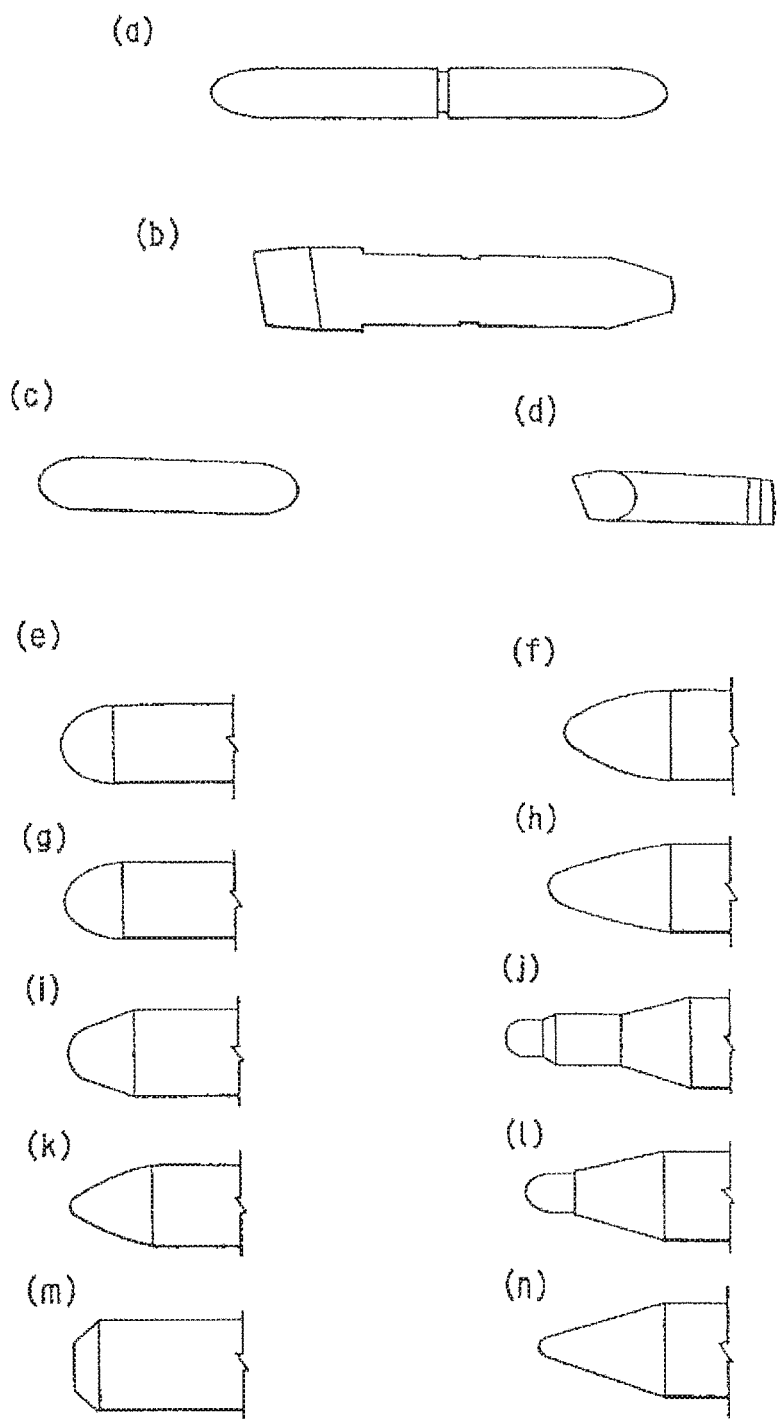
FIGS. 30(a) to 30(n) are front or partial front views, showing examples of writing nibs of the present invention.
Figure 31:
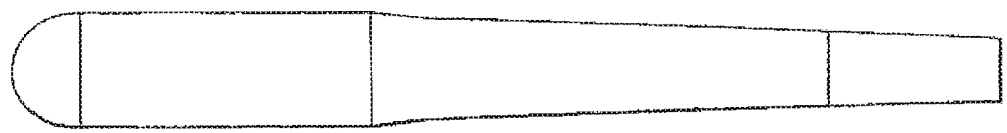
FIGS. 31(a) to 31(j) illustrate another embodiment of a writing nib of the present invention, wherein (a) shows an example of a writing nib of a sintered core having application liquid channels (ink channels) formed therein in the axial direction, and (b) to (j) are cross-sections showing examples of application liquid channels (ink channels) formed inside in the axial direction.
Figure 31:
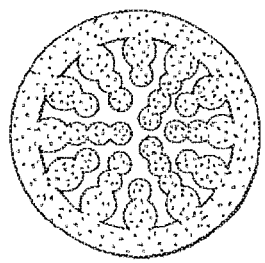
Figure 31:
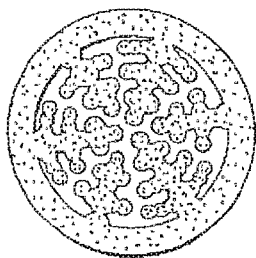
Figure 31:
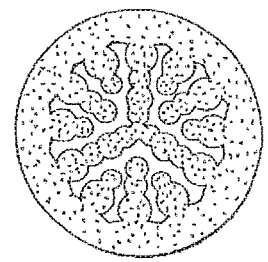
Figure 31:
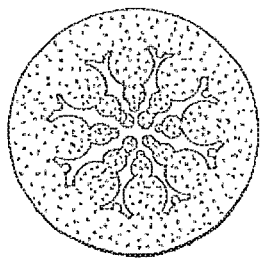
Figure 31:
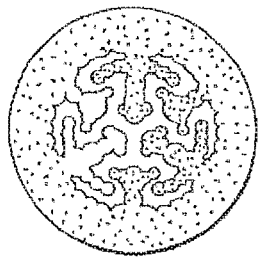
Figure 31:
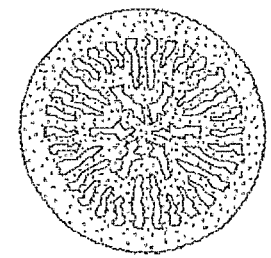
Figure 31:
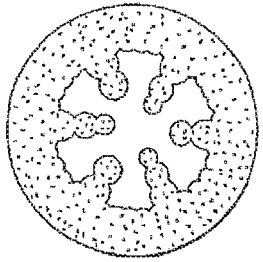
Figure 31:
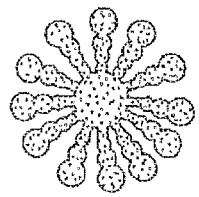
Figure 31:
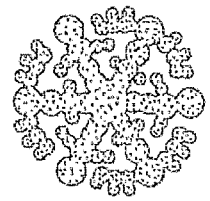

In the present invention, other specific shapes of the writing nib B30 may include those shown in FIGS. 30(a) to 30(n). It is also possible to use a writing nib having application channels formed in the axial direction [FIG. 31(a)]. As the variations of the application channels, those shown in FIGS. 31(b) to 31(j) and others can be considered.

The writing instruments having these writing nibs B30 can be applied to writing instruments of various mechanisms, including direct-liquid type writing instruments, sliver type writing instruments, writing instruments with a valve mechanism, clicking type writing instruments and others. Use of the nib can be made for writing instruments including maker pens, felt-tip pens, brush pens, pens for writing board, thermochromic pens and the like.

Figure 32:
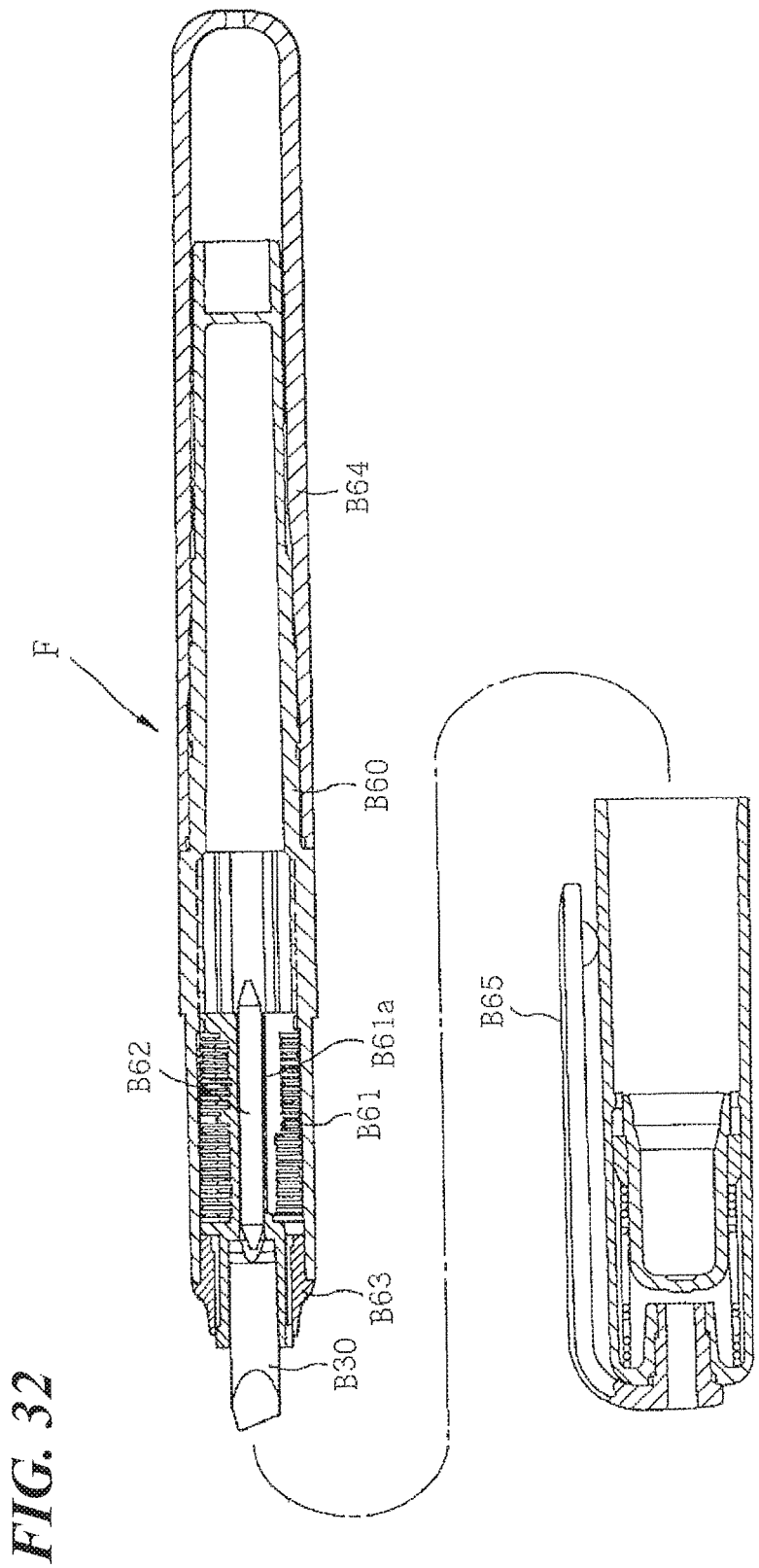
FIG. 32 is an explanatory sectional view showing an example of a direct liquid type writing instrument showing another example of a writing instrument using a writing nib of the present invention.

FIG. 32 shows an example of a direct-liquid type writing instrument. The direct-liquid type writing instrument F includes an application liquid tank portion B60 forming a barrel body for directly storing an application liquid such as ink without carrying the liquid in a sliver or the like. This writing instrument further incorporates an application liquid retainer (collector member) B61 for temporarily storing the application liquid in order to prevent dripping of the application, which is pushed out from the application liquid tank when the air inside the application liquid tank portion B60 expands due to a temperature rise or the like, from the pen tip or an air vent. Arranged at the front end of the collector member B61 is the above-described writing nib B30 of the present invention. As to the leading of the application liquid from the application tank portion B60 to the writing nib B30, the application liquid is led out from the application tank portion B60 to the writing nib B30 through a relay core B62 having an application liquid passage formed in a center hole B61a of the collector member B61. In FIG. 32, B63 designates a holder member, B64 a rear barrel body fixed to the rear portion of the application liquid tank portion B60, and B65 a cap. Alternatively, the rear portion of the writing nib B10 may be arranged directly inside the application liquid tank portion B60 so as to lead out the application liquid without use of the relay core B62.

Figure 33:
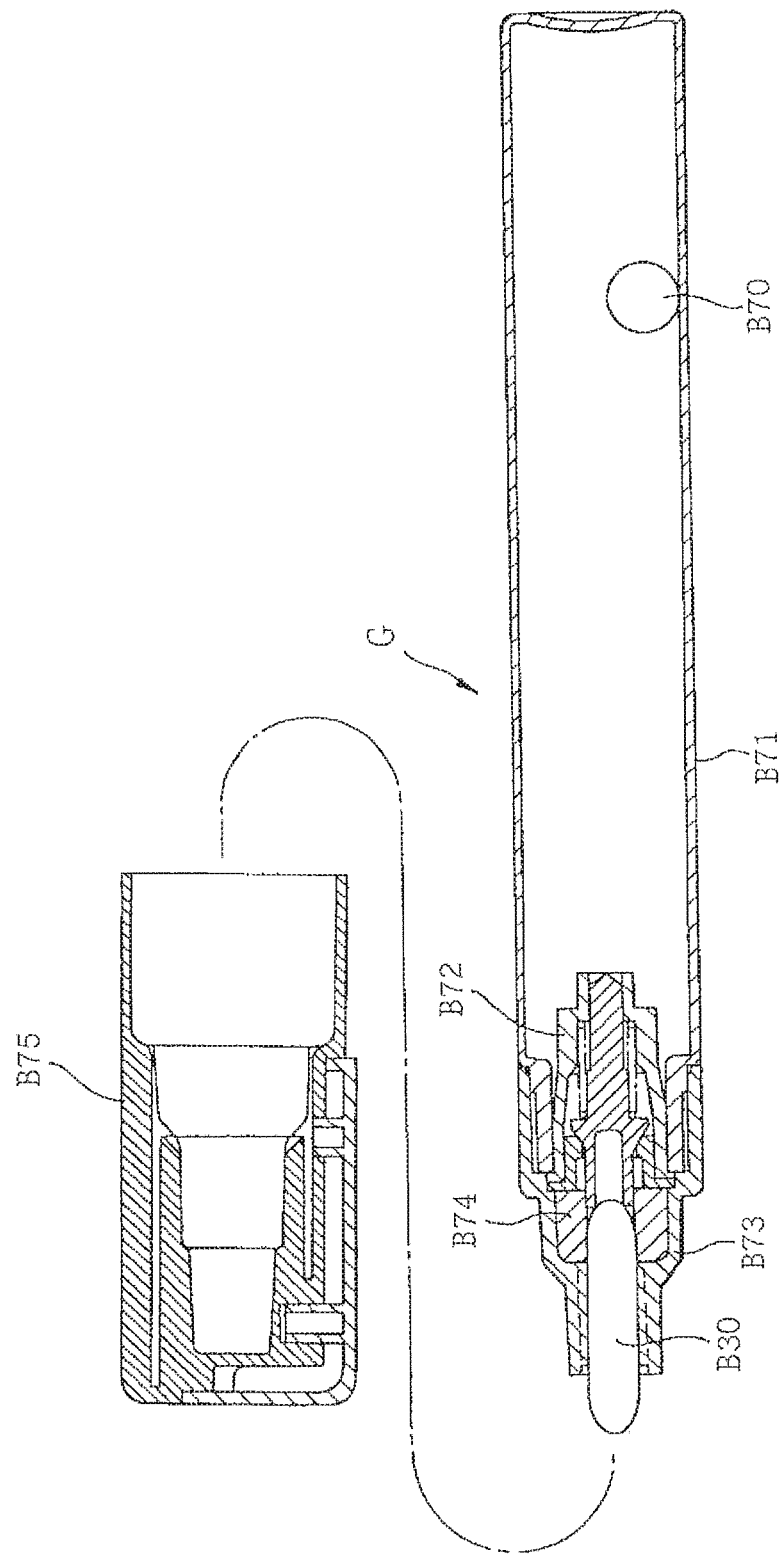
FIG. 33 is an explanatory sectional view showing another example of a writing instrument using a writing nib of the present invention, equipped with a valve mechanism.

A writing instrument G in FIG. 33 is a valve type writing instrument incorporating a hard ball B70 as a stirring ball, and has an application liquid tank portion B71 which forms a barrel body for directly storing the application liquid without carrying the liquid in a sliver or the like. In this configuration, the application liquid is supplied to the above-described writing nib B10 of the present invention via a valve mechanism B72. In FIG. 33, B73 designates a holder member, B74 a holding member which is interposed between the valve mechanism B72 and the holder member B73 to hold the rear portion of the writing nib B10, and B75 a cap.

Figure 34:
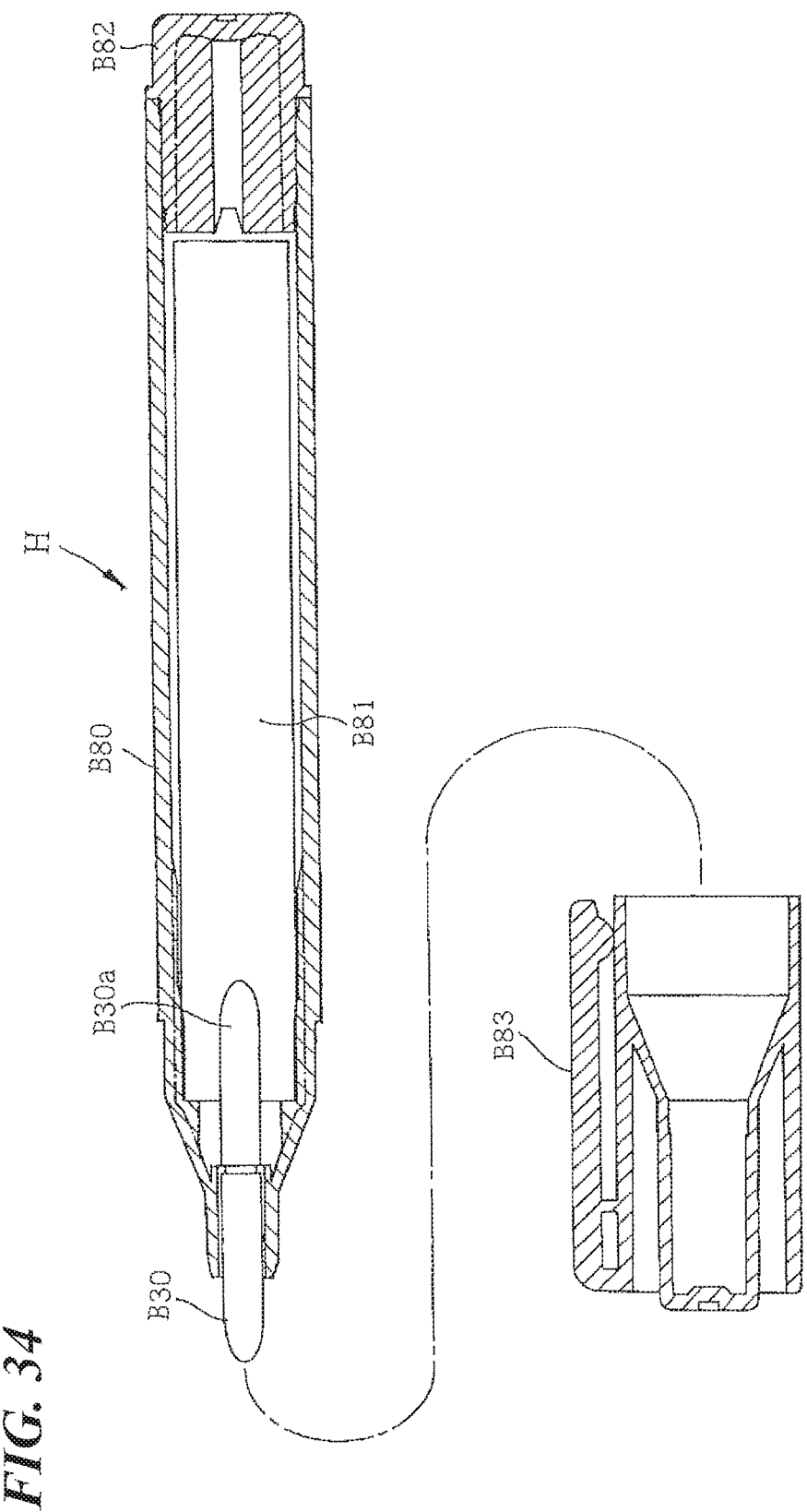
FIG. 34 is an explanatory sectional view showing an example of a writing instrument using a writing nib of the present invention, of a type in which an application liquid is retained in an absorbent such as slivers.

FIG. 34 shows a writing instrument of a type in which an application liquid such as ink is carried in an application liquid absorbent such as a sliver. The writing instrument H of this type has, in its barrel body B80 as a barrel body, an application liquid absorbent B81 which retains an application liquid in a fibrous element such as a sliver or the like. Abutted against the front part of the application liquid absorbent B81 is the rear end portion, designated at B30a, of the above-described writing nib B30 of the invention, whereby the application liquid in the application liquid absorbent B81 is supplied to the writing nib B30. Here, B82 designates a tail plug fixed to the rear end of the barrel body B80, and B83 a cap.

Figure 35:
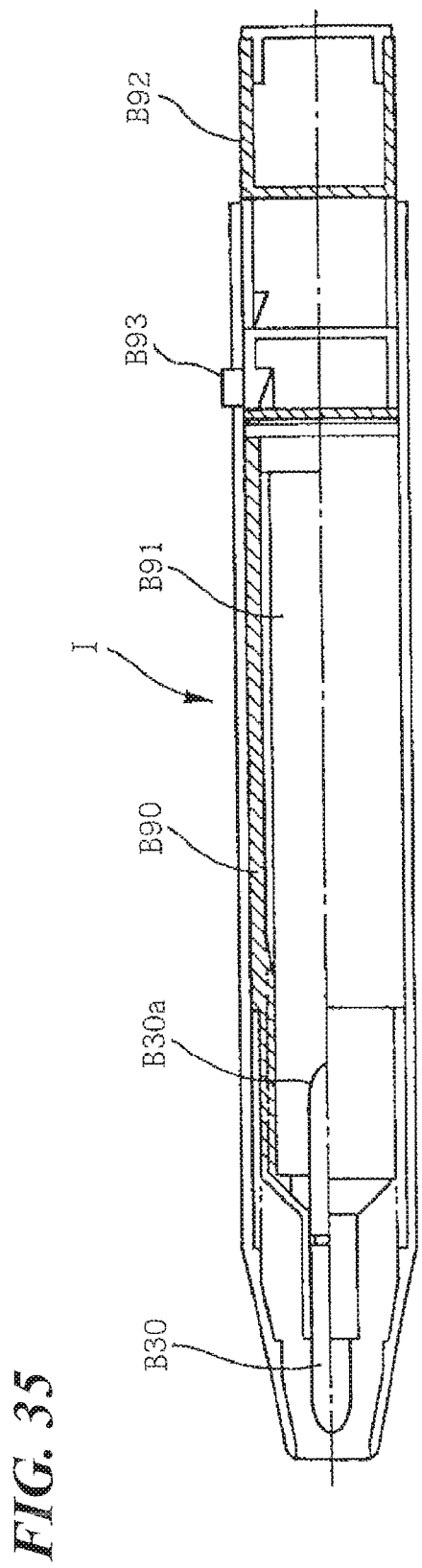
FIG. 35 is an explanatory sectional view showing another example of a writing instrument using a writing nib of the present invention, which uses a click-type configuration.

FIG. 35 is a clicking-type writing instrument which a retractable pen needing no cap, storing an application liquid in an application liquid absorbent such as a sliver. The writing tool I has, in its barrel body B90, an application liquid absorbent B91 which retains an application liquid in a fibrous element such as a sliver or the like. Abutted against the front part of the application liquid absorbent B91 is the rear end portion, designated at B30a, of the above-described writing nib B30 of the invention, whereby the application liquid in the application liquid absorbent B91 is supplied to the writing nib B30. Here, B92 designates a clicking portion attached to the rear end of the barrel body B90. As the clicking portion B92 is pushed in the forward direction, the writing nib B10 goes out of the barrel body B90 into an application state. As a release button B93 is operated, the writing nib B10 is retracted into the barrel body B90.

The writing nib of the present invention is not limited to the above-described embodiments and others, and various modifications can be made within a range not changing the technical idea of the present invention.

The technical idea of the present invention provides a writing nib which comprises a sintered body obtained by sintering a granular thermoplastic resin and a fibrous thermoplastic resin. Therefore, the shape of the writing nib should not be limited to the above embodiment shown in FIG. 27(a) having the ink feeders B31, B31 and the writing part B32 for leading the ink from the ink feeders B31, B31. For example, the writing nib may have a shape conforming to FIGS. 30 and 31, and the shape, internal structure, size, and others are not particularly limited.

Further, the above writing instruments using the writing nib of the invention have been described on single-ended writing instruments having only one writing nib 30, but the writing nib B30 can be arranged on both sides of a writing tool body to form a double-ended writing instrument.

Next, another embodiment example of a writing instrument of the present invention will be described in detail.

A writing instrument according to this embodiment is one which has a writing part formed of, at least, a writing nib of a porous body and a retainer holding the writing nib and is characterized in that the shearing strength of the writing nib is 5 N or greater.

It is preferable that the fracture position of the writing nib due to shearing is located within 0.6 mm or less in length inward from the endface on the distal side of the writing nib.

It is also preferable that the writing nib is made of a sintered body obtained by sintering at least a granular thermoplastic resin.

Figure 36:
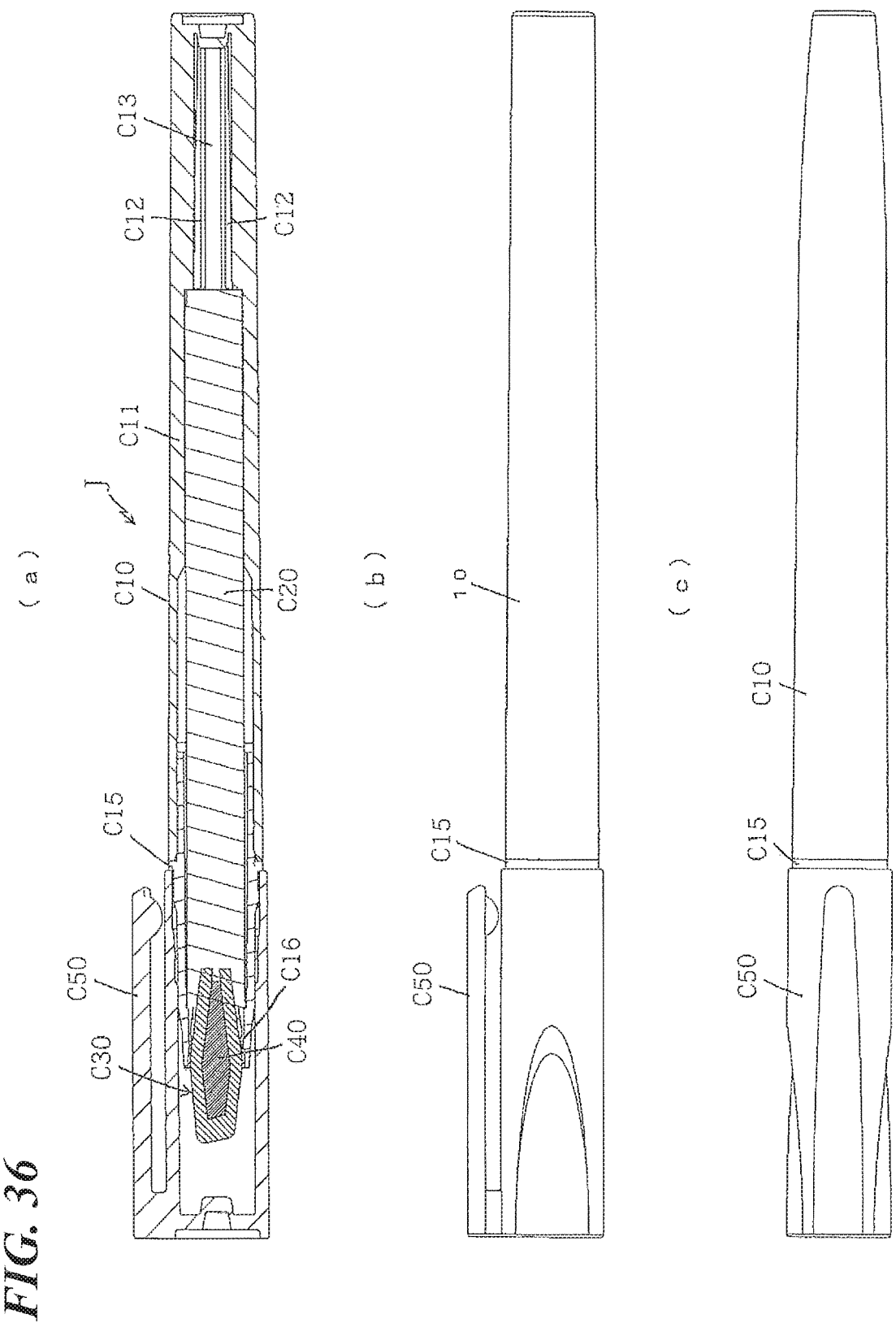
FIGS. 36(a) to 36(c) illustrates another example of a writing instrument of the present invention, (a) a vertical section, (b) a front view, and (c) a rear view.
Figure 37:
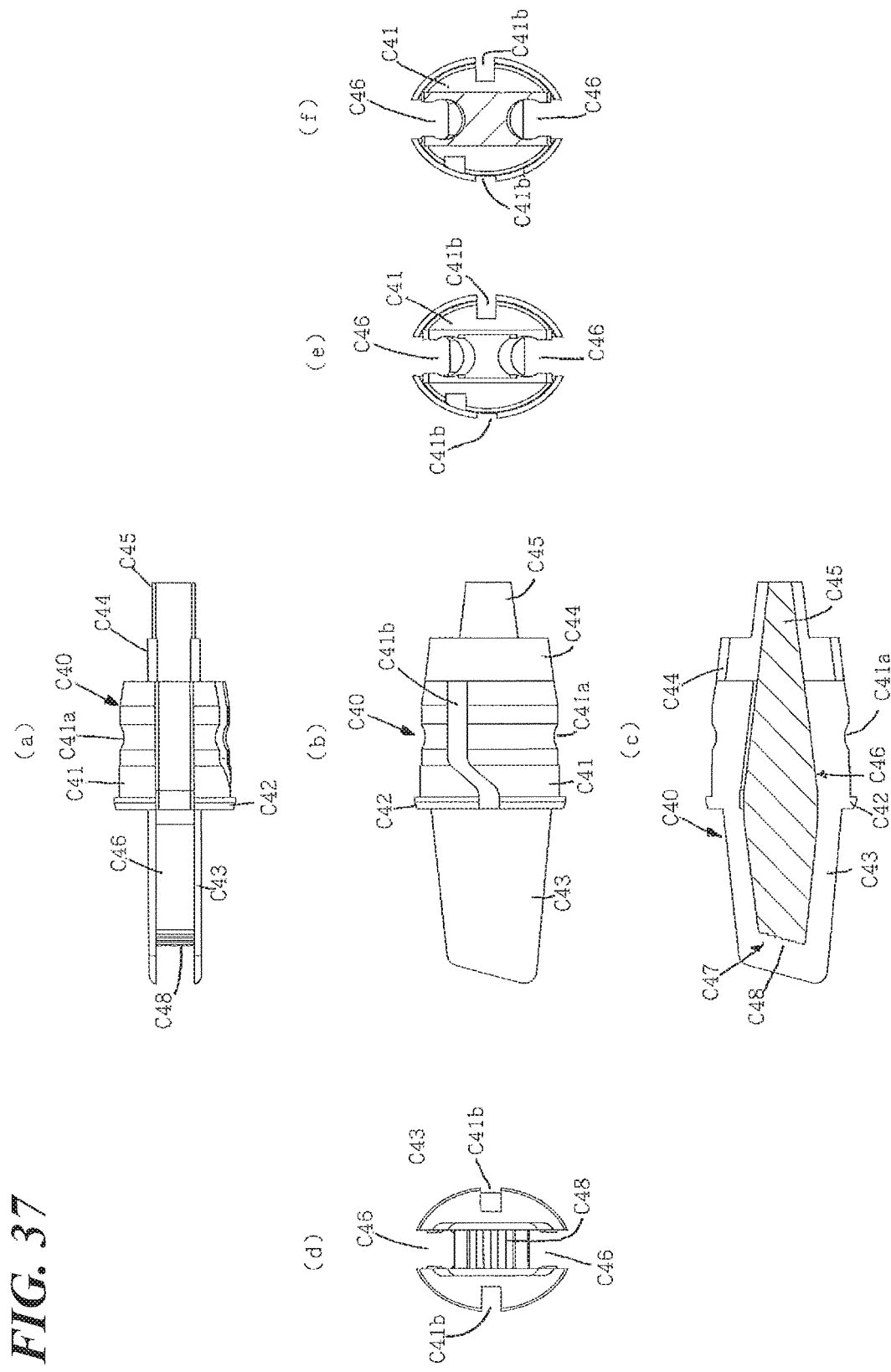
FIGS. 37(a) to 37(f) are drawings showing an example of a retainer for holding a writing nib in the writing instrument of FIG. 36, (a) a plan view, (b) a front view, (c) a vertical section, (d) a left side view, (e) a right side view, and (f) a cross section at the center.
Figure 38:
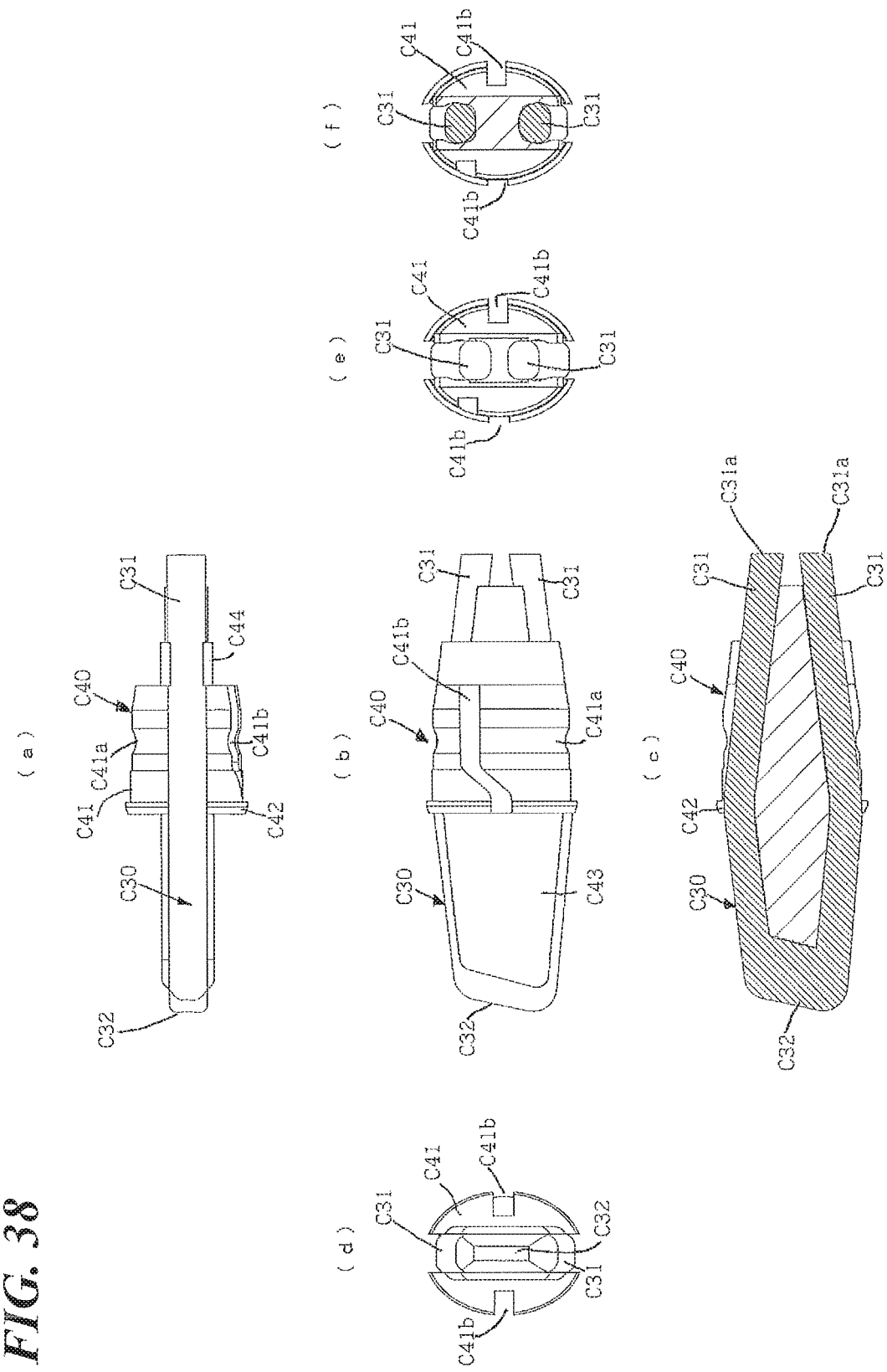
FIGS. 38(a) to (f) are drawings showing an example of a state in which a writing nib is attached to the retainer of FIG. 37, (a) a plan view, (b) a front view, (c) a vertical section, (d) a left side view, (e) a right side view, and (f) a cross section at the center.

FIGS. 36 to 38 are drawings showing an example of a writing instrument according to the above embodiment, drawings showing an example of a retainer for holding a writing nib, and drawings showing an example of the writing nib being attached to the retainer. FIGS. 39(a) to 39(d) are explanatory diagrams showing measurement on the shear strength of a writing nib, (a) is a drawing showing an example of a writing nib to be measured, and (b) to (d) are explanatory diagrams showing the measurement steps of the shear strength of the writing nib.

As shown in FIGS. 36(a) to (c), a writing instrument J of the present embodiment includes a barrel body (barrel cylinder) C10, an ink absorbent C20, a writing nib C30, a retainer C40 and a cap C50.

As shown in FIG. 36(a), the barrel body C10 is made of, for example, a thermoplastic resin, a thermosetting resin, or the like, and has a bottomed rear barrel C11 for housing the ink absorbent C20 impregnated with writing ink and a front barrel C15 for fixing the retainer C40 to which the writing nib C30 serving as a pen tip is attached.

The rear barrel C11 is molded in a bottomed cylindrical shape using a resin such as, for example, polypropylene (PP) or the like, and functions as the main body (barrel body) of the writing instrument. As shown in FIG. 36(a), the rear barrel C11 is provided with a holding member C13 formed of retaining pieces C12, C12 . . . for retaining the rear end portion of the ink absorbent C20 inside the rear end side thereof, and the whole rear barrel and an aftermentioned front barrel are formed with opaque or transparent (or translucent) material. Any of them may be adopted in view of appearance and practical use. Further, the front barrel C15 is fixed to the front side of the rear barrel C11 by fitting or the like. In the case where a thermochromic ink is used for the writing ink, it is preferable to form a thermoplastic elastomer on the outer surface or the rear end of the rear barrel C11 so as to easily generate frictional heat by a rubbing operation.

The front barrel C15 is formed with a fitting projection C16 for fixing the main part of the retainer C40 fixing the writing nib C30 described below. The front barrel C15 of this structure is molded of a resin, for example, polypropylene (PP) or the like.

The ink absorbent C20 is impregnated with an ink for the writing instrument such as a water-based ink, an oil-based ink and a thermochromic ink or the like, and examples include fiber bundles made of one or a combination of two or more selected from natural fiber, animal hair fiber, polyacetal resin, acrylic resin, polyester resin, polyamide resin, polyurethane resin, polyolefin resin, polyvinyl resin, polycarbonate resin, polyether resin, polyphenylene resin and the like, processed fiber bundles such as felt, as well as porous bodies such as sponge, resin particles, sintered bodies and the like. The ink absorbent C20 is accommodated and held in the rear barrel C11 which is the main part of the barrel body C10.

The ink composition to be used is not particularly limited, and a suitable blended formulation such as an aqueous ink, an oil-based ink, a thermochromic ink and the like can be selected according to the utility and others of the writing instrument. For example, fluorescent dyes such as basic violet 11, basic yellow 40, thermochromic microcapsule pigment and the like can be contained for underlining pens and so on.

As shown in FIGS. 38 and 39(a), the writing nib C30 has a generally U-shaped configuration and includes ink feeders C31, C31 and a writing part C32 for leading ink from the feeders C31, C31. Here, C33 is an inclined portion beveled on one side.

The writing nib C30 is composed of porous material, and examples include parallel fiber bundles made of one or a combination of two or more selected from natural fiber, animal hair fiber, polyacetal resin, polyethylene resin, acrylic resin, polyester resin, polyamide resin, polyurethane resin, polyolefin resin, polyvinyl resin, polycarbonate resin, polyether resin, polyphenylene resin and the like, a fiber core obtained by processing a fiber bundle of felt or the like or by resin processing these fiber bundles, and a porous body (sintered core) obtained by sintering a granular thermoplastic resin, selected from thermoplastic resins such as polyethylene, poly(methyl methacrylate), polypropylene, ethylene-vinyl acetate copolymer, polystyrene, styrene-acrylonitrile copolymer, styrene-butadiene-acrylonitrile copolymer, polyamide, polycarbonate, polytetrafluoroethylene.

For the writing nib C30, a fiber bundle core, a fiber core and a sintered core are preferable. In particular, a sintered core obtained by sintering at least the above-mentioned granular thermoplastic resin is most preferable from the viewpoint of high compatibility of manufacturability, ease of forming porosity and strength.

The writing nib C30 is specified so that the shear strength is 5 N or greater. Preferably, the fracture position of the writing nib C30 due to shearing is located within 0.6 mm or less in length inward from the endface on the distal side of the writing nib C30.

Setting the shear strength of the writing nib C30 to 5 N or greater makes it possible to prevent breakage of the writing nib and impart excellent durability without impairing writing performance even if writing is performed with a heavy writing load. The setting the shear strength at 8 N or greater is more preferable, and setting to 10 N or greater to 30 N or less is most preferable.

In the present invention, the shear strength can be measured using, for example, a shear strength measuring device shown in FIGS. 39(b) to 39(d).

This shear strength measuring device C60 has a measuring jig insertion hole C62 for insertion of a shear strength measuring jig C65 in the center of a main device body C61 and a writing nib insertion hole C63 for insertion of the writing nib C30 to be measured at the upper part on the side face of the main device body C61. The shear strength measuring jig C65 is connected to a load applying machine C66 which applies a load while the load applying machine C66 is connected to an unillustrated drive measuring unit such as a motor.

Measurement of the shear strength of the writing nib C30 using this measuring device C60 is carried out by inserting the writing nib C30 shown in FIG. 39(a) into the writing nib insertion hole C63 from the writing part C32 side, more specifically, inserting the writing nib C30 so that the inserted length t from the endface on the interior side is equal to or smaller than 0.6 mm, and applying a load on the measurement part of the writing nib C30, or the writing part C32, to thereby obtain the target shear strength (load resistance: load upon fracture).

In the present invention, as long as the shearing strength of the writing nib is 5 N or greater, preferably the shear strength is 5 N or greater when the fracture position of the writing nib C30 by shearing is located within 0.6 mm or smaller in the length t from the endface of the distal side (writing part 32) of the writing nib C30, the material, porosity, shape, size and others of the writing nib C30 are not limited. However, the writing nib preferably has a U-shaped configuration with ink feeders C31, C31 and a writing part 32 leading ink from the ink feeders C31, C31 as shown in FIGS. 38 and 39(a), or preferably has an L-shaped or T-shaped ink feeder C31.

The writing part C32 is preferably a writing part having a line width of 1 mm or more, more preferably a line width of 2 mm or more.

The writing nib C30 used in the present embodiment is composed of a sintered core (sintered body) having a porosity of 60%, obtained by sintering a polyethylene powder having an average particle size of 5 μm, the writing part C32 has an upper side length of 4 mm, a less side length of 5 mm with a height of 2 mm while the ink feeder C31 is 2 mm in diameter and 16 mm in length.

As shown in FIGS. 37(a) and 38(a) to 38(f), the retainer C40 includes a swollen main part C41, a flange C42 and a see-through section C43 allowing for visual recognition of the writing direction on the front side of the main part C41, as well as having a rear retaining part C45 with retaining pieces C44 connected to the main part C41 on the rear side of the main part C41. In the thus configured retainer C40, a holding groove C46 for receiving and holding the U-shaped writing nib C30 is formed on the entire circumferential surface in the longitudinal direction of the retainer C40.

In addition, a fitting recess C41a is formed on the outer peripheral surface in the width direction of the main part C41, and air vent grooves C41b, C41b are formed on the outer peripheral surface in the longitudinal direction.

In this configuration, in order to securely hold the writing part C32 and prevent it from slipping off during writing or the like, a non-smooth surface part C48 of minute jagged steps is formed on the front face, designated at C47, of the holding groove C46, which forms the portion in contact with the writing part C32 of the writing nib C30.

The entire retainer C40 thus configured is molded of a material having visibility and flexibility, for example, PP, PE, PET, PEN, nylon (including amorphous nylon and the like in addition to typical nylon such as nylon 6 and nylon 12), acryl, polymethylpentene, polystyrene, ABS and the like, so as to allow for effective recognition of characters written in the writing direction through the see-through section C43. It should be noted that only the see-through section C43 may be made of a material having visibility.

In addition, the retainer C40 may be configured by using one kind from the above materials or using two or more kinds of the materials from the viewpoint of further improvement of durability, visibility, and so on, and may be formed by various molding methods such as injection molding, blow molding and the like.

In the writing instrument J of the present embodiment, the writing part C32 of the writing nib C30 is formed in an inclined portion C32, and the writing nib C30 is securely fixed by fitting into the holding groove C46 of the retainer C40. In addition, when the pressure inside the barrel body C10 increases, ink dripping or the like sometimes would occur from the pen tip. In this configuration, the air grooves C41b, C41b adjust the air pressure inside the barrel body C10 relative to the outside air. The cap C50 is detachably attached by fitting or the like to the outer periphery on the front end side of the front barrel C15. When a thermochromic ink is used for the writing ink, it is preferable to form a thermoplastic elastomer on the outer surface of the cap C50 or the top of the cap C50 so as to easily generate frictional heat by a rubbing operation.

The writing instrument J can be easily manufactured by inserting the ink absorbent C20 impregnated with an ink for writing instrument into the rear barrel C11 as a part of the barrel body C10 of the writing instrument so as to be held therein and fixing the front barrel C15 and the writing nib C30 formed of a sintered body having the above-described specific shear strength to the retainer C40 having the above structure. In the writing instrument J, the ink retained in the ink absorbent C20 can be efficiently fed to the writing part C32 of the writing nib C30 by capillary force and used for writing.

The thus configured writing instrument J is one which has a writing part formed of, at least, the writing nib C30 of a porous body and the retainer C40 holding the writing nib C30 and is specified such that the shearing strength of the writing nib C30 is 5 N or greater, preferably the shear strength is 5 N or greater when the fracture position of the writing nib C30 by shearing is located within 0.6 mm or smaller in the length t from the front-side endface of the writing nib 32, whereby it is possible to prevent breakage of the writing nib and impart excellent durability without impairing writing performance even if writing is performed with a heavy writing load.

Furthermore, in the writing instrument J, the retainer C40 with the writing nib C30 fixed thereto is made of a material offering visibility as described above, so that the see-through section C43 of the retainer C40 allows the user to observe the direction of writing. Thus, it is possible to provide a writing instrument that can provide sufficient visibility to allow the user to surely see the characters written in the drawing direction as well as the applying part and can be used until the end of application.

Furthermore, since the writing instrument of the present embodiment can prevent the writing nib from being damaged without impairing writing performance and achieve excellent durability even when writing is performed with a heavy writing load by specifying the shearing strength of the writing nib to 5 N or greater as described above, for example, when the writing nib C30 used in the above embodiment (FIGS. 36 and 39(a)) is mass-produced on the production line, it is possible to make a pass/fail judgment for each production lot by performing a shear strength test on the production lot based on the following statistical method.

Figure 39:
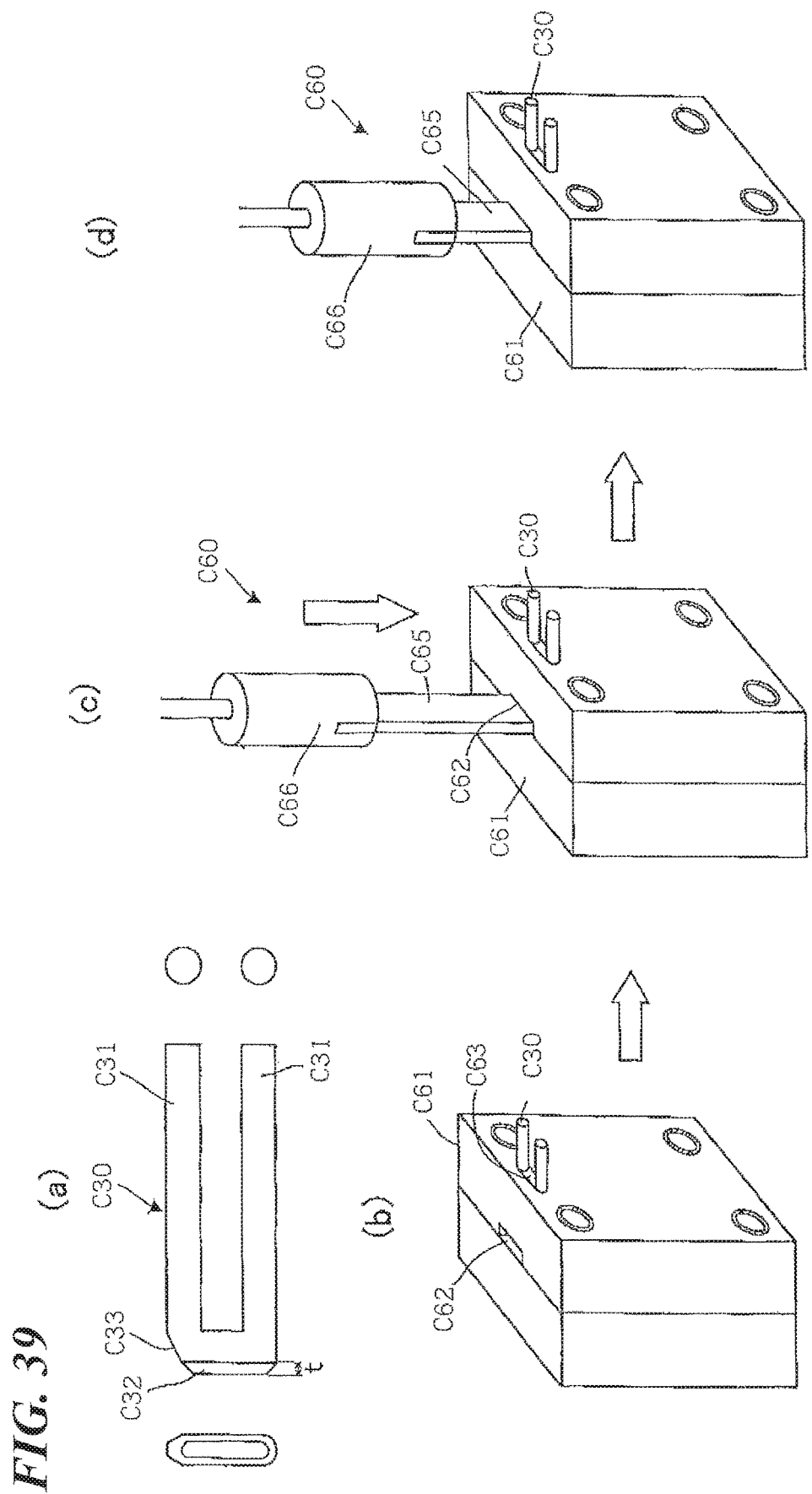
FIGS. 39(a) to 39(d) are explanatory diagrams for measuring the shear strength of a writing nib, (a) left side, front and right side views showing an example of a writing nib as a measurement target, and (b) to (d) explanatory diagrams showing the measurement steps of the shear strength of the writing nib.
Figure 40:
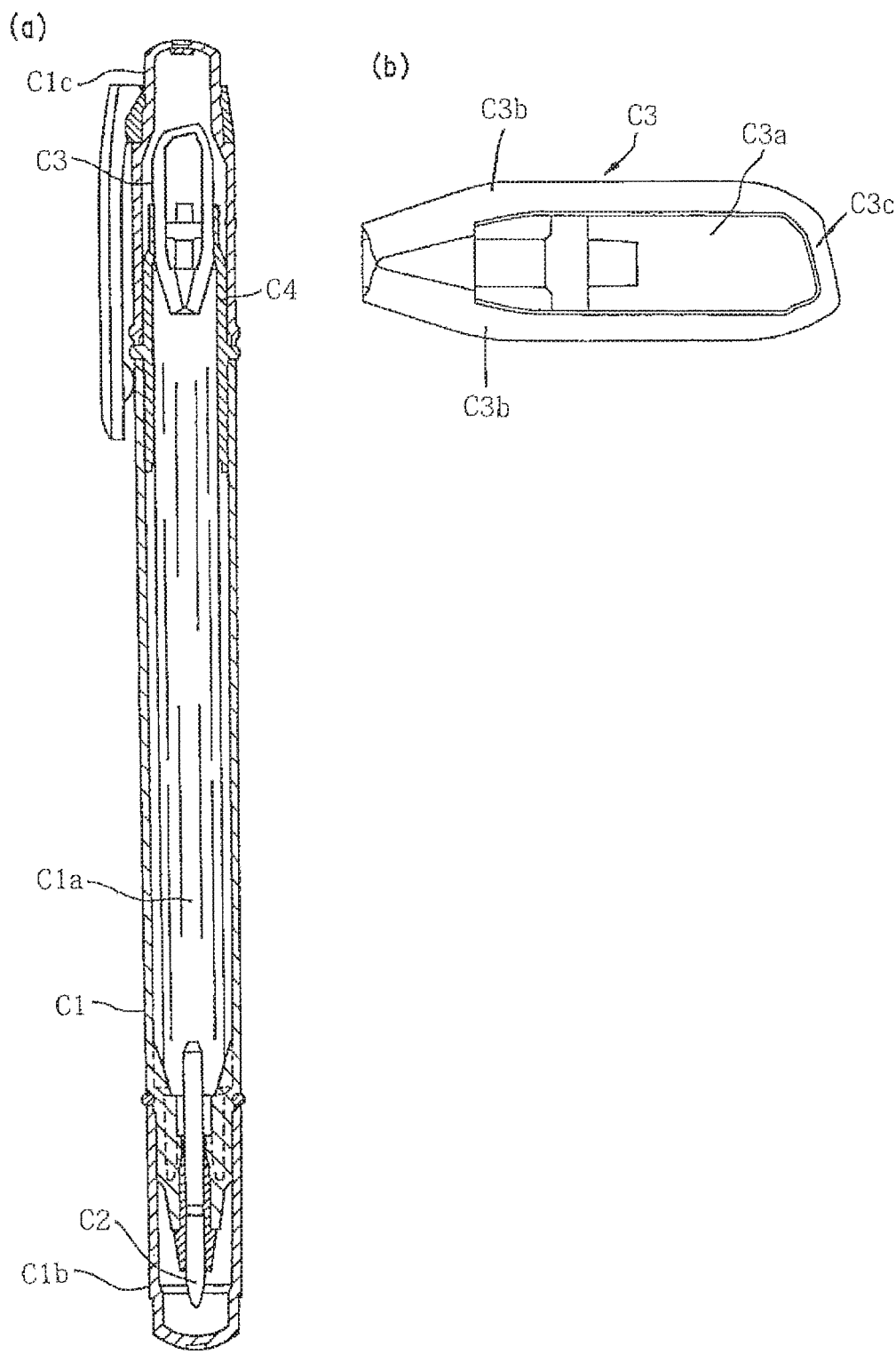
FIG. 40 illustrates an example of a conventional writing instrument, (a) a vertical section, (b) a partial front view showing a state in which a writing nib is attached to a retainer.
Figure 41:
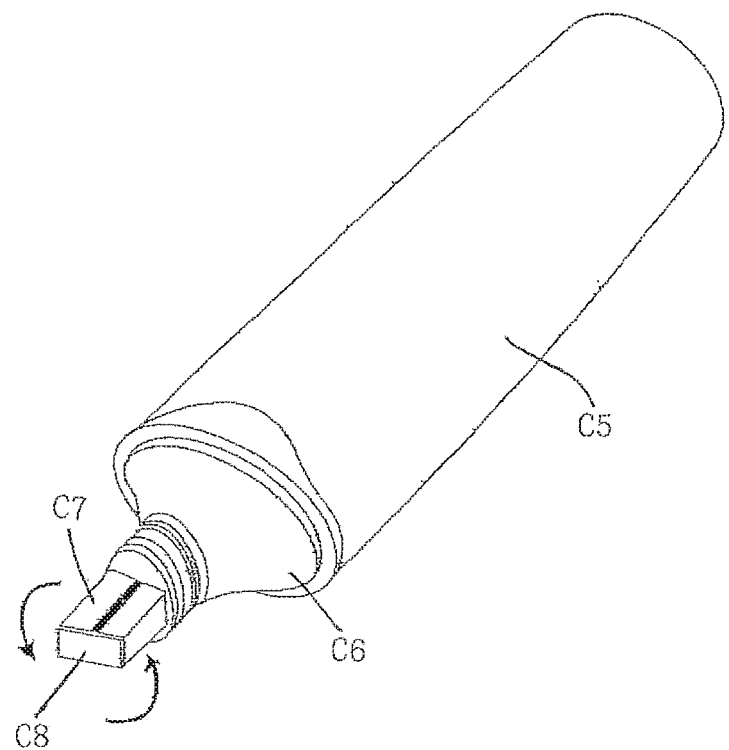
FIG. 41 illustrates another example of a conventional writing instrument, (a) a perspective view as seen from the front side, and (b) a perspective view as seen from the rear side.
Figure 41:
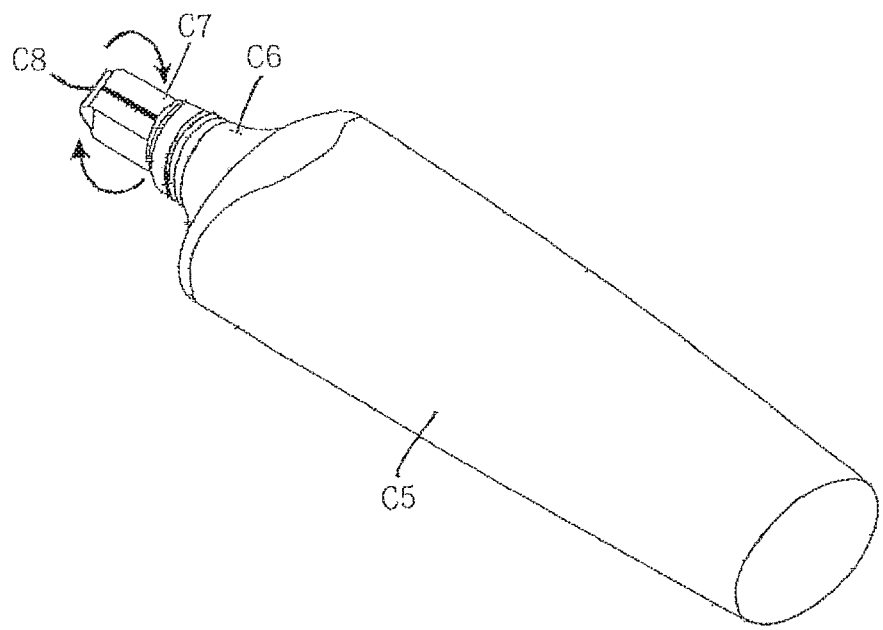

One hundred (100) pieces of products for shear strength measurement are extracted from a certain production lot (100,000 pieces) so as to perform the shear strength measurement by the method detailed in FIG. 39 and determine the mean (μ) and the standard deviation (σ) from the measurement data (normal distribution). In the probability density function f(x) of the standard normal distribution represented by the following formula 1, when the cumulative probability (contamination probability) of the products of 5N or less is set at 100 ppm or less by taking the random variables from 0 to 5 in the cumulative probability Φ(z), the production lot can be assumed as a passing lot.

$$f_{ND}(x) = \frac{1}{\sqrt{2\pi}\,\sigma} \exp\left\{-\frac{1}{2\sigma^2}(x-\mu)^2\right\}$$ [Formula 1]

where x=5(N), μ: mean, σ: standard deviation.

By continuing the measurement and inspection of the shear strength for each production lot, it is possible to grasp the change in the strength of the writing nib C30 in the production line, hence easily avoid production troubles such as lowering of shear strength. If the cumulative probability (contamination probability) of the products of 5 N or less exceeds 100 ppm, the yield tends to be poor, so that efficient production can not be obtained.

Since the writing instrument of the present invention is defined as one which has a writing part formed of, at least, a writing nib of a porous body and a retainer holding the writing nib and is characterized in that the shearing strength of the writing nib is 5 N or greater, the writing implement is not limited to the above-described embodiment modes and others, and various modifications can be made within a range not changing the technical idea of the present invention.

For example, in the above embodiment, the writing nib C30 of a sintered core type has been detailed, but the writing nib C30 may be a fiber bundle body, a foam body, a spongy body, a felt body, and so on, instead of a sintered body, as mentioned above. When the writing nib C30 is be made of a fiber bundle, a foam body or the like, a material having a low porosity or a low expansion ratio (having a high density) may be used for the writing part C32 while another material having a high porosity or a high expansion ratio (having a low density) may be used for the ink feeders C31, C31 to provide the writing core (fiber bundle core) C30, or the writing nib may be formed by combination of materials (the same material, different kinds of materials) having different mean particle size distributions, whereby it is possible to improve the shear strength of the writing part C32 of the writing nib C30. Here, even if the above writing nib C30 is replaced by each of the above forms (strength, porosity, expansion ratio and others of fiber bundle, foam material, spongy material, felt material), a favorable amount of ink with no ink starvation can be supplied without causing any failure in the ink supply mechanism from the ink absorbent C12 to the writing part C32.

Further, though each of the above-described embodiment modes illustrates a writing instrument of a type (sliver type) in which ink stored in the ink absorbent C20 is efficiently supplied to the writing part C32 of the writing nib C30 by capillary force, the invention may also be applied to a writing instrument having a valve mechanism, for example, a writing instrument which includes an ink chamber with free ink stored therein, arranged inside a barrel body forming the writing tool body, and a valve mechanism disposed between the ink chamber and the writing nib, and delivers and supplies ink to the writing nib by releasing the valve while opposing the repulsive force of a spring in the valve mechanism as the valve rod is moved back by pressing motion of the pen tip.

Furthermore, the above embodiment has been described on the single-ended writing instrument having the writing nib C30 as a single pen tip, but the above configuration can be applied to a double-ended writing instrument which further has a pen element of a fine type writing nib at the end of the rear barrel and supplies the ink in the ink absorbent C20 to the pen element.

Moreover, the above-described embodiment has been described when used with writing ink. However, liquid cosmetic, liquid medicine, application liquid, correction liquid and other fluids may be used by preparing an applying member, for example, having the target shear strength in conformity with for associated fluid.

EXAMPLES

Next, the present invention will be described in more detail with reference to examples, but the present invention is not limited to the following examples.

Example 11

A writing instruments and inks conforming to the following configurations and FIGS. 6 to 10 were used. The writing nib, retainer and the like used have the dimensions and specifications shown below.

(Configuration of Writing Nib 30)

PE sintered core, porosity 60%, writing part 32: W=4 mm, knife cut shape, ink feeder: Φ(t) 1.6 mm, the amount of protrusion Y=0.85 mm (53% of t), the amount of protrusion Y' on the opposite side of the protrusion Y=0.65 mm (40% of t), writing nib width X=1.75 mm (Configuration of Retainer 40)

Made of acrylic resin and having a visible light transmittance of 85% [the visible light transmittance was estimated by measuring the reflectance with a multi-light source spectrophotometer (MSC-5N, manufactured by Suga Test Instruments Co., Ltd.)]

The size of the see-through section 43 (rectangle) after attachment of the writing nib: 5 mm×6 mm×3 mm×4 mm (Configurations of Writing Instrument Parts Other than Writing Nib 30 and Retainer 40)

Ink Absorbent:

PET fiber bundle, porosity 85%, Φ6×77 mm

Writing Instrument Body, Cap: Made of Polypropylene (PP)

(Ink Composition)

Ink having the following composition was used (100% by mass in total).

Moisturizer: trimethylglycine (glycine betaine) 7.5% by mass

Moisturizer: pentaerythritol 4.5% by mass

Colorant:

NKW-4805 Yellow (manufactured by Nippon Keiko Kagaku Co., Ltd.) 40.0% by mass

Preservative:

Bioace (manufactured by K.I Chemical Industry Co., Ltd.) 0.3% by mass pH modifier: triethanolamine 1.0% by mass Fluorosurfactant:

SURFLON 8111 N (manufactured by AGC Seimi Chemical Co., Ltd.) 0.2% by mass

Water-Soluble Organic Solvent:

Ethylene glycol 3.0% by mass

Water (solvent): ion-exchanged water 43.5% by mass

In the writing instrument of Example 1, the protrusion amount Y on the distal side of the writing nib 30 from the retainer 40 was Y=0.85 mm (53% of t), and it was confirmed that this protruded part (protrusion amount) allows the right-handed user to draw a line from left to right and can make a writing instrument excellent in durability with no breakage of the writing nib without impairing writing performance even if an excessive load is applied, as compared to the writing instrument having a structure of the writing nib and retainer conforming to the conventional structure shown in FIG. 13 (Propus Window "PUS-102T" a product of Mitsubishi Pencil Co., Ltd. (protrusion amount Y exceeding 1.15 mm (over 72% of t).

Also, when it was checked how the far side can be seen through the see-through section at the time of writing by drawing a line over the letters using the obtained writing instrument, sufficient visibility was confirmed so that the drawing could be done while the written letters were easily seen and being read.

Further, the writing instrument was set in an automatic writing machine and tested in accordance with a test method conforming to JIS S 6037. After writing a straight line of 100 m at a writing angle of 65° inclined on high quality paper with a writing load of 1 N at a speed of 7 cm/s, the condition of the drawn line was visually checked. As a result, it was found that use of the above-described preferable ink composition makes it possible to provide good ink outflow and functions excellent in the drying performance of the drawn line and the low temperature stability of the ink while suppressing the drying of the pen tip and producing a drawing line without any bleeding or strike-through.

Example 2

A writing instrument and ink conforming to the following configurations and FIG. 12 (and FIGS. 1 to 5) were used. The writing nib, retainer and the like used have the dimensions and specifications shown below.

(Configuration of Writing Nib 30)

PE sintered core, writing part 32 (Z portion): porosity 70% (PE particle with small particle size), W=4 mm, knife cut shape, ink feeder, and so on: porosity 50% (PE particle with large particle size), Φ(t): 1.65 mm, the amount of protrusion Y=1.05 mm, writing nib width X=2.50 mm, Z=2.0 mm, (the configuration of the retainer 40, the writing instrument parts other than the writing nib 30 and the retainer 40, ink composition)

Those having the same structures and composition as in Example 1 described above were used.

In the writing instrument of Example 2, the protrusion amount on the distal side of the writing nib 30 from the retainer 40 was Y=1.05 mm (64% of t, 42% of the writing nib width X) Z=2.0 mm (Z>Y). Since the boundary portion Z1 is securely held (protected) inside the front retaining parts 44a and 44b without impairing writing performance even when a more excessive load was applied than that to the writing tool of Example 1, it was confirmed that a writing instrument excellent in durability can be obtained without breakage of the writing nib. Also, when it was checked how the far side can be seen through the see-through section at the time of writing by drawing a line over the letters using the obtained writing instrument, sufficient visibility was confirmed so that the drawing could be done while the written letters were easily seen and being read.

Further, the writing instrument was set in an automatic writing machine and tested in accordance with a test method conforming to JIS S 6037. After writing a straight line of 100 m at a writing angle of 65° inclined on high quality paper with a writing load of 1 N at a speed of 7 cm/s, the condition of the drawn line was visually checked. As a result, it was found that, similarly to the Example 1, use of the above-described preferable ink composition makes it possible to provide good ink outflow and functions excellent in the drying performance of the drawn line and the low temperature stability of the ink while suppressing the drying of the pen tip and producing a drawing line without any bleeding or strike-through.

Example 3

A writing instrument and ink conforming to the following configurations and FIGS. 21 to 24 were used. The writing nib, retainer and the like used have the dimensions and specifications shown below.

(Configuration of Writing Nib A30)

PE sintered core made of polyethylene (PE) powder having an average particle size of 5 µm (melting point 130° C.) with a porosity 60%, writing part: upper side length 4 mm, less side length 5 mm, height 2 mm, the configuration after attachment by plastic working: knife cut shape, ink feeder: Φ(t) 2 mm, length 16 mm, upper side length 4 mm, less side length 5 mm, height 2 mm (Configuration of Retainer A40)

Made of acrylic resin (melting point 160° C.) and having a visible light transmittance of 85% [the visible light transmittance was estimated by measuring the reflectance with a multi-light source spectrophotometer (MSC-5N, manufactured by Suga Test Instruments Co., Ltd.)]

The size of the see-through section A43 (rectangle) after attachment of the writing nib: 5 mm×6 mm×3 mm×4 mm Non-smooth surface part A48: wedge-like jugged shape: right-angled triangle 1.2×0.6×2.0 mm: number 3, occupying ratio (in the total surface part A47a) 40%

Non-smooth surface part A49: wedge-like jugged shape: length 2.0 mm, jugged step height: 0.1 mm, occupying ratio: the entire surface part A47b (Configurations of Writing Instrument Parts Other than Writing Nib A30 and Retainer A40)

Ink Absorbent:

PET fiber bundle, porosity 85%, Φ6×77 mm

Writing instrument body, cap: made of polypropylene (PP)

(Ink Composition)

Ink having the following composition was used (100% by mass in total).

Moisturizer: trimethylglycine (glycine betaine) 7.5% by mass

Moisturizer: pentaerythritol 4.5% by mass

Colorant:

NKW-4805 Yellow (manufactured by Nippon KeikoKagaku Co., Ltd.) 40.0% by mass

Preservative:

Bioace (manufactured by K.I Chemical Industry Co., Ltd.) 0.3% by mass pH modifier: triethanolamine 1.0% by mass Fluorosurfactant:

SURFLON 8111 N (manufactured by AGC Seimi Chemical Co., Ltd.) 0.2% by mass

Water-Soluble Organic Solvent:

Ethylene glycol 3.0% by mass

Water (solvent): ion-exchanged water 43.5% by mass

In the writing instrument of the third embodiment, the writing nib A30 shown in FIG. 22(a) having the above configuration before deformation was attached to the retainer A40 shown in FIG. 22(b) first [FIG. 22(c)]. Then, plastic working was performed on the writing nib A30 at a heat treatment temperature of 120° C. under a pressing load of 5 N to deform the writing nib A30 so as to conform to the shape of the retainer A40 shown in FIGS. 24(a) to 24(f), whereby the writing nib was formed in close contact with the retainer A40. After fixing the writing nib A30 to the retainer A40, the retainer was attached to the barrel A10 of the writing instrument via the front barrel A15 to complete the writing instrument shown in FIG. 21.

According to the writing instrument of the third embodiment, since the writing nib does not need to have a definite shape and can be attached and fixed to the retainer A40 in a snugly fitted form by plastic working, a common part can be used to produce writing nibs A30 even for the retainers having different mounting shapes. As a result, it was confirmed that productivity of writing nibs 30 and efficient manufacturing of writing instruments with diverse types of writing nibs at low cost can be achieved.

In addition, since at least part of the front portion A47 of the retainer A40 in contact with the writing nib A30 was formed into a non-smooth surface shape, it was possible to reliably fix the writing nib to the retainer with a simple structure without using an adhesive or the like, and perform manufacturing in a stabilized assembly process at low cost.

Also, when it was checked how the far side can be seen through the see-through section at the time of writing by drawing a line over the letters using the obtained writing instrument, sufficient visibility was confirmed so that the drawing could be done while the written letters were easily seen and being read.

Further, the writing instrument was set in an automatic writing machine and tested in accordance with JIS S 6037. After writing a straight line of 100 m at a writing angle of 65° inclined on high quality paper with a writing load of 1 N at a speed of 7 cm/s, the condition of the drawn line was visually checked. The result confirmed that the writing nib A30 fixed to the retainer A40 by plastic working can offer good writing performance with no ink starvation in the drawn line and good ink outflow.

Example 4

In the above Example 3, a writing instrument was produced by replacing the writing nib A30 of the PE sintered core with that of a sintered core made of polypropylene (porosity: 60%, melting point: 160° C.), without changing the shape, size and others of the writing part and without changing the configuration of the retainer A40, the ink absorbent, the writing instrument body, the cap and the ink composition.

Specifically, in the writing instrument of the fourth embodiment, the writing nib A30 shown in FIG. 22(a) having the above configuration before deformation was attached to the retainer A40 shown in FIG. 22(b) first. Then, plastic working was performed on the writing nib A30 at a heat treatment temperature of 150° C. under a pressing load of 5 N to deform the writing nib A30 so as to conform to the shape of the retainer A40 shown in FIG. 22(c), whereby the writing nib was formed in close contact with the retainer A40. After fixing the writing nib A30 to the retainer A40, the retainer was attached to the barrel A10 of the writing instrument via the front barrel A15 to complete the writing instrument shown in FIG. 21.

Also with the writing instrument of Example 4, the result confirmed that the same operation and effect as in Example 1 can be obtained when plastic working is performed by changing the material of the writing nib.

Example 5

A writing instrument and ink conforming to the following configurations and FIGS. 26 to 29 were used. The writing nib B10, retainer B40 and the like have the dimensions and specifications shown below.

(Configuration of Writing Nib B10)

<Granular Thermoplastic Resin>

Polyethylene (PE) powder (melting point: 130° C.) having an average particle size of 5 µm was used.

<Configuration of Fibrous Thermoplastic Resin>

Fiber made of polyethylene (PE) having a fineness of 3 dtex and an average fiber length of 1 mm (melting point 130° C.) was used.

<Production of Sintered Body>

The above-described granular thermoplastic resin in an amount of 80% by mass and the fibrous thermoplastic resin in an amount of 20% by mass were kneaded and pressure-molded in a mold conforming to the shape of the writing nib shown in FIG. 26. Then the molding was dried and burned at a baking temperature of 130° C., for 60 minutes to obtain a sintered body as the writing nib B10 (porosity: 60%).

(Configuration of Retainer B40)

Made of acrylic resin and having a visible light transmittance of 85% [the visible light transmittance was estimated by measuring the reflectance with a multi-light source spectrophotometer (MSC-5N, manufactured by Suga Test Instruments Co., Ltd.)]

The size of the see-through section B43 (rectangle) after attachment of the writing nib: 5 mm×6 mm×3 mm×4 mm Non-smooth surface part B48: jugged shape: length 2.0 mm, jugged step height: 0.1 mm (Configurations of Writing Instrument Parts Other than Writing Nib B10 and Retainer B40)

Ink Absorbent:

PET fiber bundle, porosity 85%, Φ6×77 mm

Writing instrument body, cap: made of polypropylene (PP)

(Composition of Application Liquid)

For the application liquid, ink having the following composition was used (100% by mass).

Moisturizer: trimethylglycine (glycine betaine) 7.5% by mass

Moisturizer: pentaerythritol 4.5% by mass

Colorant:

NKW-4805 Yellow (manufactured by Nippon Keiko Kagaku Co., Ltd.) 40.0% by mass

Preservative:

Bioace (manufactured by K. I Chemical Industry Co., Ltd.) 0.3% by mass pH modifier: triethanolamine 1.0% by mass Fluorosurfactant:

SURFLON 8111 N (manufactured by AGC Seimi Chemical Co., Ltd.) 0.2% by mass

Water-Soluble Organic Solvent:

Ethylene glycol 3.0% by mass

Water (solvent): ion-exchanged water 43.5% by mass (Configuration of Comparative Writing Nib)

As a writing nib for comparison, a writing nib (porosity: 60%) made of a sintered body using the above polyethylene (PE) powder having an average particle size of 5 µm (melting point 130° C.) was produced.

The writing instrument E using the writing nib B10 of Example 5 was used to write, excellent ease of outflow of the application liquid was confirmed. In addition, the writing nib for comparison of the present invention and a writing nib for comparison (having the same shape, size and porosity) were compared as to physical strength, namely, shear strength and breakdown strength, using a shearing force measuring apparatus for measuring shear strength and a breaking strength measuring apparatus for measuring breaking strength, under the same conditions. As a result, approximately 3 times the shear strength and approximately 3 times the breaking strength were confirmed.

Also, when it was checked how the far side can be seen through the see-through section at the time of writing by drawing a line over the letters, sufficient visibility was confirmed so that the drawing could be done while the written letters were easily seen and being read.

Further, this writing instrument of Example 5 was set in an automatic writing machine and tested in accordance with JIS S 6037. After writing a straight line of 100 m at a writing angle of 65° inclined on high quality paper with a writing load of 1 N at a speed of 7 cm/s, the condition of the drawn line was visually checked. The result confirmed that the writing nib B10 can offer good writing performance with no ink starvation in the drawn line and good ink outflow.

Example 6

In the above Example 5, as the granular thermoplastic resin, a polypropylene powder (melting point 160° C.) having an average particle size of 5 µm, and a polypropylene fiber (melting point 160° C.) having a fineness of 3 dtex and an average fiber length of 1 mm were used.

The above-described granular thermoplastic resin in an amount of 80% by mass and the fibrous thermoplastic resin in an amount of 20% by mass were kneaded and processed in the same manner as in the above Example 5, except that it was burned at a baking temperature of 155° C., for 60 minutes to obtain a sintered body as the writing nib B10 (porosity: 60%).

The thus obtained writing nib B10 installed in a writing instrument conforming to Example 5 could be confirmed to have the same operation and effect as in the above Example 5 even if the material of the writing nib was replaced.

Example 7

A writing instrument and ink conforming to the following configurations and FIGS. 36 to 39 were used. The writing nib, retainer and the like used have the dimensions and specifications shown below.

(Configuration of Writing Nib C30)

PE sintered core made of polyethylene (PE) powder having an average particle size of 5 µm (melting point 130° C.) with a porosity 60%, writing part: upper side length 4 mm, less side length 5 mm, height 2 mm, ink feeder: Φ(t) 2 mm, length 16 mm, upper side length 4 mm, lower side length 5 mm, height 2 mm Shear strength: the probability density function f(x) of the breakage at t=0.5 mm by the shear strength of 5N was 47 ppm.

Here, the average particle size is an average value of the diameters of the measured particles by an electron microscope and the average value of the particle diameters measured for 20 particles in the image projected on the electron microscope. When the particle is not circular, the value obtained by dividing by two the sum of the length of the longest line segment and the length of the shortest line segment of the line segments connecting any two points on the outline forming pores is used as the particle size of the particle. On the other hand, the porosity is obtained as follows: a writing nib having a known mass and apparent volume is immersed in water so that sufficient water is infiltrated, then the mass is measured after being taken out from water. From the measured mass, the volume of water immersed in the writing nib is calculated. The porosity is calculated from the following formula (A) assuming that the volume of water is the same as the volume of pores in the writing nib.

$$\text{Porosity(unit: \%)} = \text{(volume of water)}/\text{(apparent volume of writing nib)} \times 100 \quad (A)$$

(Configuration of Retainer C40)

Made of acrylic resin (melting point 160° C.) and having a visible light transmittance of 85% [the visible light transmittance was estimated by measuring the reflectance with a multi-light source spectrophotometer (MSC-5N, manufactured by Suga Test Instruments Co., Ltd.)]

The size of the see-through section C43 (rectangle) after attachment of the writing nib: 5 mm×6 mm×3 mm×4 mm Non-smooth surface part C48: jugged shape: length 2.0 mm, jugged step height: 0.1 mm, occupying ratio: the entire surface part C47

(Configurations of Writing Instrument Parts Other than Writing Nib C30 and Retainer C40)

Ink Absorbent:
PET fiber bundle, porosity 85%, Φ6×77 mm
Writing instrument body, cap: made of polypropylene (PP)

(Ink Composition)

Ink having the following composition was used (100% by mass in total).

Moisturizer: trimethylglycine (glycine betaine) 7.5% by mass
Moisturizer: pentaerythritol 4.5% by mass
Colorant:
NKW-4805 Yellow (manufactured by Nippon Keiko Kagaku Co., Ltd.) 40.0% by mass
Preservative:
Bioace (manufactured by K. I Chemical Industry Co., Ltd.) 0.3% by mass
pH modifier: triethanolamine 1.0% by mass
Fluoro Surfactant:
SURFLON 8111 N (manufactured by AGC Seimi Chemical Co., Ltd.) 0.2% by mass
Water-Soluble Organic Solvent:
Ethylene glycol 3.0% by mass
Water (solvent): ion-exchanged water 43.5% by mass In the writing instrument of Example 7, the writing nib C30 having the above characteristics was attached to the retainer C40 shown in FIG. 37(FIG. 38). After fixing the writing nib C30 to the retainer C40, the retainer was attached to the writing tool barrel C10 via the front barrel C15 to produce the writing instrument shown in FIG. 36.

According to the writing instrument of this Example 7, since the shear strength of the writing nib C30 was set to 10 N (5 N or more), the writing instrument was confirmed to have excellent durability capable of preventing breakage of the writing nib without impairing writing performance even if writing is performed with a heavy writing load.

In addition, since at least part of the surface portion C47 of the retainer C40 in contact with the writing nib C30 was formed as the non-smooth surface part C48, the writing nib could be reliably fixed to the retainer with a simple structure without using an adhesive or the like, it was hence possible to perform manufacture in a stabilized assembly process at a low cost.

Also, when it was checked how the far side can be seen through the see-through section at the time of writing by drawing a line over the letters using the obtained writing instrument, sufficient visibility was confirmed so that the drawing could be done while the written letters were easily seen and being read.

Further, this writing instrument was set in an automatic writing machine and tested in accordance with JIS S 6037. After writing a straight line of 100 m at a writing angle of 65° inclined on high quality paper with a writing load of 10 N at a speed of 7 cm/s, the condition of the drawn line was visually checked. The result proved that the writing nib will not fracture or break and can offer good writing performance with no ink starvation in the drawn line and good ink outflow.

Example 8

A writing instrument was manufactured in the same manner as in the above Example 7 without changing the configuration of the retainer C40, the ink absorbent, the writing tool body, the cap and the ink composition but the writing nib C30 formed of a PE made sintered core was replaced by a PP made sintered core (porosity: 60%) formed from a polypropylene resin powder (melting point 160° C.) having an average particle size of 5 μm.

In this case, the probability density function f(x) of the breakage at t=0.5 mm by the shear strength of 5N (based on the measurement by the measuring apparatus shown in FIG. 39) was 64 ppm.

Also in the writing instrument of Example 8, when the material of the writing nib was changed, the same operation and effect as that of the above-described Example 7 was obtained. That is, the writing instrument obtained was to have excellent durability capable of preventing breakage of the writing nib without impairing writing performance even if writing is performed with a heavy writing load.

In addition, the writing nib could be reliably fixed to the retainer with a simple structure without using an adhesive or the like, it was hence possible to manufacture in a stabilized assembly process at a low cost. Also, when it was checked how the far side can be seen through the see-through section at the time of writing by drawing a line over the letters using the obtained writing instrument, sufficient visibility was obtained so that the drawing could be done while the written letters were easily seen and being read.

Further, this writing instrument was set in an automatic writing machine and tested in accordance with JIS S 6037. After writing a straight line of 100 m at a writing angle of 65° inclined on high quality paper with a writing load of 10 N at a speed of 7 cm/s, the condition of the drawn line was visually checked. The result confirmed that the writing nib will not fracture or break and can offer good writing performance with no ink starvation in the drawn line and good ink outflow.

INDUSTRIAL APPLICABILITY

The writing instruments of the present invention can be suitably used for maker type writing instruments called underline pens, paint markers, oil maker pens, and aqueous maker pens. Further, the present invention is not limited to use for writing, but may be applied to application purposes such as cosmetic applicators containing cosmetic liquid, correction fluid applicators containing correction ink, drug solution applicators containing chemicals, paint liquid applicators containing application liquid such as paints.

EXPLANATION OF SIGN

A writing instrument
10 barrel body
11 rear barrel
15 front barrel
20 ink absorbent
30 writing nib 40 retainer
50 cap
X writing width
Y protrusion amount
t writing nib thickness

The invention claimed is:

1. A writing instrument comprising a writing part composed of, at least a U-shaped writing nib formed of a porous body and a retainer for holding the U-shaped writing nib,
wherein an endface of the retainer on a side opposite a writing direction side of the writing instrument protrudes further toward a distal side of the U-shaped writing nib than an endface of the retainer on the writing direction side, and
wherein a protrusion amount of the U-shaped writing nib from the endface of the retainer to a distal side of the U-shaped writing nib is greater on a first face of the U-shaped writing nib on the writing direction side of the writing instrument than on a second face of the U-shaped writing nib on the side opposite the writing direction side of the writing instrument, the protrusion amount of the U-shaped writing nib from the endface of the retainer to the distal side of the U-shaped writing nib on the first face of the U-shaped writing nib on the writing direction side of the writing instrument being 40% or more and 65% or less of the U-shaped writing nib thickness.

2. The writing instrument according to claim 1, wherein the U-shaped writing nib has a porosity of 30 to 70%.

3. The writing instrument according to claim 1, wherein a fracture position of the U-shaped writing nib by shearing is located within 0.6 mm or less in length inward from the endface on the distal side of the U-shaped writing nib.

4. The writing instrument according to claim 1, wherein the U-shaped writing nib is formed of a sintered body obtained by sintering at least a granular thermoplastic resin.

5. The writing instrument according to claim 1, wherein the U-shaped writing nib is formed by combining materials having different particle size distributions.

6. The writing instrument according to claim 1, comprising: the writing part composed of, at least the U-shaped writing nib formed of the porous body and the retainer for holding the U-shaped writing nib, wherein the U-shaped writing nib before deformation is attached to the retainer and then deformed so as to conform to the shape of the retainer and be closely held by the retainer.

7. The writing instrument according to claim 1, wherein the U-shaped writing nib includes an ink feeder and the writing part for leading out ink from the ink feeder, and a flat portion of the writing part is formed to be an inclined portion by plastic deformation.

8. The writing instrument according to claim 1, wherein the writing nib is formed of a sintered body obtained by sintering a granular thermoplastic resin and a fibrous thermoplastic resin.

9. The writing instrument according to claim 1, wherein the U-shaped writing nib is formed of a granular thermoplastic resin (A) and a fibrous thermoplastic resin (B) wherein the content ratio thereof [(A):(B)] is 20 to 80% by mass: 80 to 20% by mass.

* * * * *